(12) United States Patent
Deschepper

(10) Patent No.: US 10,949,812 B1
(45) Date of Patent: Mar. 16, 2021

(54) VEHICLE APPEARANCE PROTECTION AND ENHANCEMENT APPARATUSES, METHODS AND SYSTEMS

(71) Applicant: Benjamin Bruce Deschepper, Sioux Falls, SD (US)

(72) Inventor: Benjamin Bruce Deschepper, Sioux Falls, SD (US)

( * ) Notice: Subject to any disclaimer, the term of this patent is extended or adjusted under 35 U.S.C. 154(b) by 1067 days.

(21) Appl. No.: 15/057,802

(22) Filed: Mar. 1, 2016

Related U.S. Application Data

(60) Provisional application No. 62/126,699, filed on Mar. 1, 2015, provisional application No. 62/239,729, filed on Oct. 9, 2015.

(51) Int. Cl.
| | | |
|---|---|---|
| *G06Q 10/00* | (2012.01) | |
| *G06Q 20/36* | (2012.01) | |
| *G06Q 20/06* | (2012.01) | |
| *G06Q 20/38* | (2012.01) | |

(52) U.S. Cl.
CPC ........... *G06Q 10/20* (2013.01); *G06Q 20/065* (2013.01); *G06Q 20/3678* (2013.01); *G06Q 20/38215* (2013.01)

(58) Field of Classification Search
CPC .. G06Q 10/20; G06Q 20/3678; G06Q 20/065; G06Q 20/38215
USPC .......................................................... 705/35
See application file for complete search history.

(56) References Cited

U.S. PATENT DOCUMENTS

| | | | | |
|---|---|---|---|---|
| 8,090,642 B1 * | 1/2012 | Van Doren | ............ | G06Q 40/00 705/35 |
| 2004/0098318 A1 * | 5/2004 | Furukawa | ............... | G06Q 30/02 705/26.1 |
| 2005/0086070 A1 * | 4/2005 | Engelman | ............ | G06Q 10/087 705/28 |
| 2005/0108112 A1 * | 5/2005 | Ellenson | ............ | G06Q 30/0278 705/306 |
| 2007/0162293 A1 * | 7/2007 | Malkon | ............... | G06Q 30/0278 705/306 |

(Continued)

OTHER PUBLICATIONS

"Enabling Blockchain Innovations with Pegged Sidechains," by Adam Back; Matt Corallo; Luke Dashjr; Mark Friedenbach; Gregory Maxwell; Andrew Miller; Andrew Poelstra; Jorge Timon; and Peter Wuille. Published: Oct. 22, 2014. (Year: 2014).*

*Primary Examiner* — Sara C Hamilton
(74) *Attorney, Agent, or Firm* — Hanchuk Kheit LLP; Walter G. Hanchuk

(57) ABSTRACT

The Vehicle Appearance Protection and Enhancement Apparatuses, Methods and Systems ("APEPS") transforms initial product attribute data inputs via APEPS components into future product value enhancement verification outputs. In various aspects of the various embodiments of the APEPS system, an Automotive Appearance Protection Trade Credit, voucher, coupon, allowance, guarantee, etc. is provided to a user. The trade credit may equal a percentage, flat dollar amount, or dollar for dollar up to a maximum amount of the original automotive appearance protection/product purchase/lease price. The customer is provided with tangible value upon leaving a dealership, which states that by applying these products/protections the vehicle trade-in value will be enhanced. The APEPS provides a web portal for both customers and dealers that will automatically calculate and continuously update the trade credit.

38 Claims, 53 Drawing Sheets

(56) References Cited

U.S. PATENT DOCUMENTS

| | | | |
|---|---|---|---|
| 2008/0201163 A1* | 8/2008 | Barker | G06Q 30/02 |
| 2009/0063303 A1* | 3/2009 | Doll | G06Q 30/02 705/27.1 |
| 2010/0223158 A1* | 9/2010 | Brown | G06Q 10/04 705/26.1 |
| 2012/0036033 A1* | 2/2012 | Seergy | G06Q 30/06 705/26.3 |
| 2012/0197699 A1* | 8/2012 | Snell | G06Q 30/0208 705/14.11 |
| 2012/0303474 A1* | 11/2012 | Sanel | G06Q 30/08 705/26.4 |
| 2013/0262202 A1* | 10/2013 | Balestrieri | G06Q 30/00 705/14.11 |
| 2013/0268315 A1* | 10/2013 | Cotton | G06Q 30/0201 705/7.29 |
| 2013/0304620 A1* | 11/2013 | Bhattacharya | G06Q 40/04 705/37 |
| 2014/0156474 A1* | 6/2014 | Swain | G06Q 40/12 705/30 |
| 2014/0279105 A1* | 9/2014 | Winokur | G06Q 30/0611 705/21 |
| 2016/0098723 A1* | 4/2016 | Feeney | G06Q 20/4016 705/75 |
| 2016/0098730 A1* | 4/2016 | Feeney | G06Q 30/0185 705/71 |

* cited by examiner

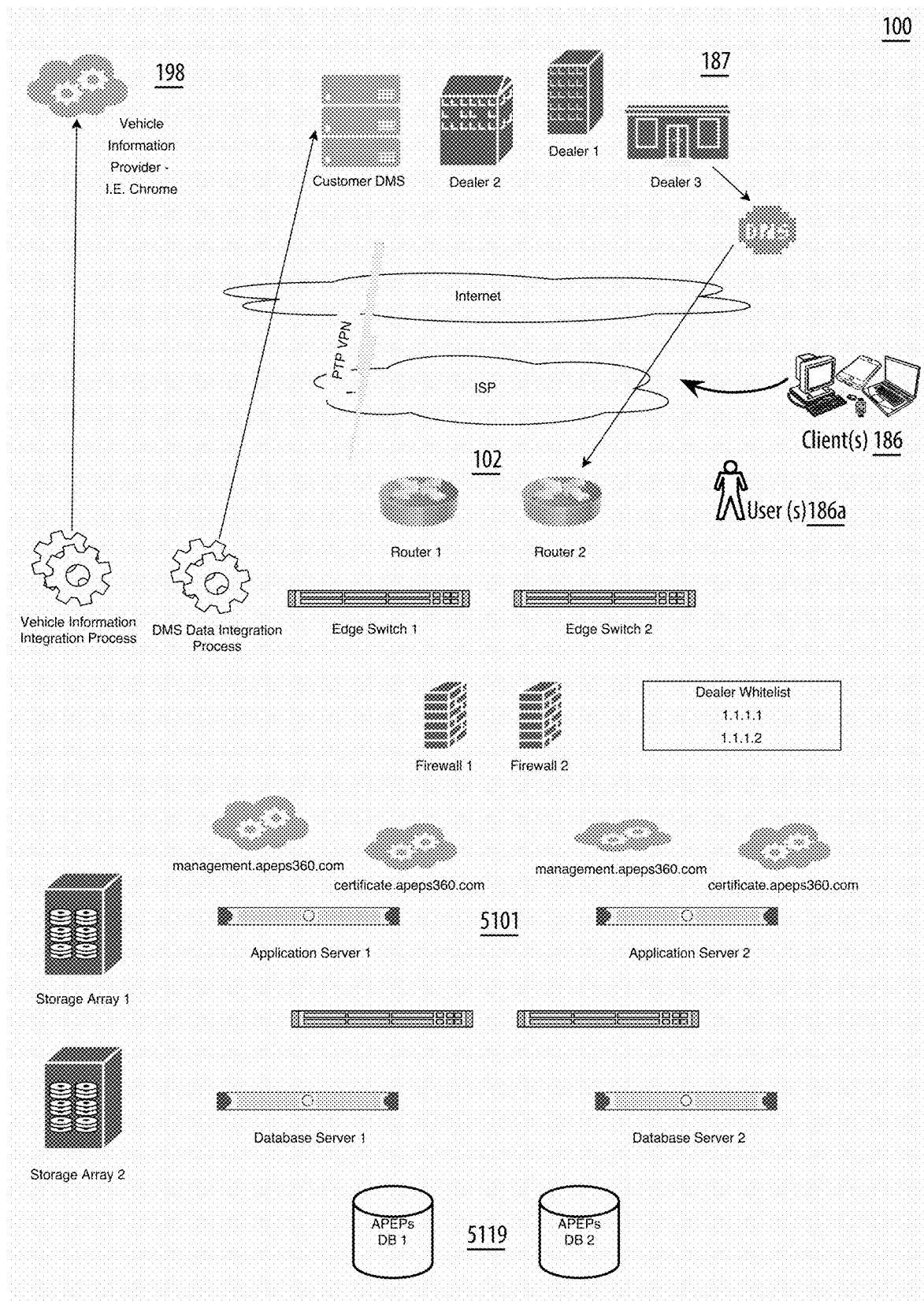
Fig.1: APEPS Network Environment

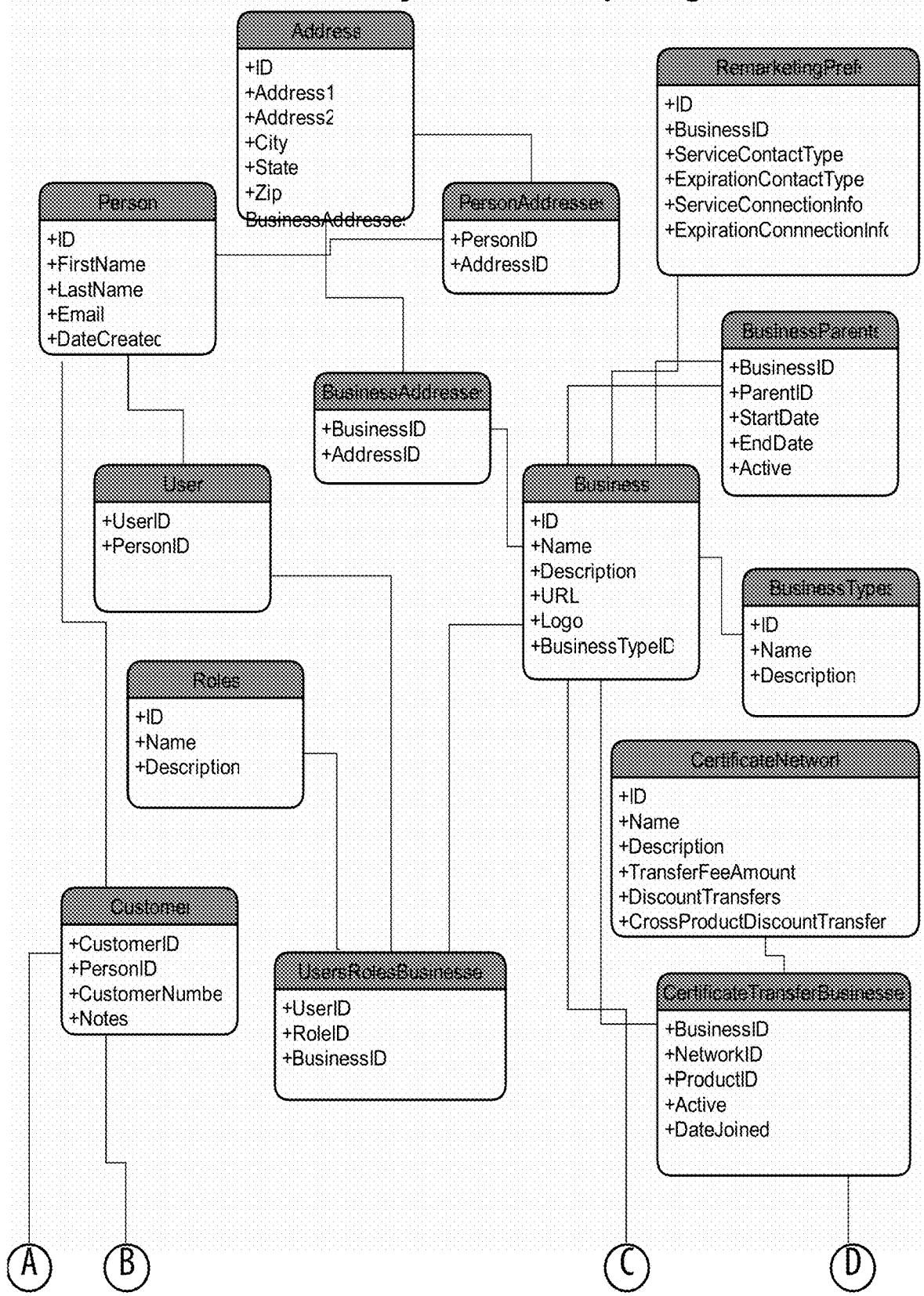
Fig.2: APEPS - Entity Relationship Diagram

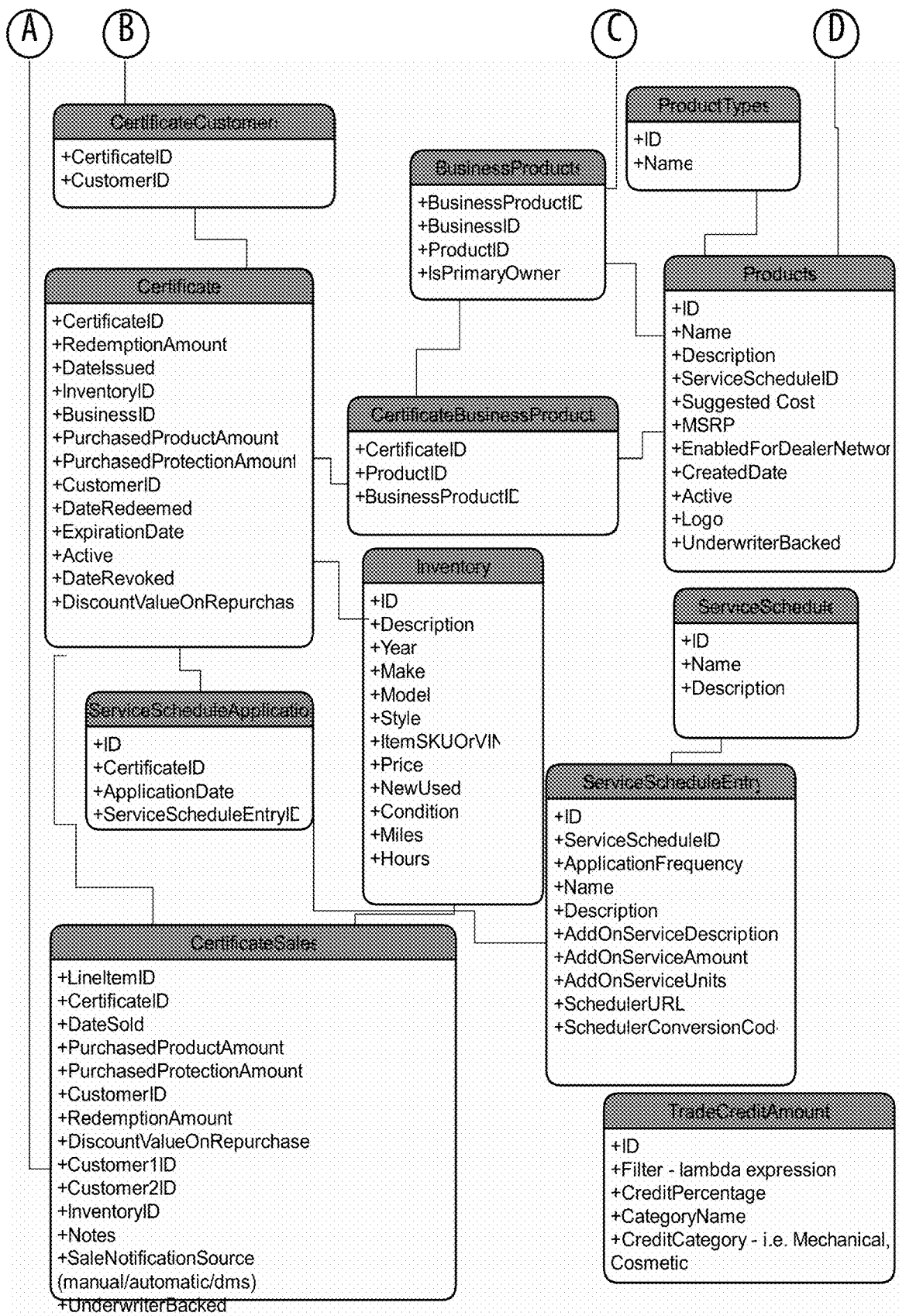
Fig.3: APEPS - Entity Relationship Diagram2

Reconstitution Request Component
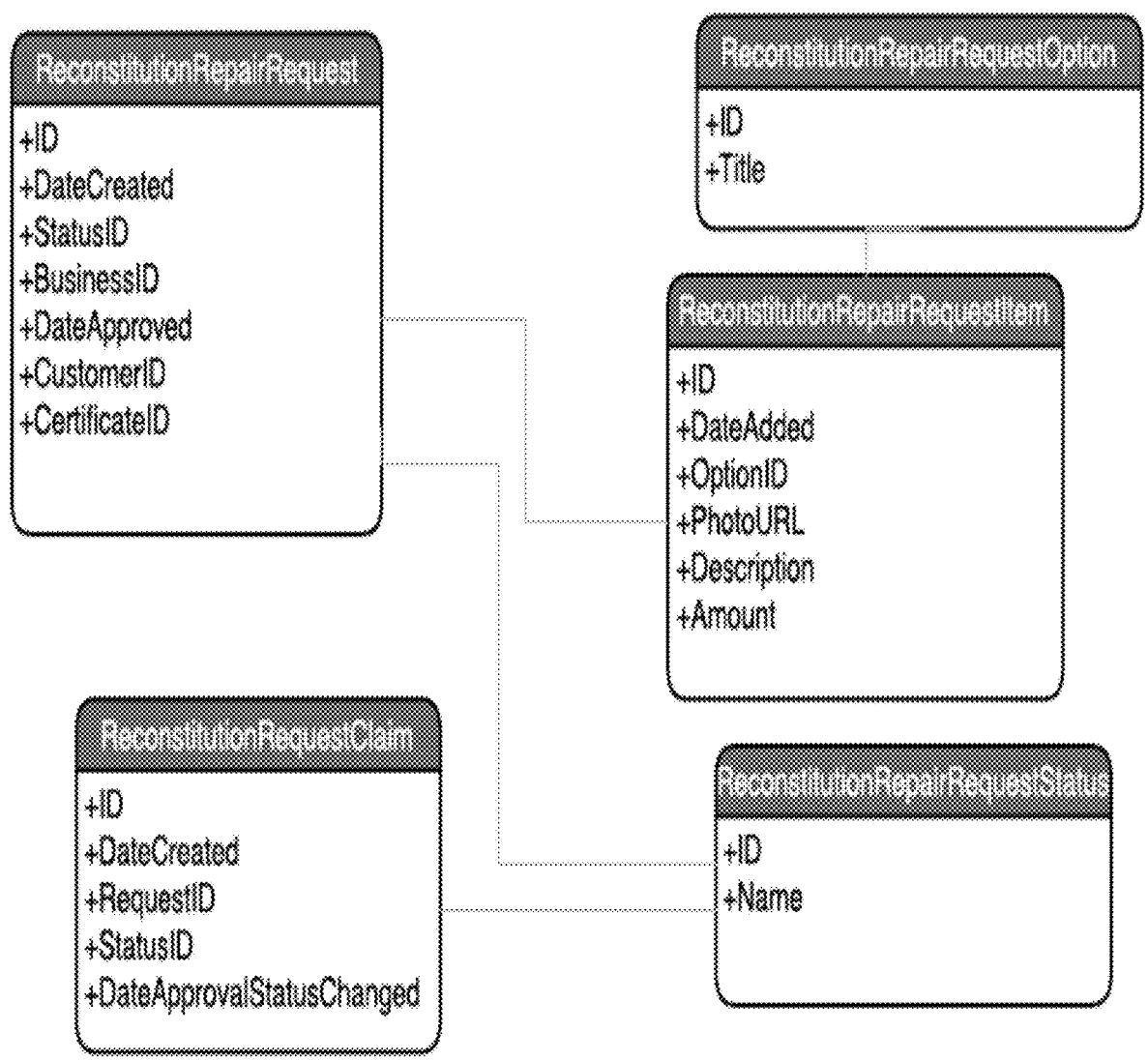
Fig.4: APEPS - Reconsitution Request Component

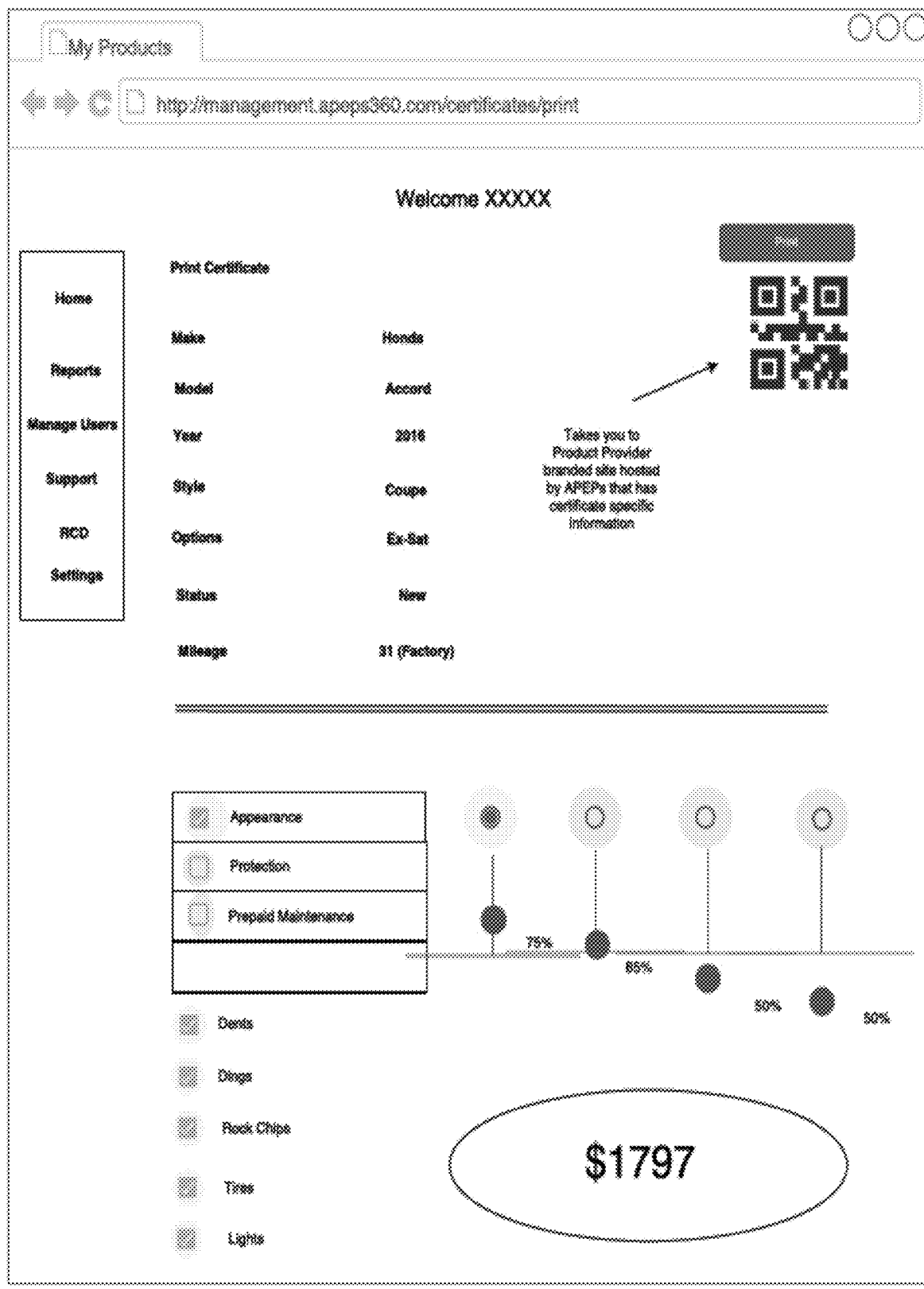
Fig.5a: APEPS—Screen Shot

| | |
|---|---|
| 501 Make | Honda |
| 503 Year | 2015 |
| 505 Model | Accord |
| 507 Sub Type | Coupe |
| 509 Options | EX - Satelite |
| 511 Status | New/Checked |
| 513 Mileage | 42 |

517 [QR code]

Appearance 519
Mechanical
Prepaid Maintenance 521
Tune-ups 523
Upgrades (e.g., headunit software) 525

515 Years
1  2  3  4  5  6  7

535 Cost  $1,797.23

537 Request  OK Get me a Certificate

527 Coverage

☑ Dents  ☑ Dings  ☑ Rock chips  ☑ Wheels  ☑ Tires  ☑ Lights  ☑ Paint

100%
529
0%

Fig.5b: APEPS—Screen Shot

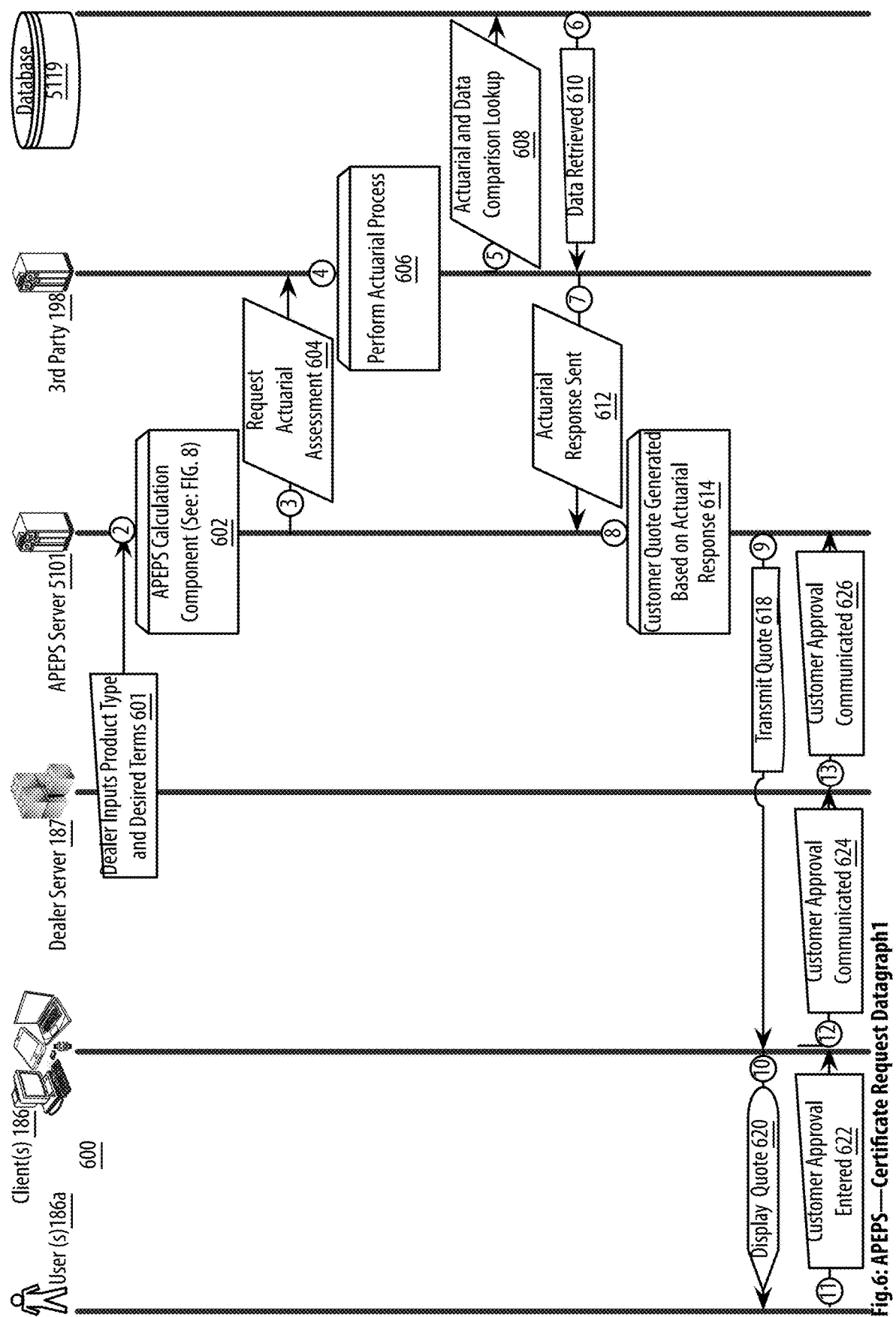
Fig. 6: APEPS—Certificate Request Datagraph1

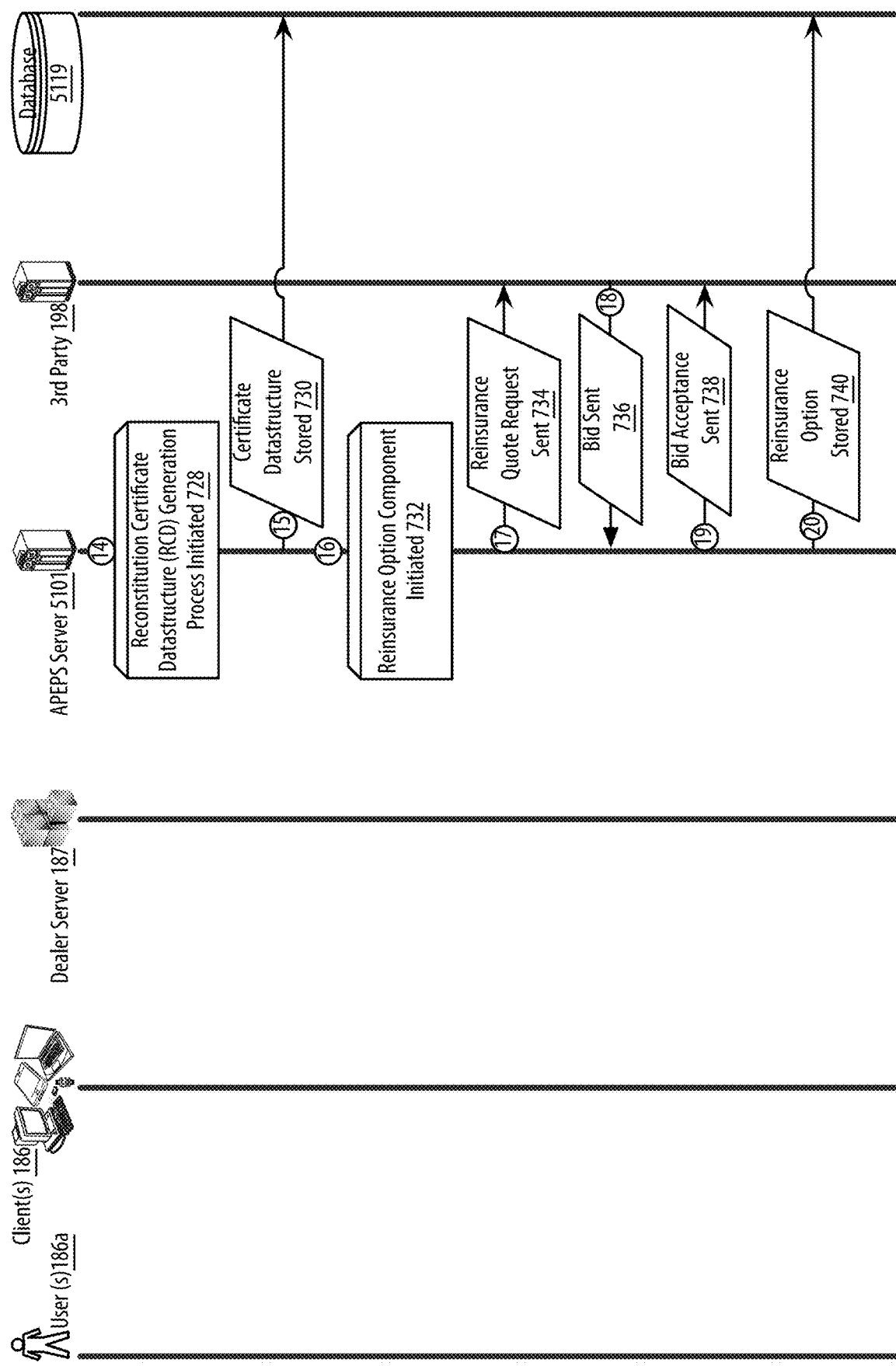
Fig.7: APEPS—Certificate Request Datagraph2

Fig.8: APEPS—Option Verification Component Logic Flow

Fig.9a: APEPS—Screen Shot 2

| 940 Repair Type | 942 Option | 944 Amount | 946 %Covered | 966 Repair Co. |
|---|---|---|---|---|
| ✓ Dents |  Browse | $123 | 100% | Acme Fixit Co ▼ |
| ✓ Dings |  Browse | $123 | 60% | Acme Fixit Co ▼ |
| ✓ Rock chips |  Browse | $123 | 30% | Acme Fixit Co ▼ |
| ✓ Wheels |  Browse | $123 | 30% | Acme Fixit Co ▼ |
| ✓ Tires |  Browse | $123 | 30% | Acme Fixit Co ▼ |
| ✓ Lights |  Browse | $123 | 30% | Acme Fixit Co ▼ |
| ✓ Paint |  Browse | $123 | 30% | Beta Fixit Co ▼ |
950 RCD ID: 12345ABCD
Fig.9b: APEPS—Screen Shot 2

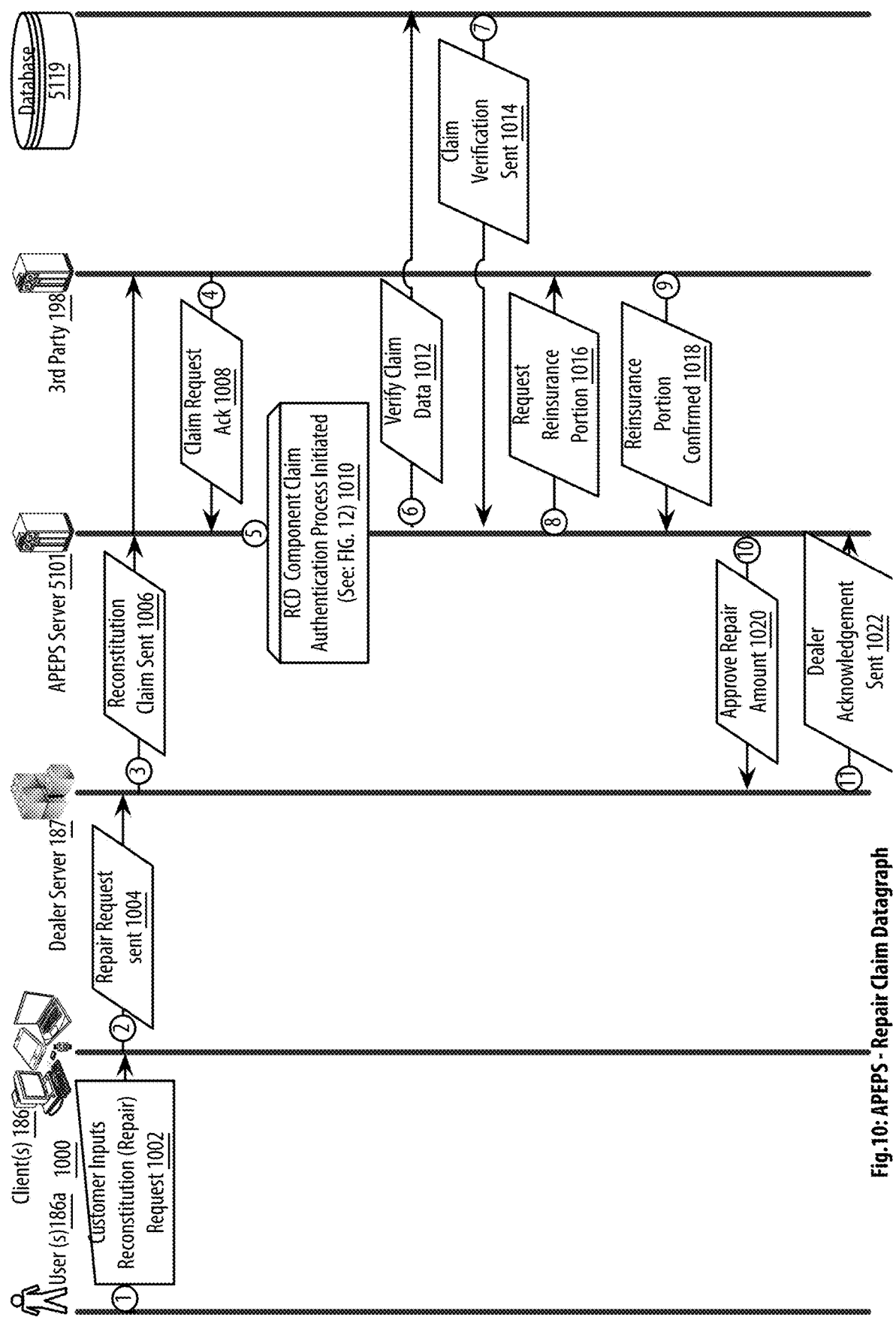
Fig.10: APEPS - Repair Claim Datagraph

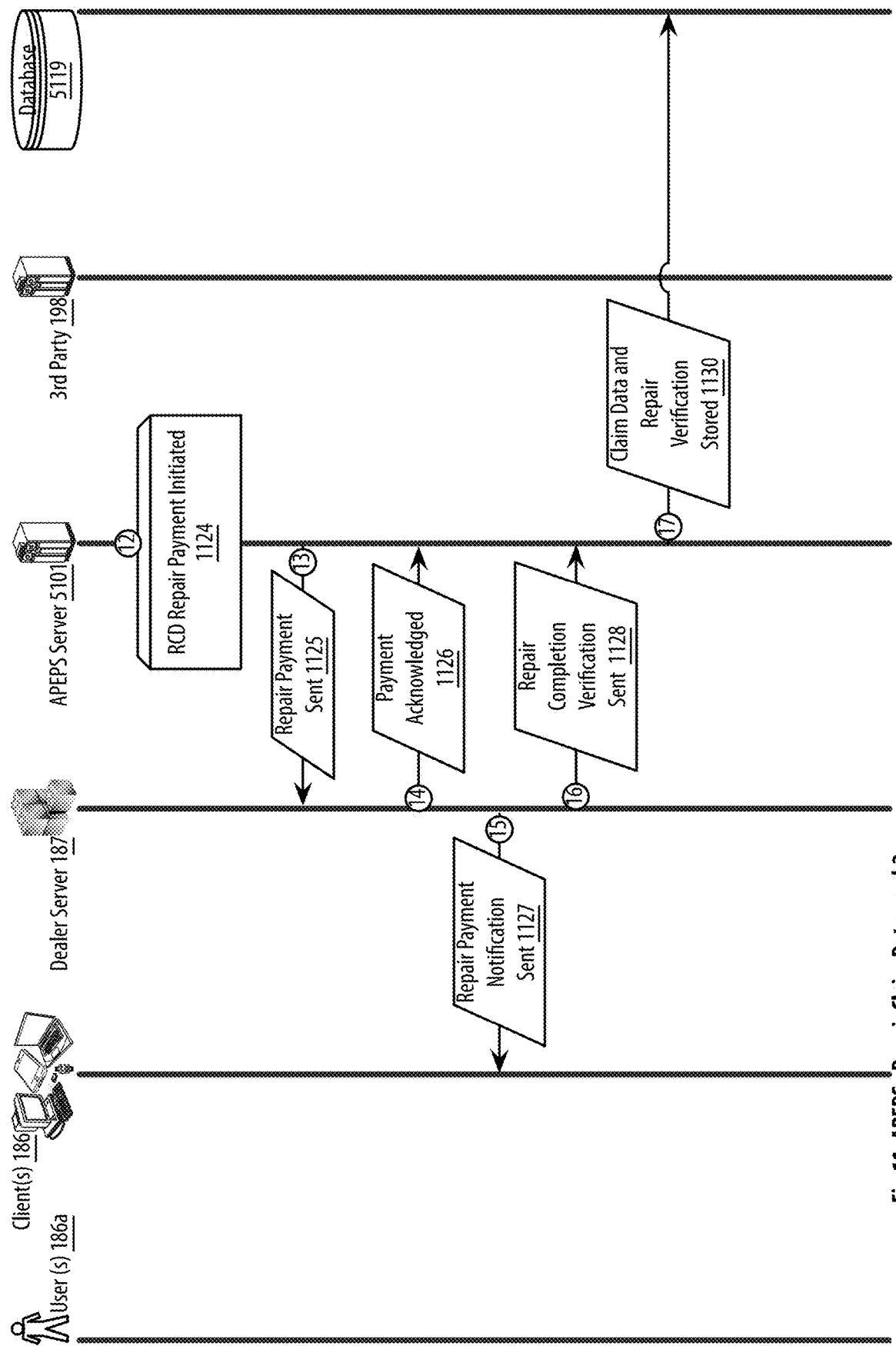
Fig.11: APEPS - Repair Claim Datagraph2

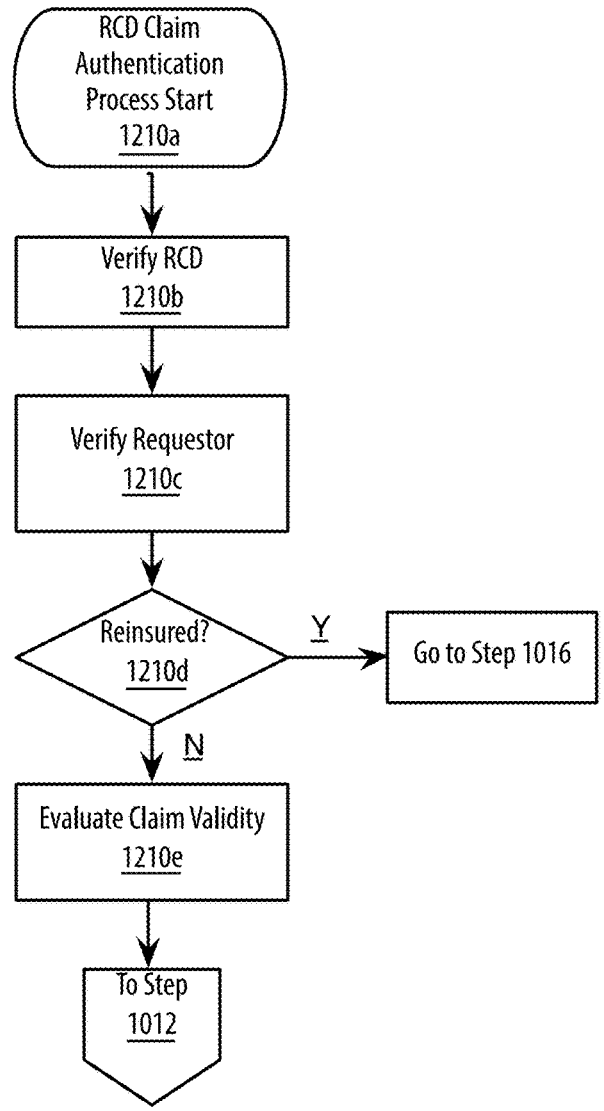
Fig.12: APEPS - RCD Claim Authentication Component Logic Flow 2

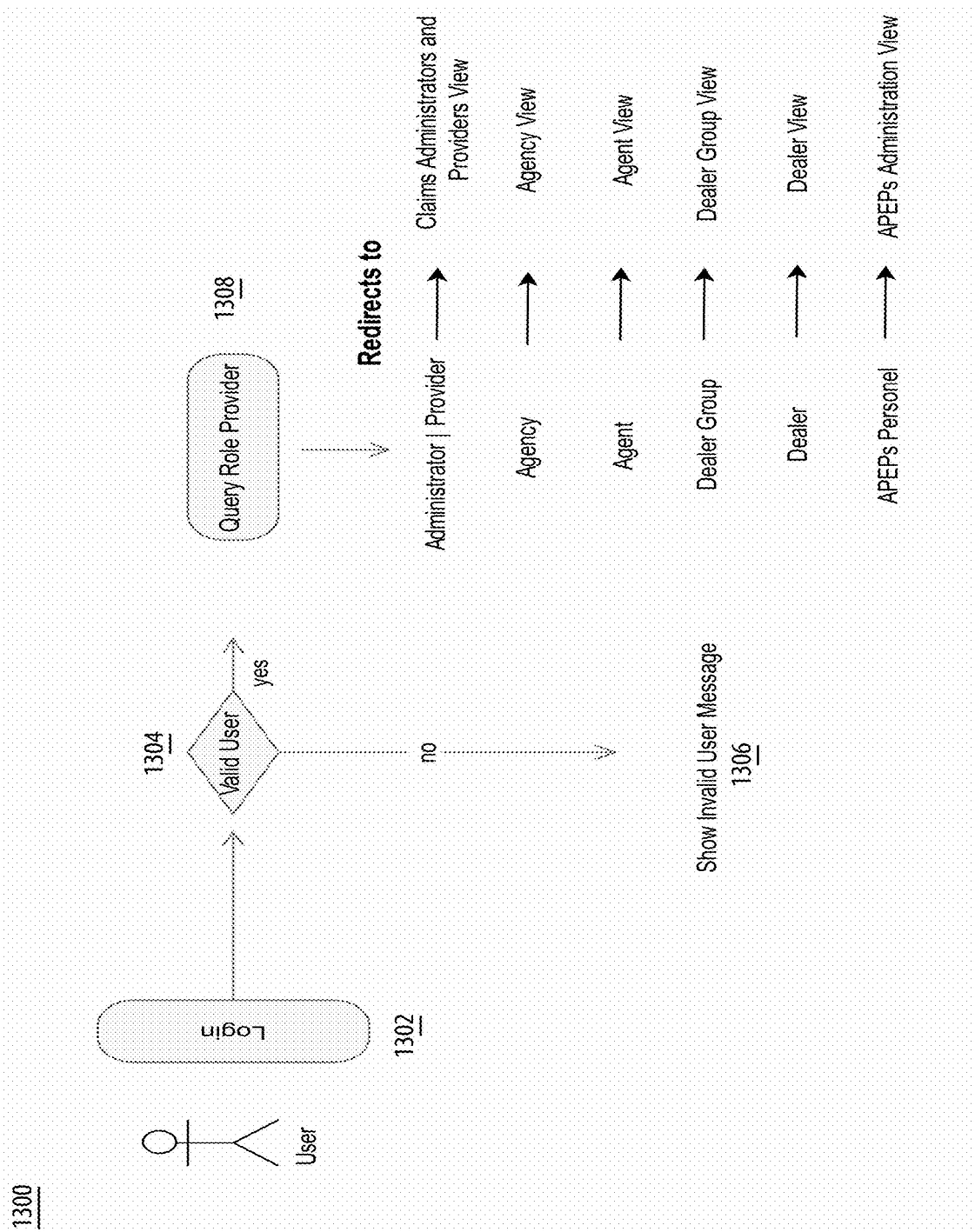
Fig.13: APEPS - Customer Login Flow1

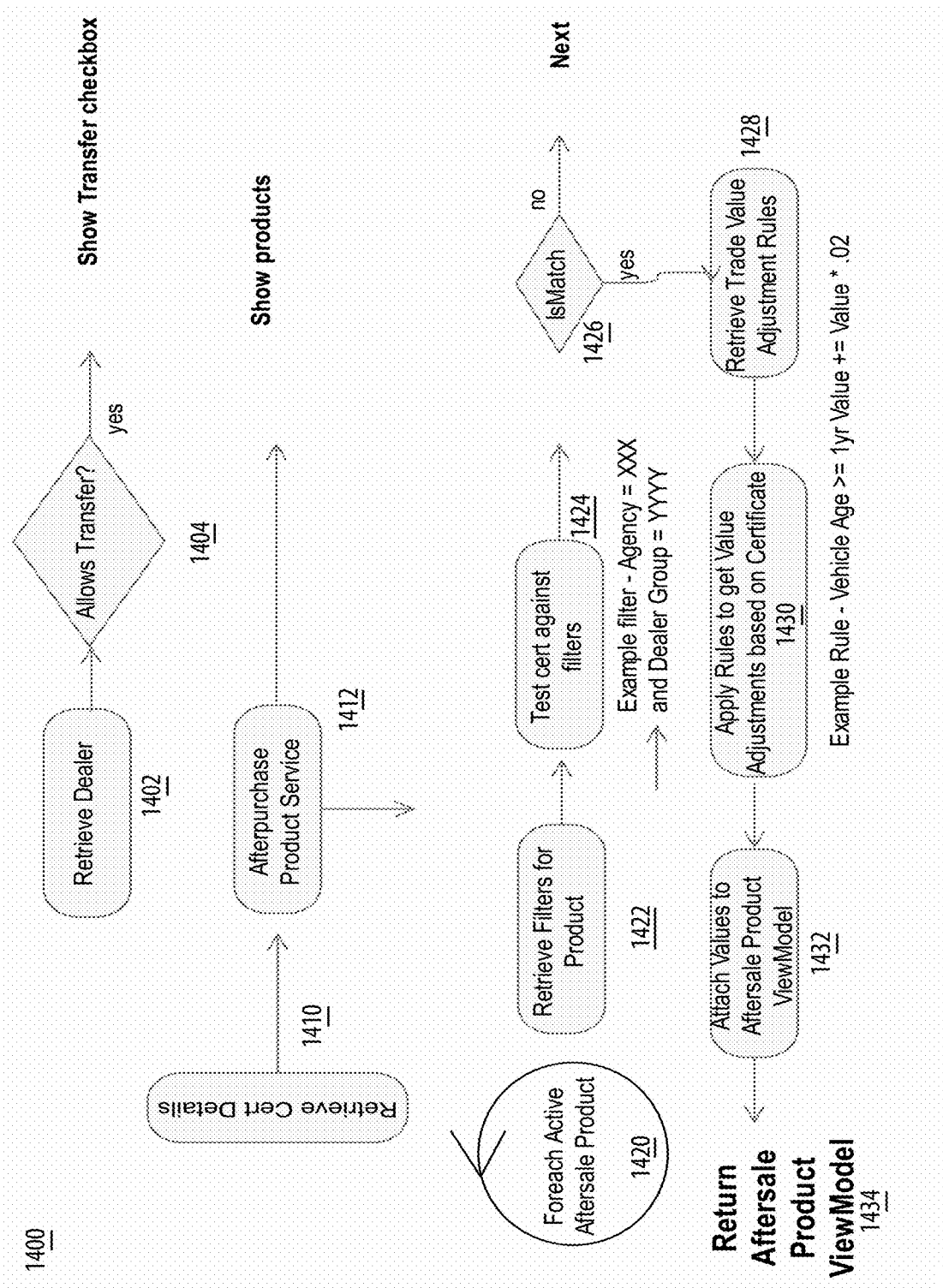
Fig.14: APEPS - Aftersale Flowchart

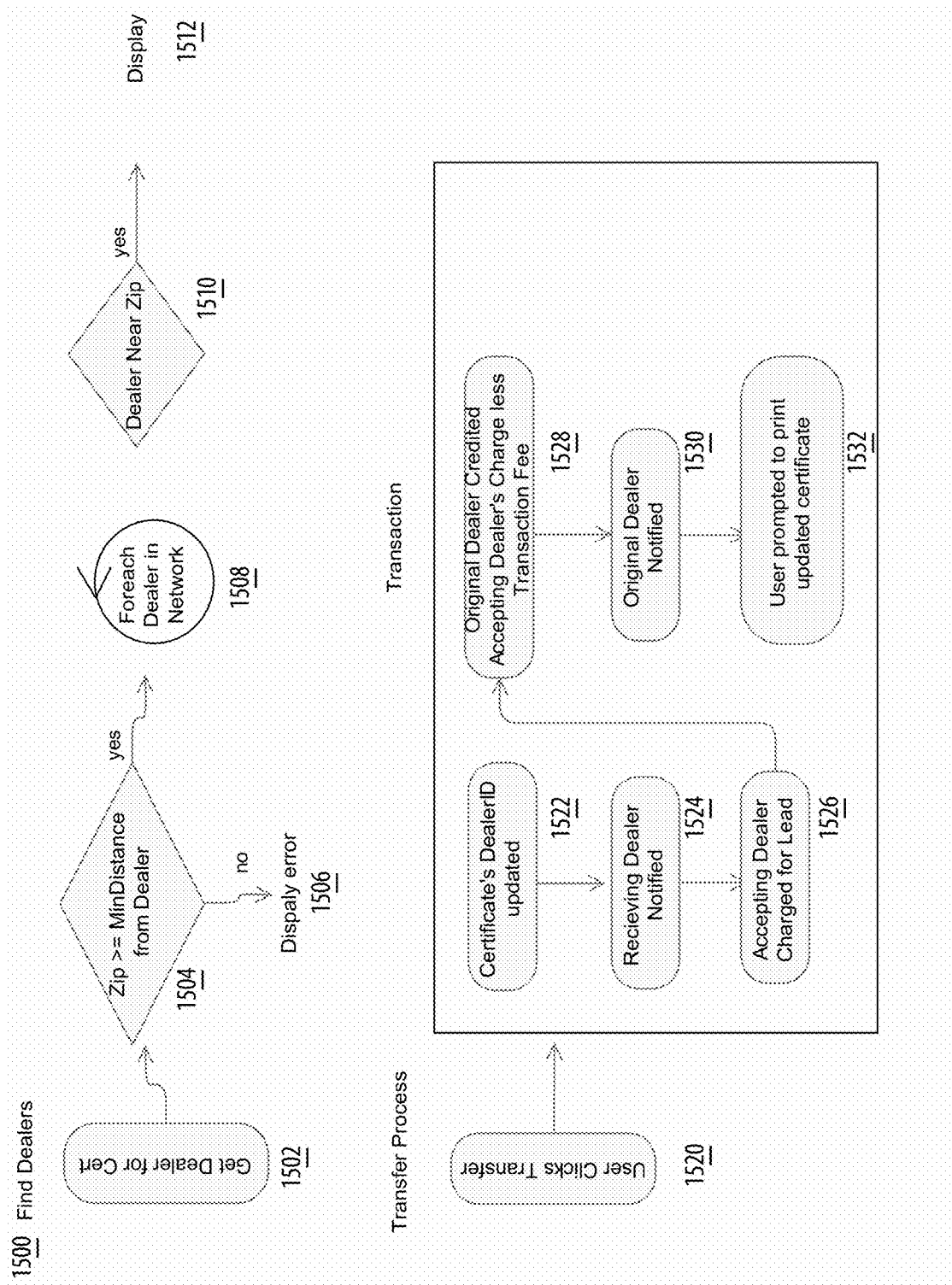
Fig.15: APEPS - Dealer and Transfer Flowcharts

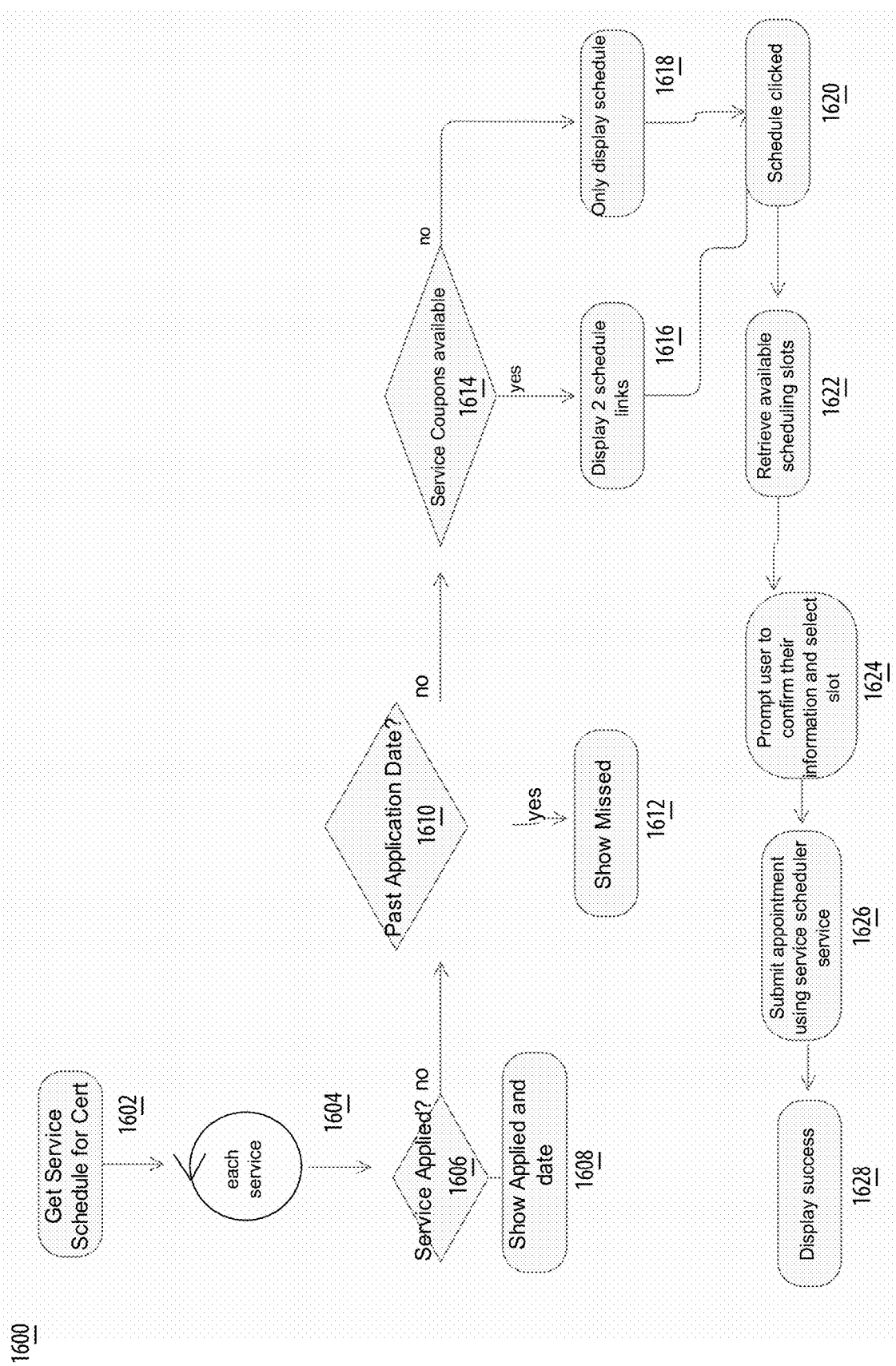
Fig.16: APEPS - Appointment Flowchart

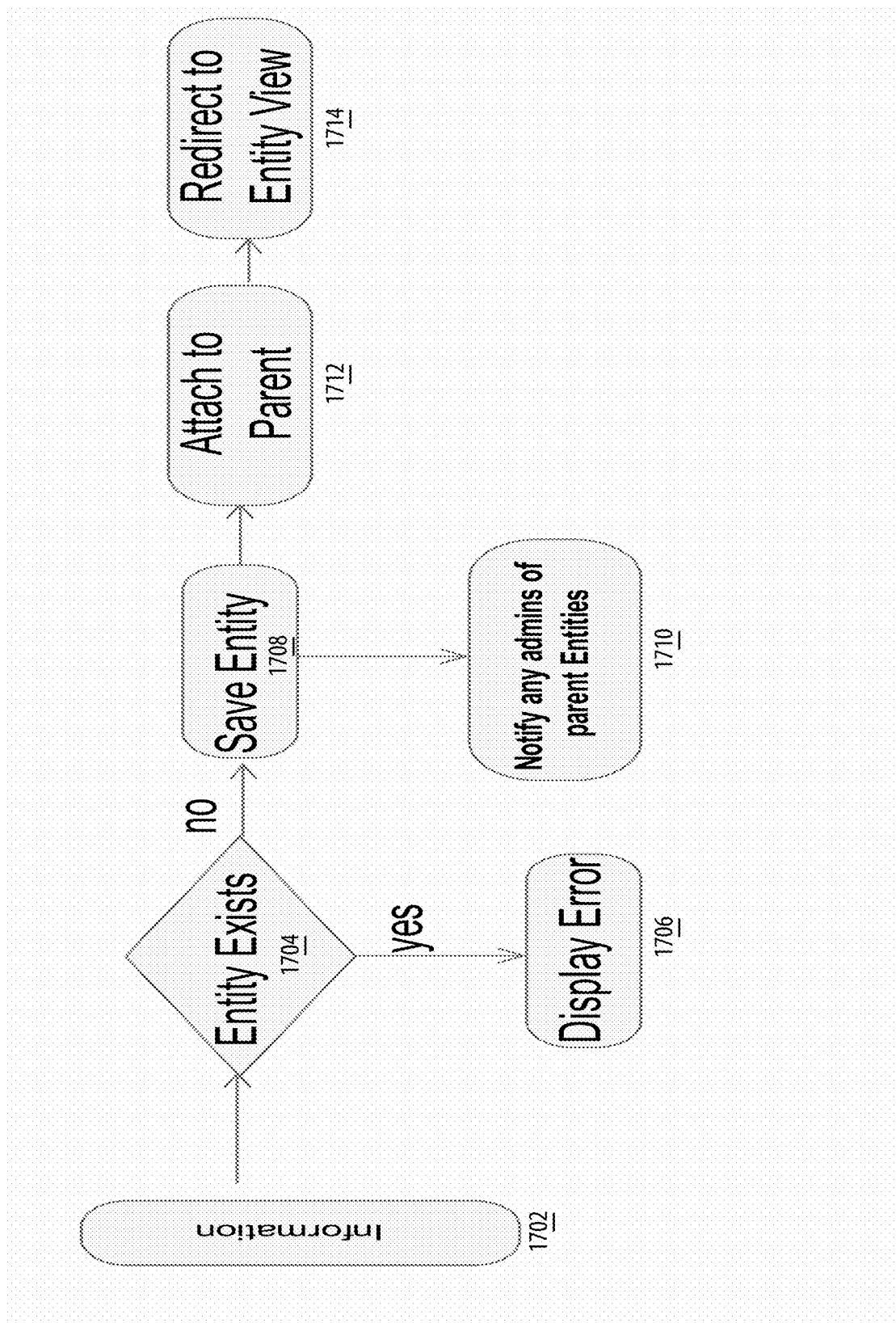
Fig.17: APEPS - Management Flowchart

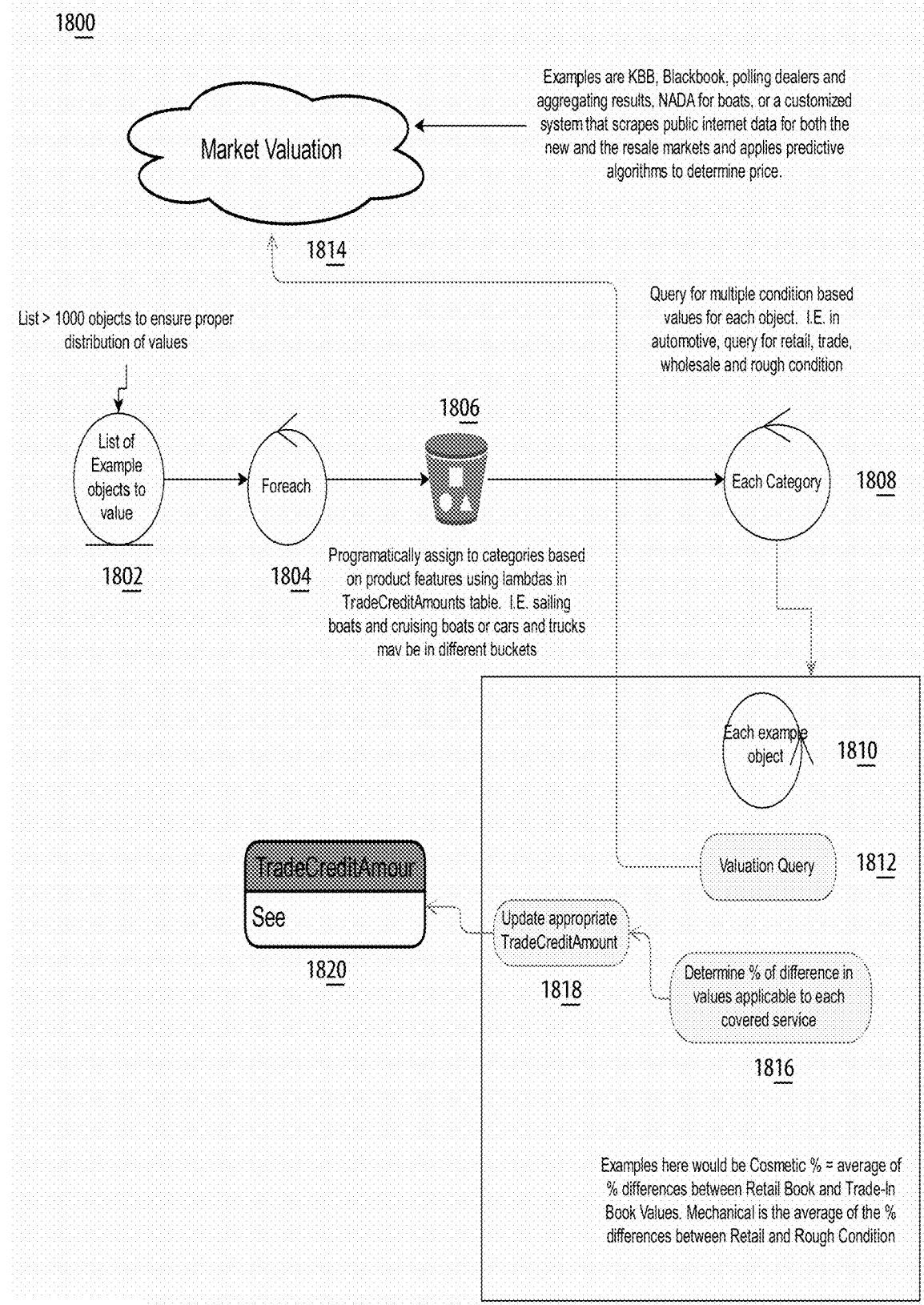
Fig.18: APEPS - Stored Trade Credit Flowchart

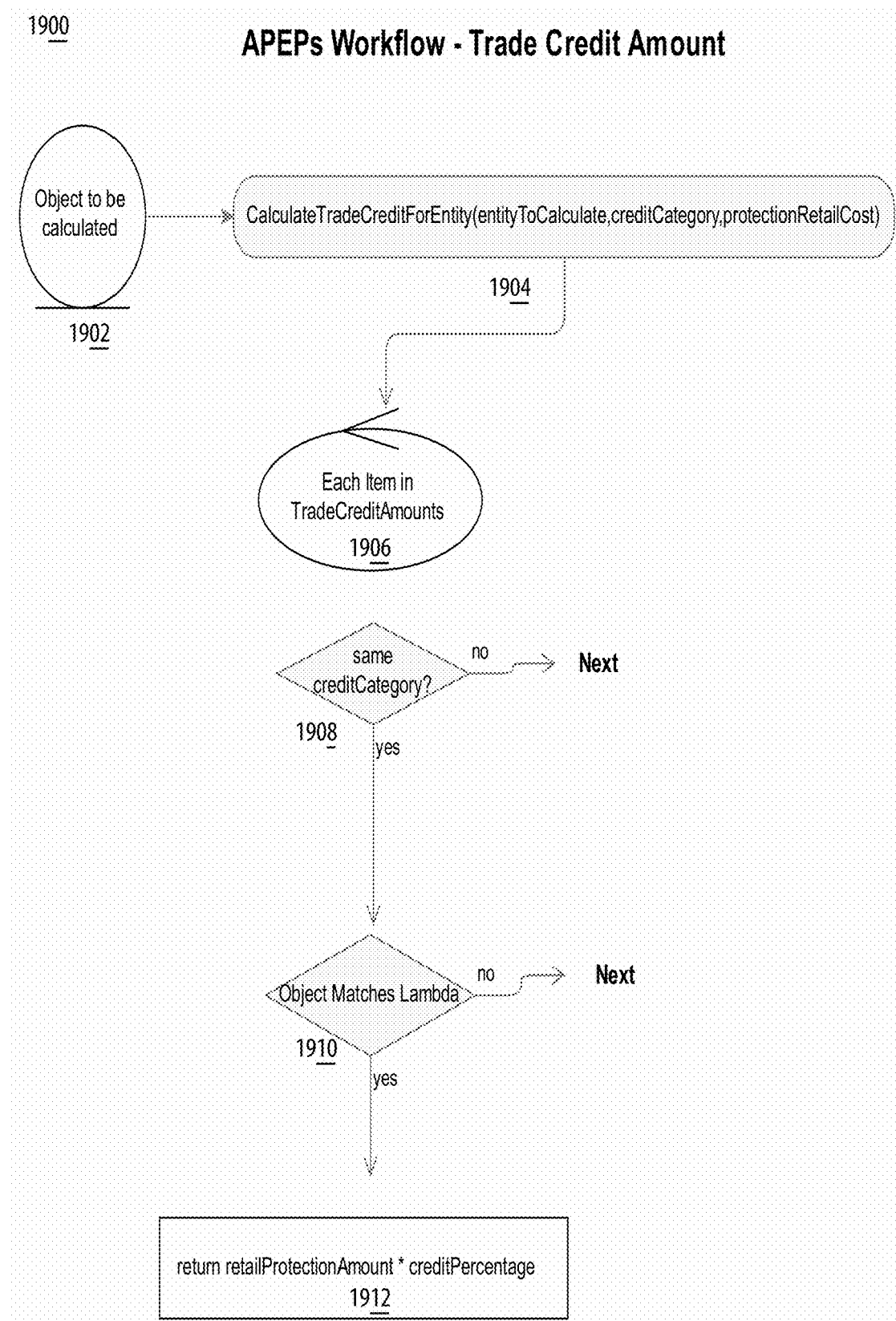
Fig.19: APEPS - Trade Credit Amount Flowchart

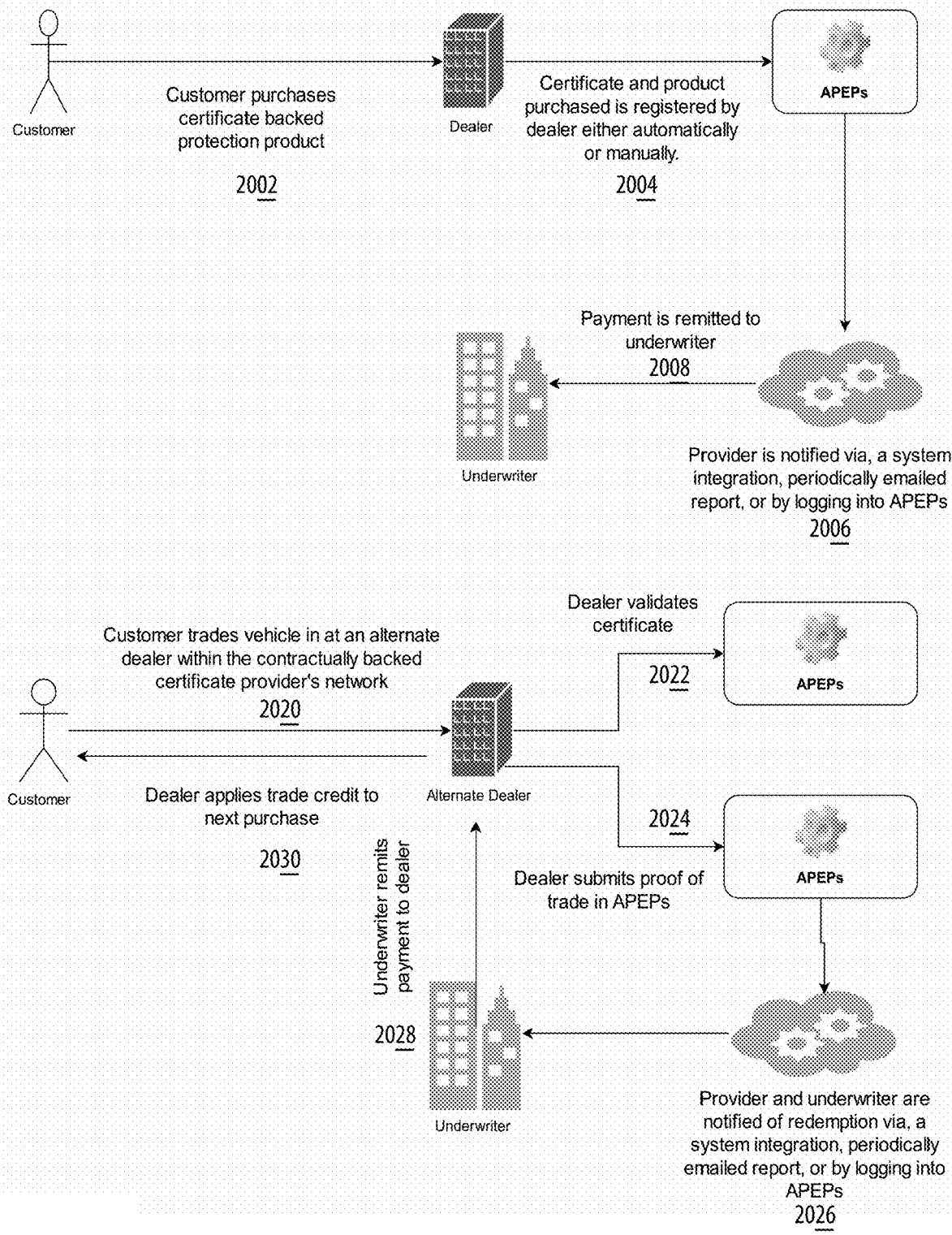
Fig.20: APEPS - Cross Dealer Redemption Flowchart

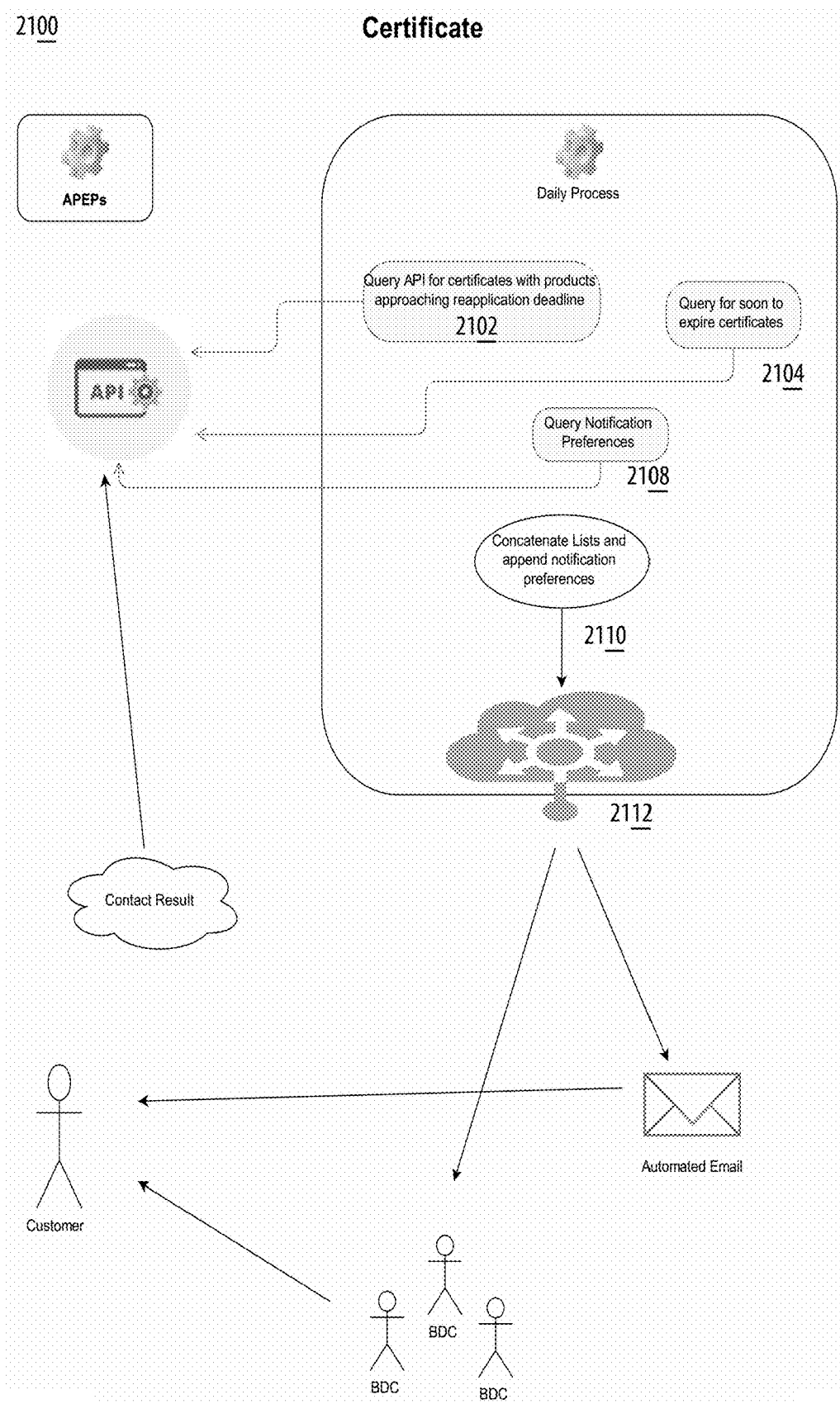
Fig.21: APEPS - Certificate Flowchart

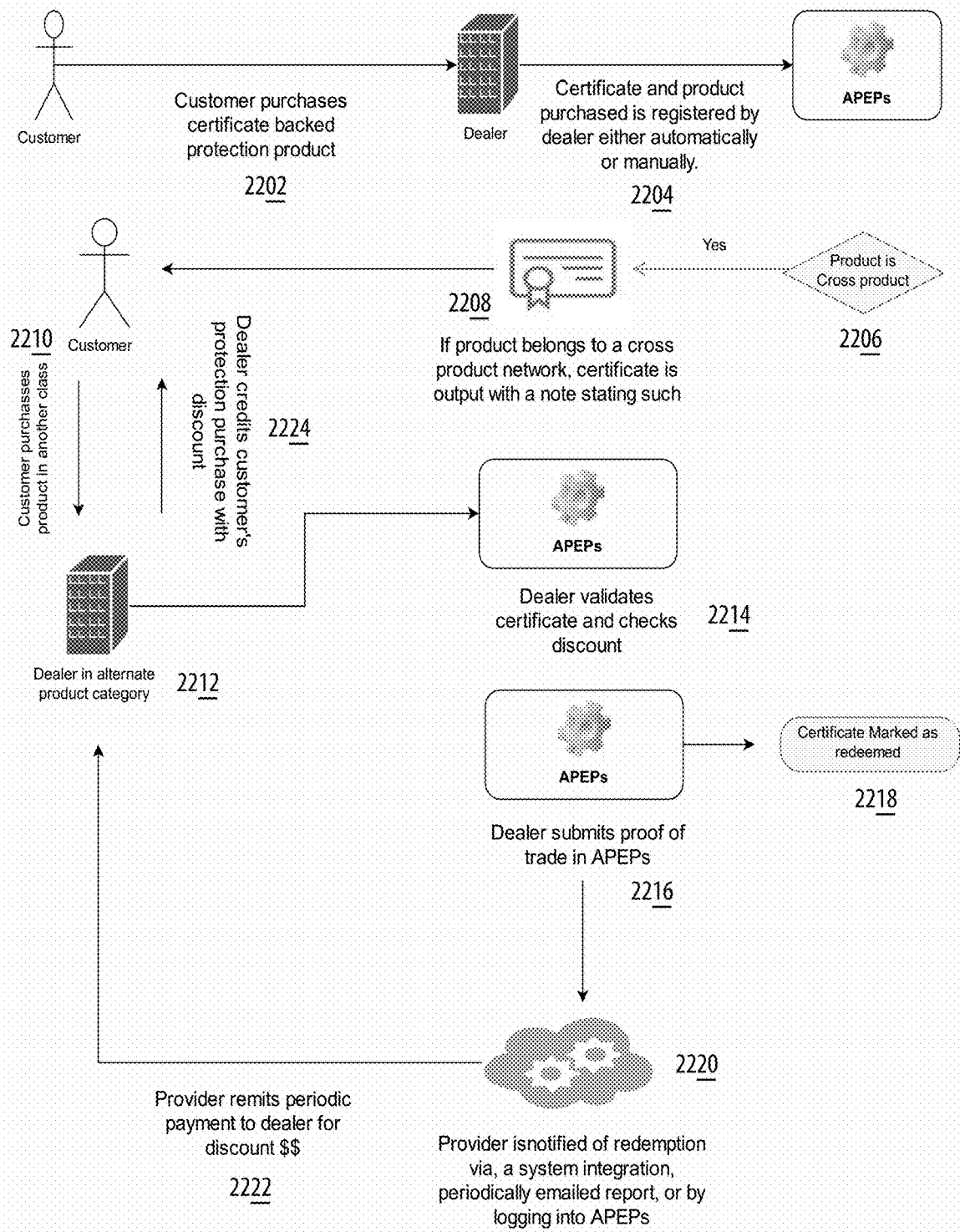
Fig.22: APEPS - Cross Product Category Certificate Flowchart

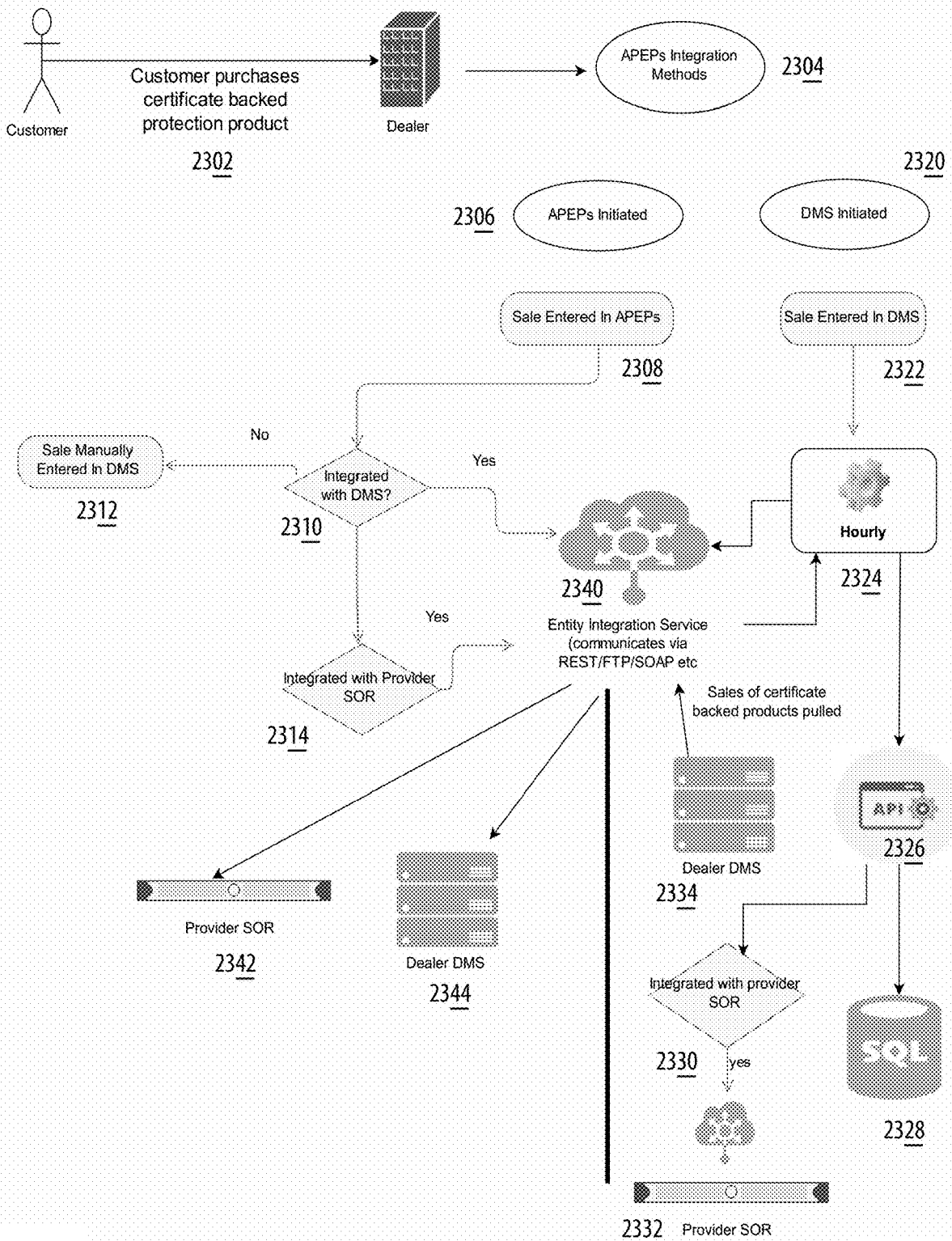
Fig.23: APEPS - Basic Certificate Purchase Flowchart

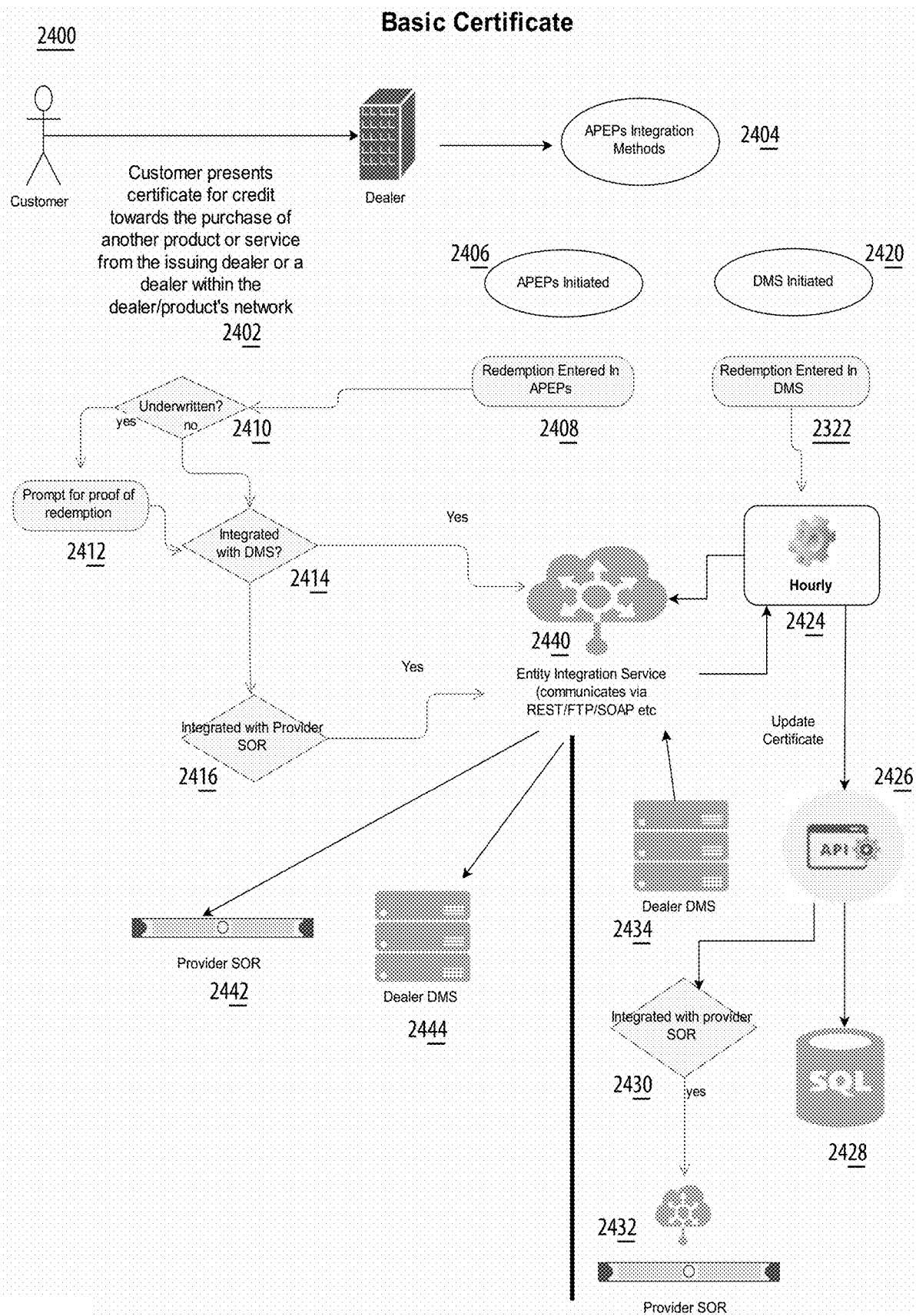
Fig.24: APEPS - Basic Certificate Redemption Flowchart

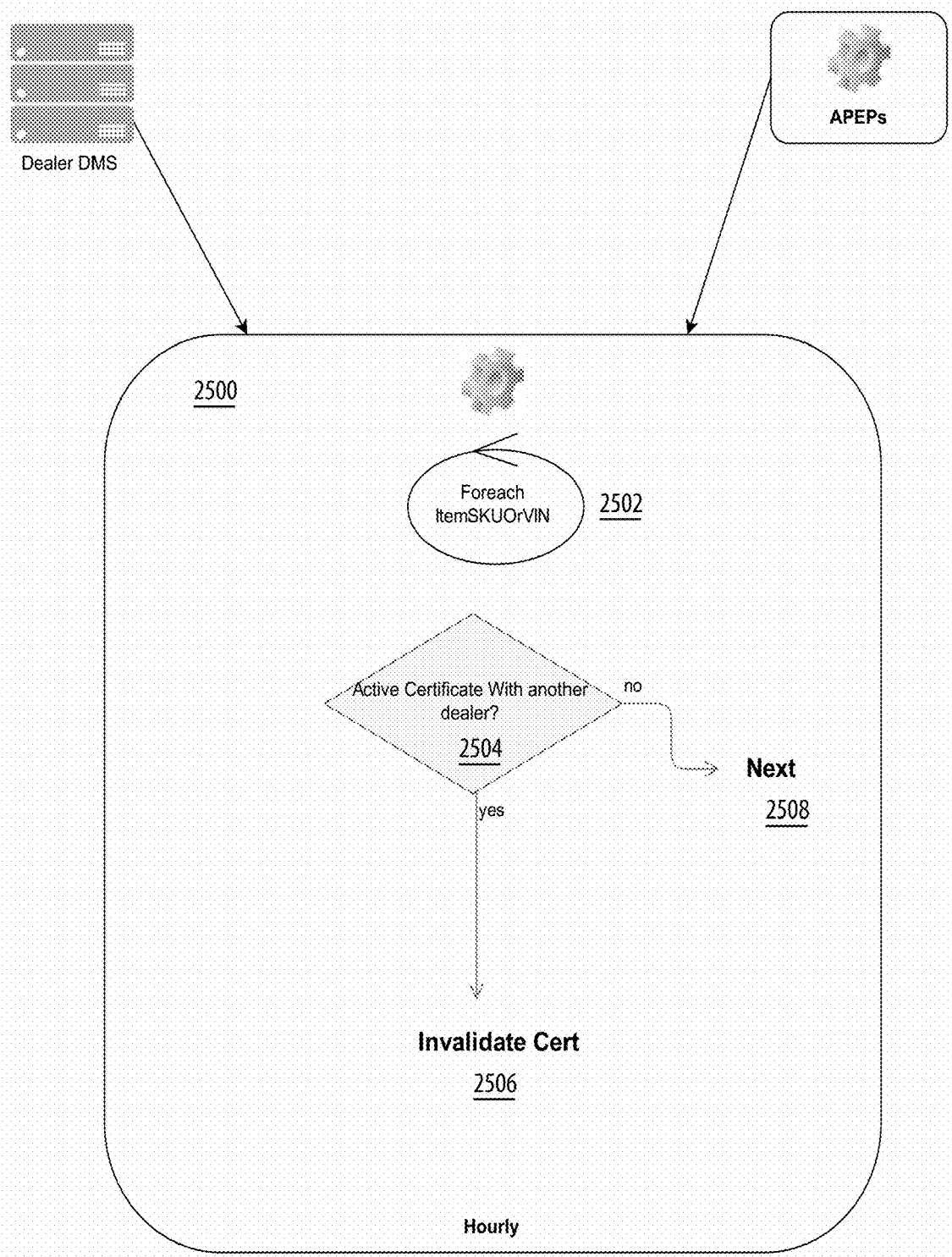
Fig.25: APEPS—Certificate Verification Flowchart

Login screen for Customers of

☐ Find Certificate http://certificate.apeps360.com

Welcome to

Please Enter your VIN and at least one of the additional pieces of information

VIN [                    ]

First Name [          ] AND

Last Name [          ]

Phone [          ]

Email [          ]

[ View ]

2600

Fig.26: APEPS - Customer Login Screen

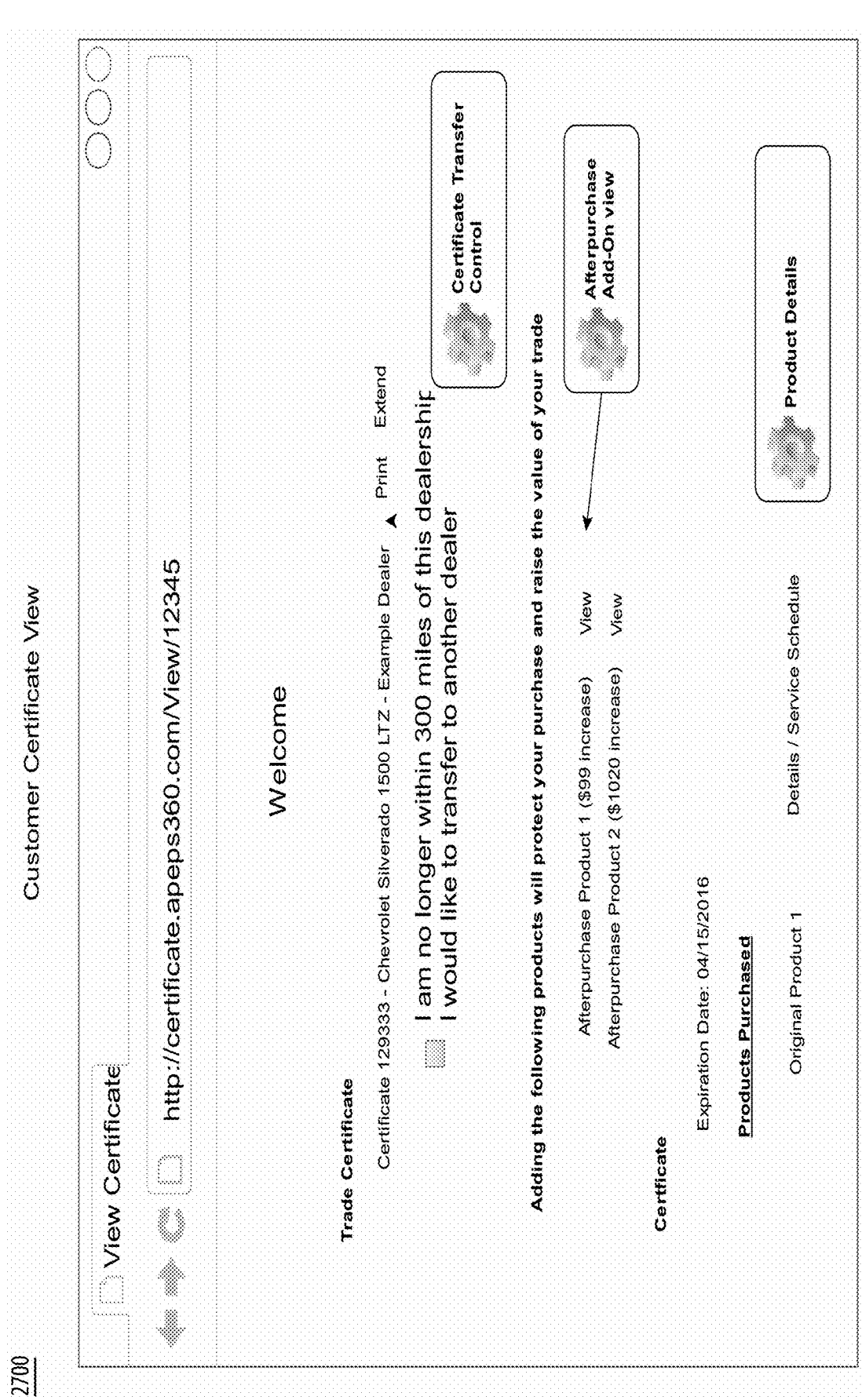
Fig. 27: APEPS - Customer Certificate View Screen

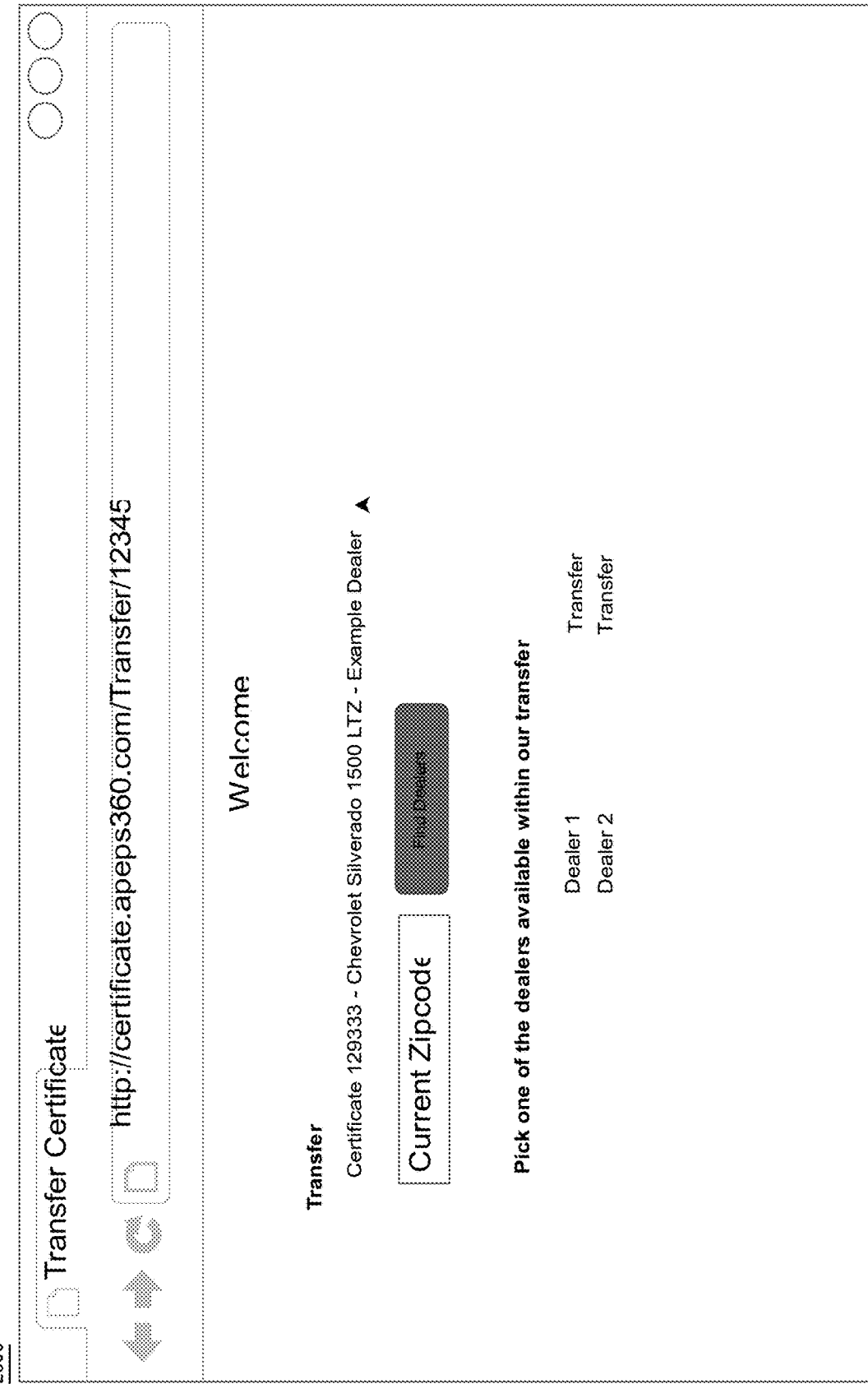
Fig.28: APEPS - Customer Transfer Certificate Screen

Fig.29: APEPS - Customer Certificate View Screen

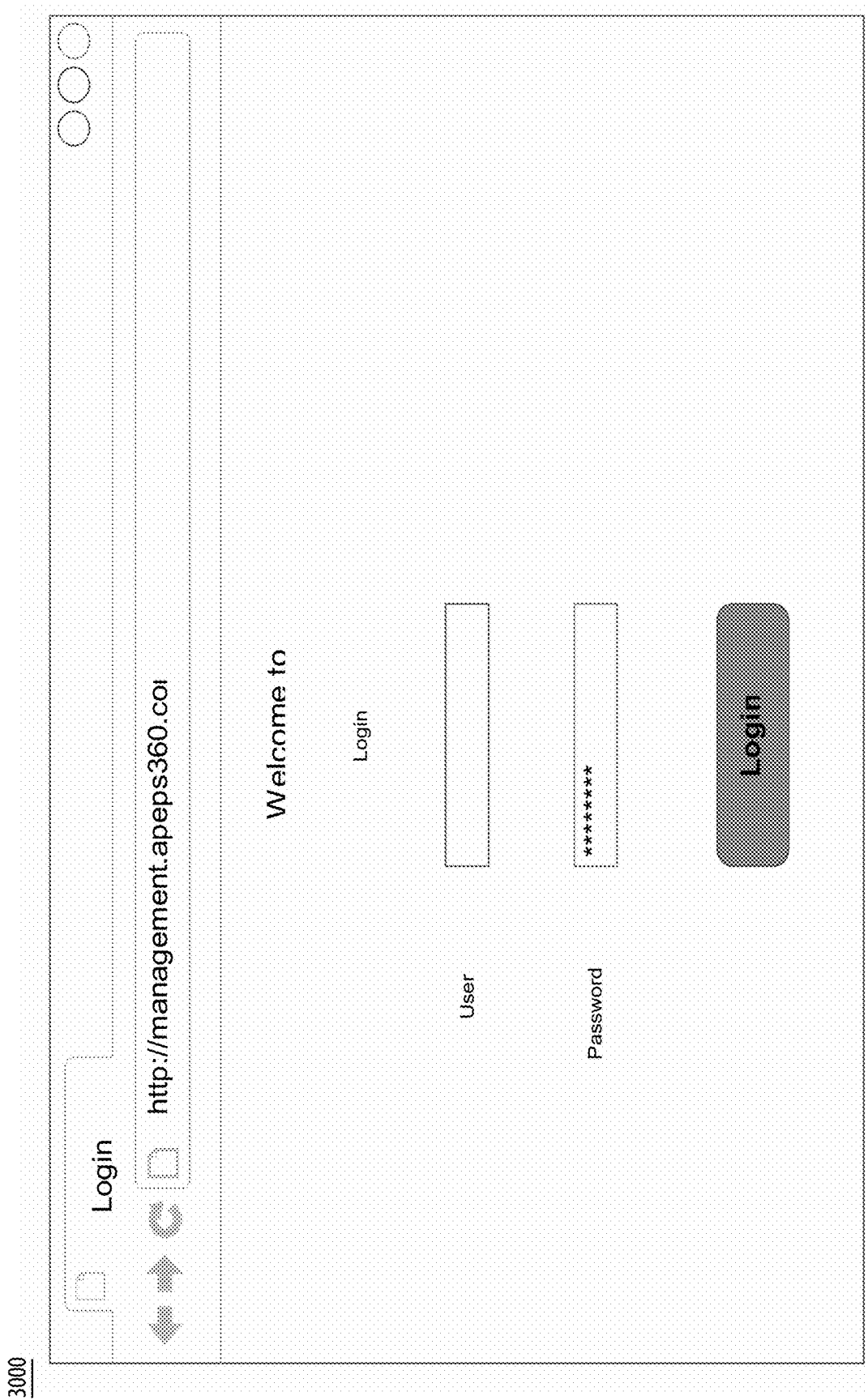
Fig.30: APEPS - Management Login Screen

Fig. 31: APEPS - Management Admin Screen

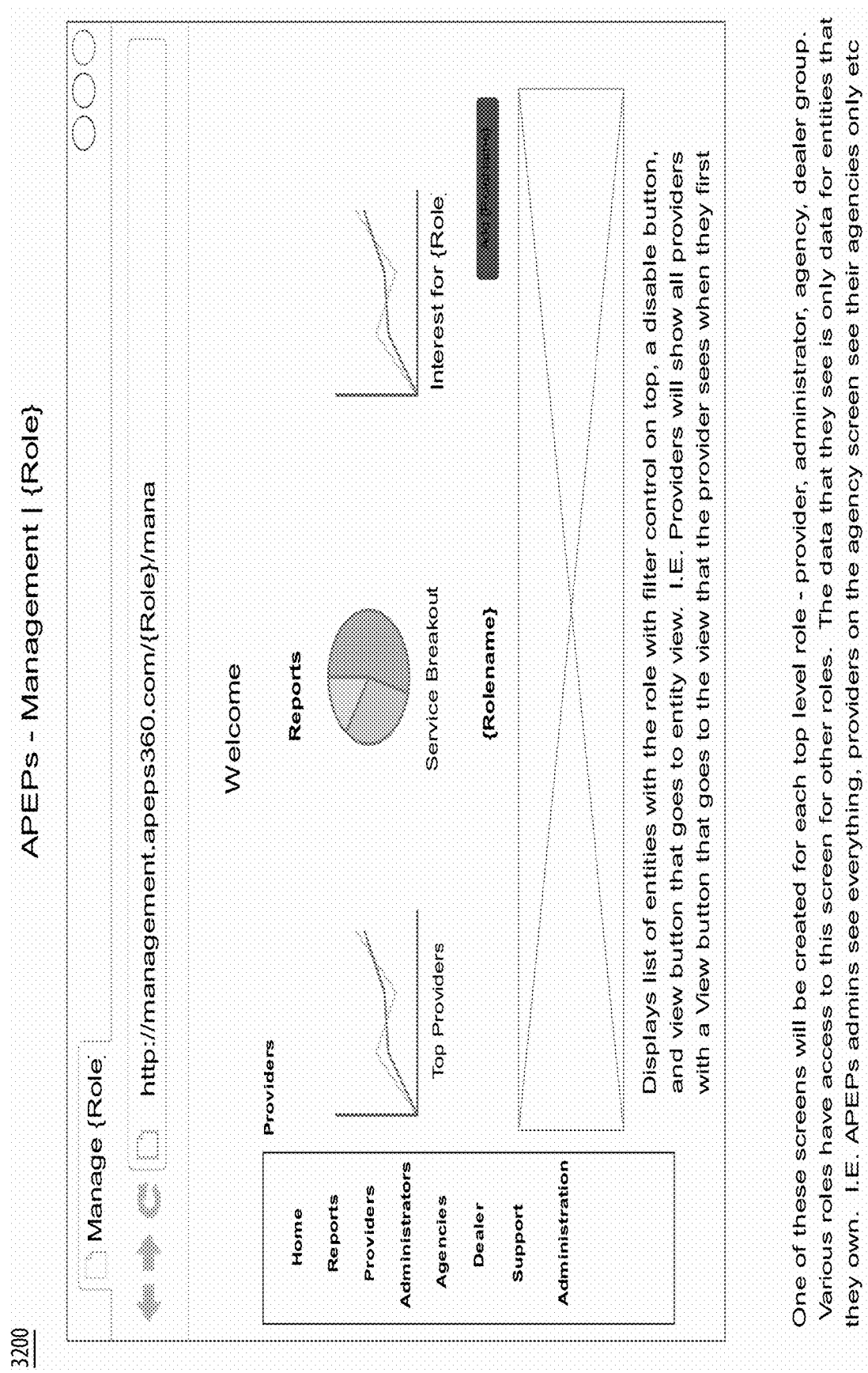
Fig.32: APEPS - Management Role Screen

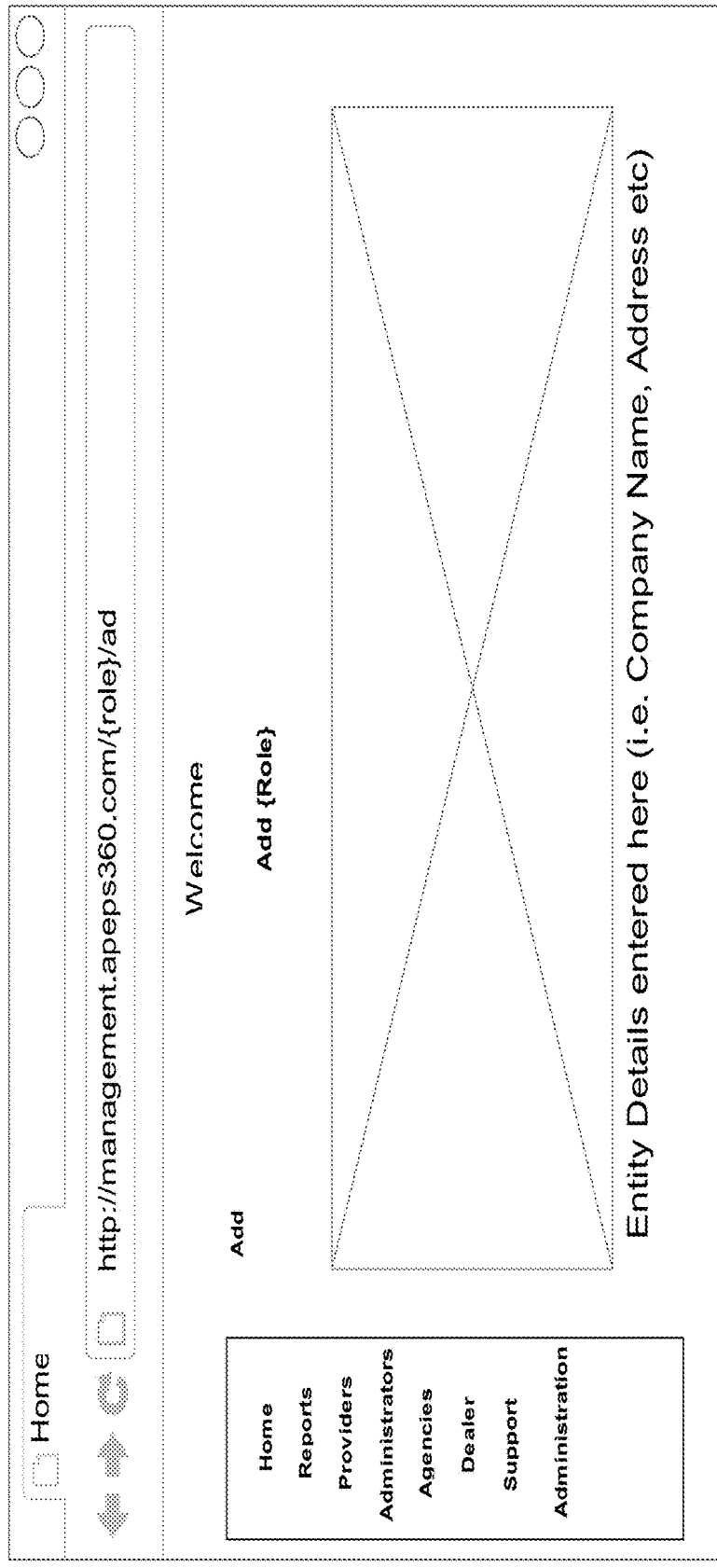
Fig.33: APEPS - Management Add Role Screen

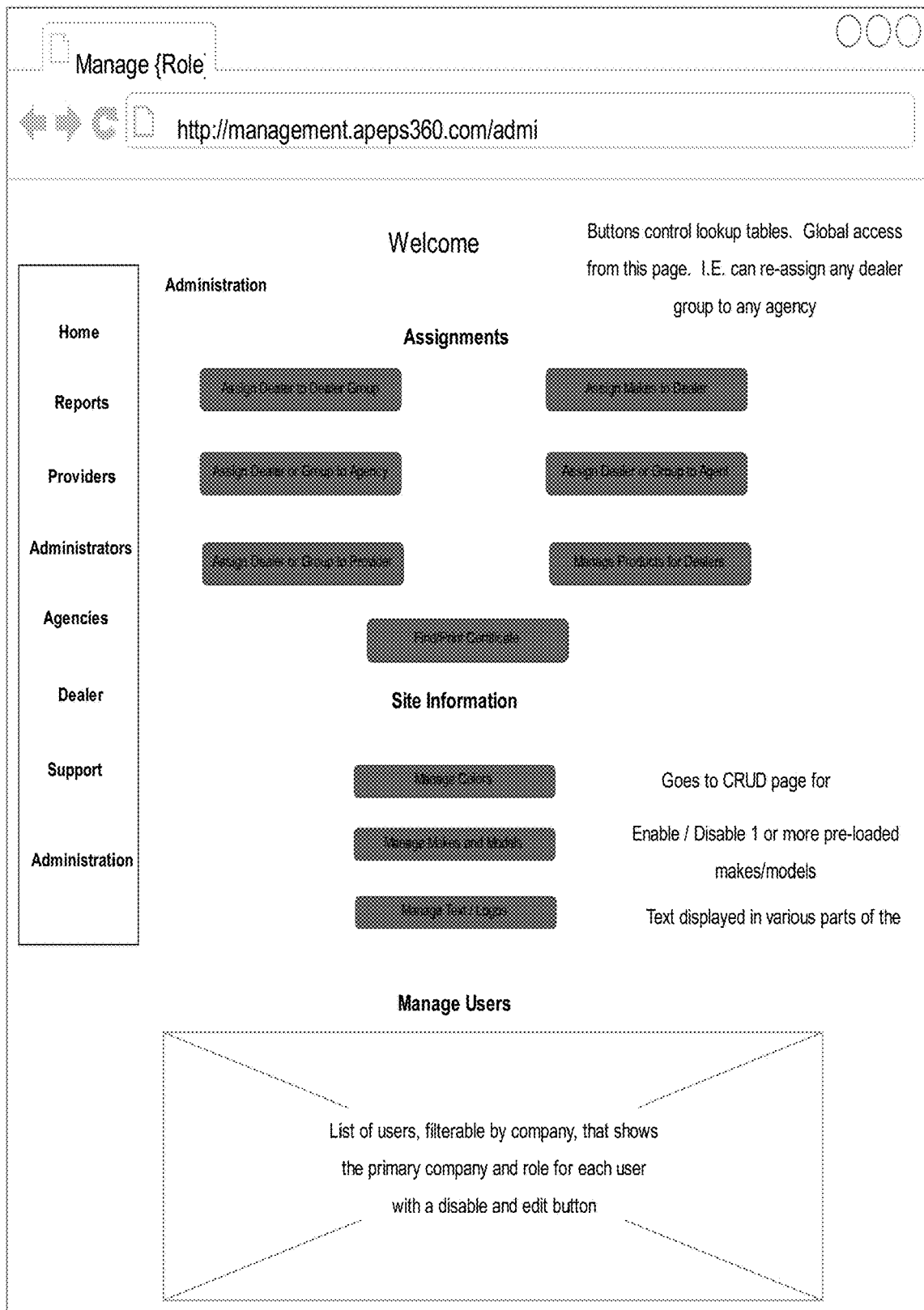
Fig.34: APEPS - Management Administration Screen

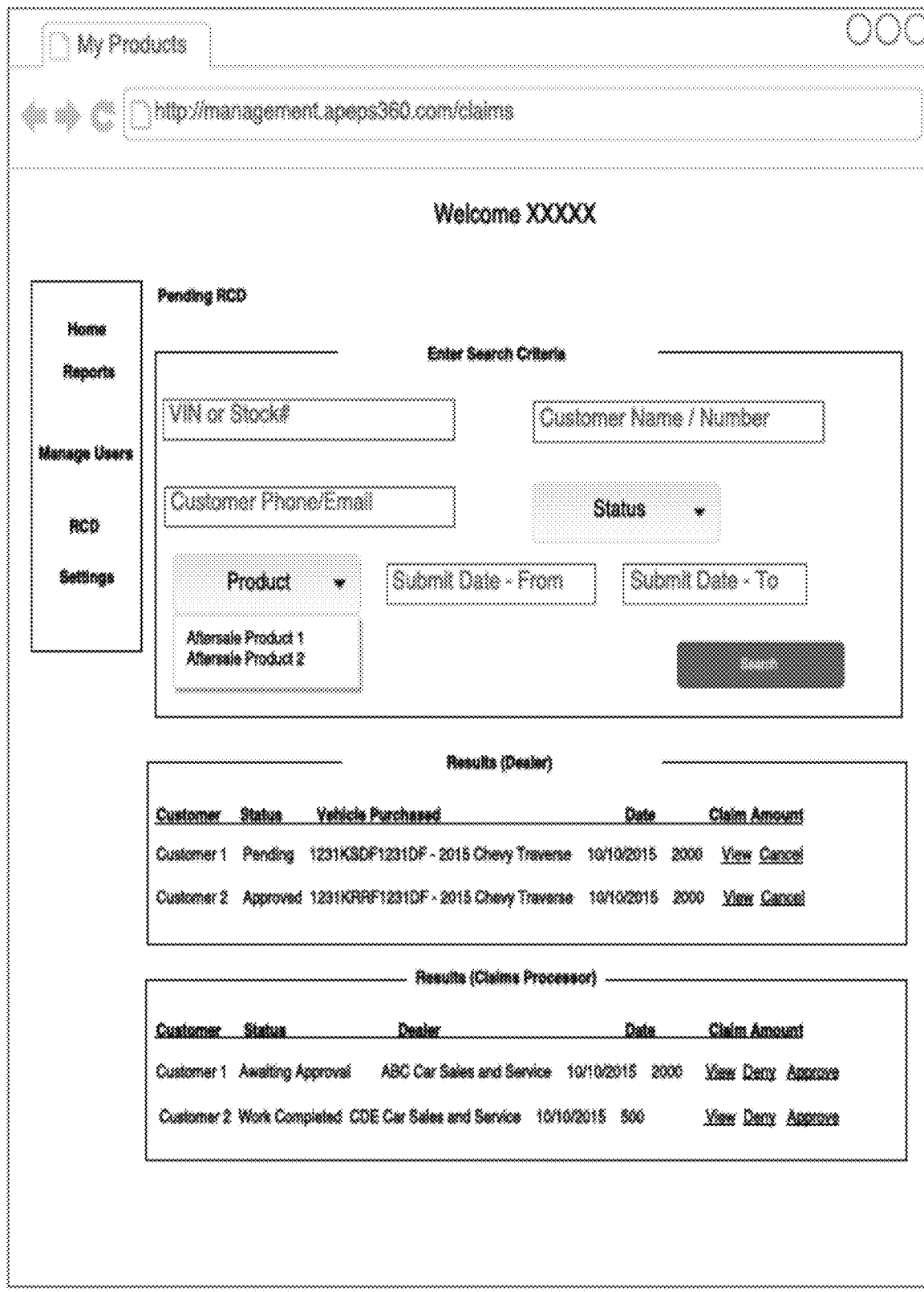
Fig.35: APEPS - Management RCD Search Screen

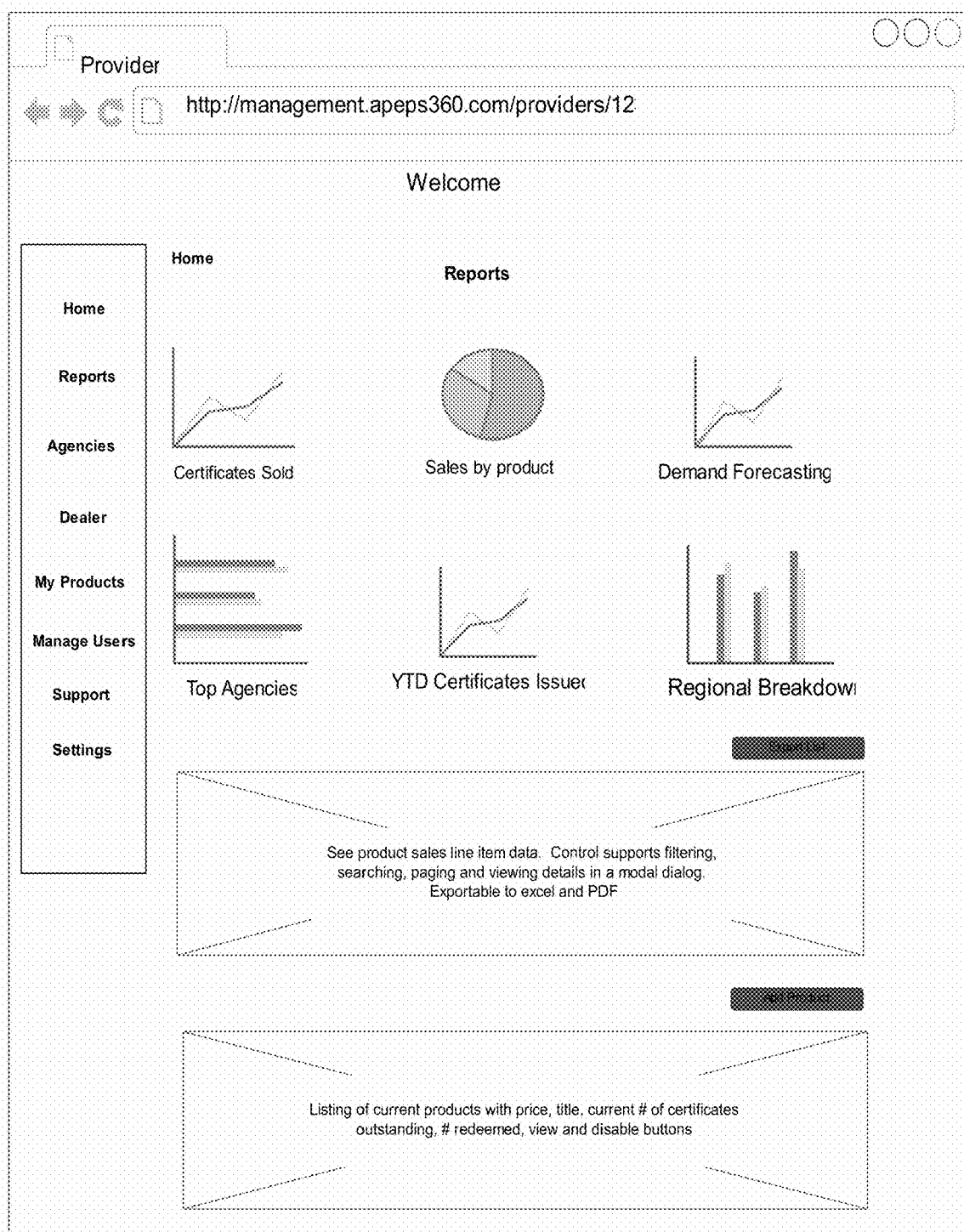
Fig.36: APEPS - Provider Portal Screen

3700

APEPs - Provider Portal - My Products

My Products http://management.apeps360.com/providers/1234/produ

Welcome

Home

My Products

Home

Title

Reports

Dealer Cost

Agencies

Website

Dealer

Expiration Date

My Products

Description

Manage Users

Support

Settings

Listing of current products with price, title, current # of certificates outstanding, # redeemed, view (populates form above), view sales and enable/disable buttons See product sales line item data for product clicked above. Control supports filtering, searching, paging and viewing details of sale in a modal dialog. Exportable to excel and PDF

Fig.37: APEPS - Provider Portal My Products Screen

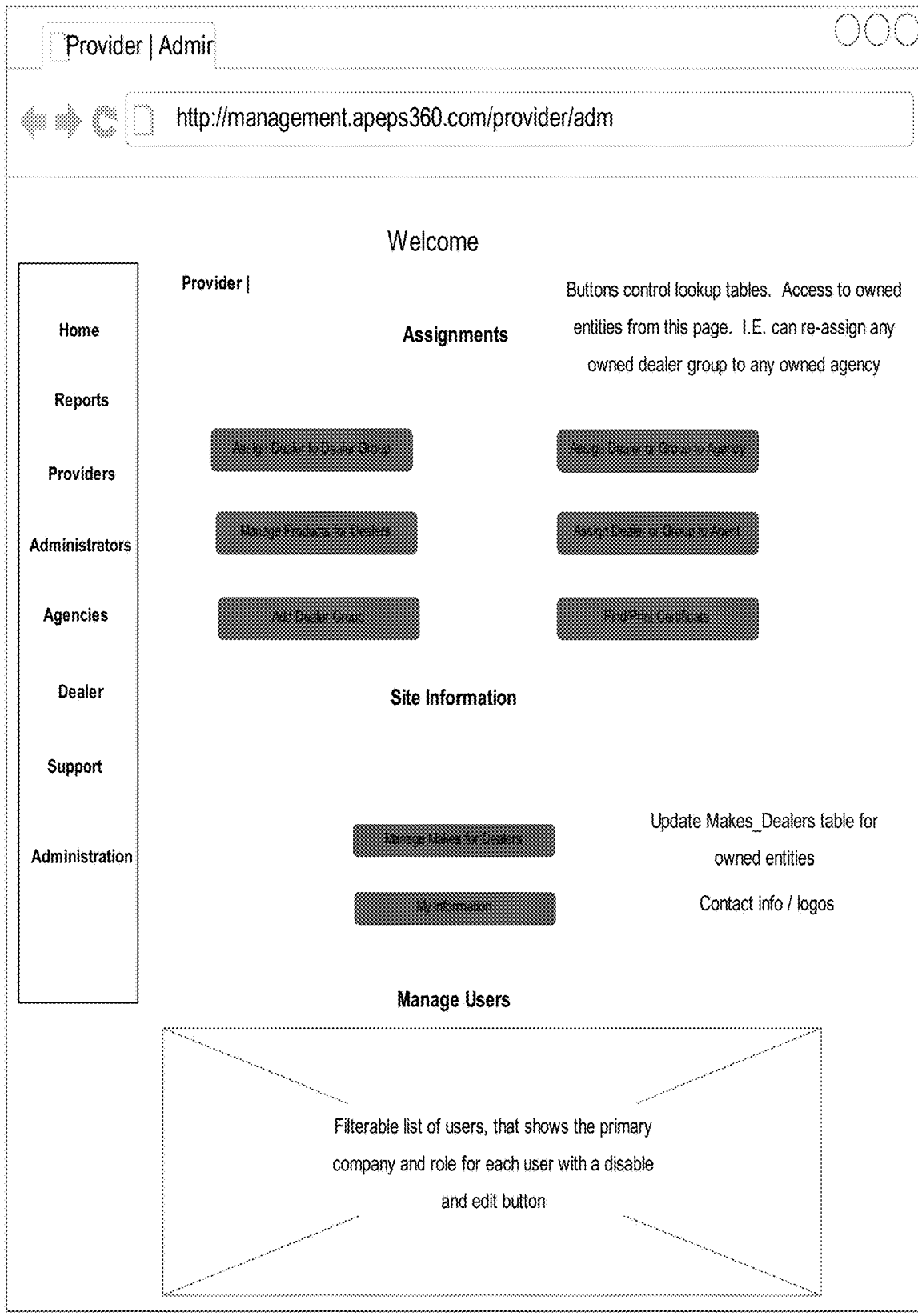
Fig.38: APEPS - Provider Administration Screen

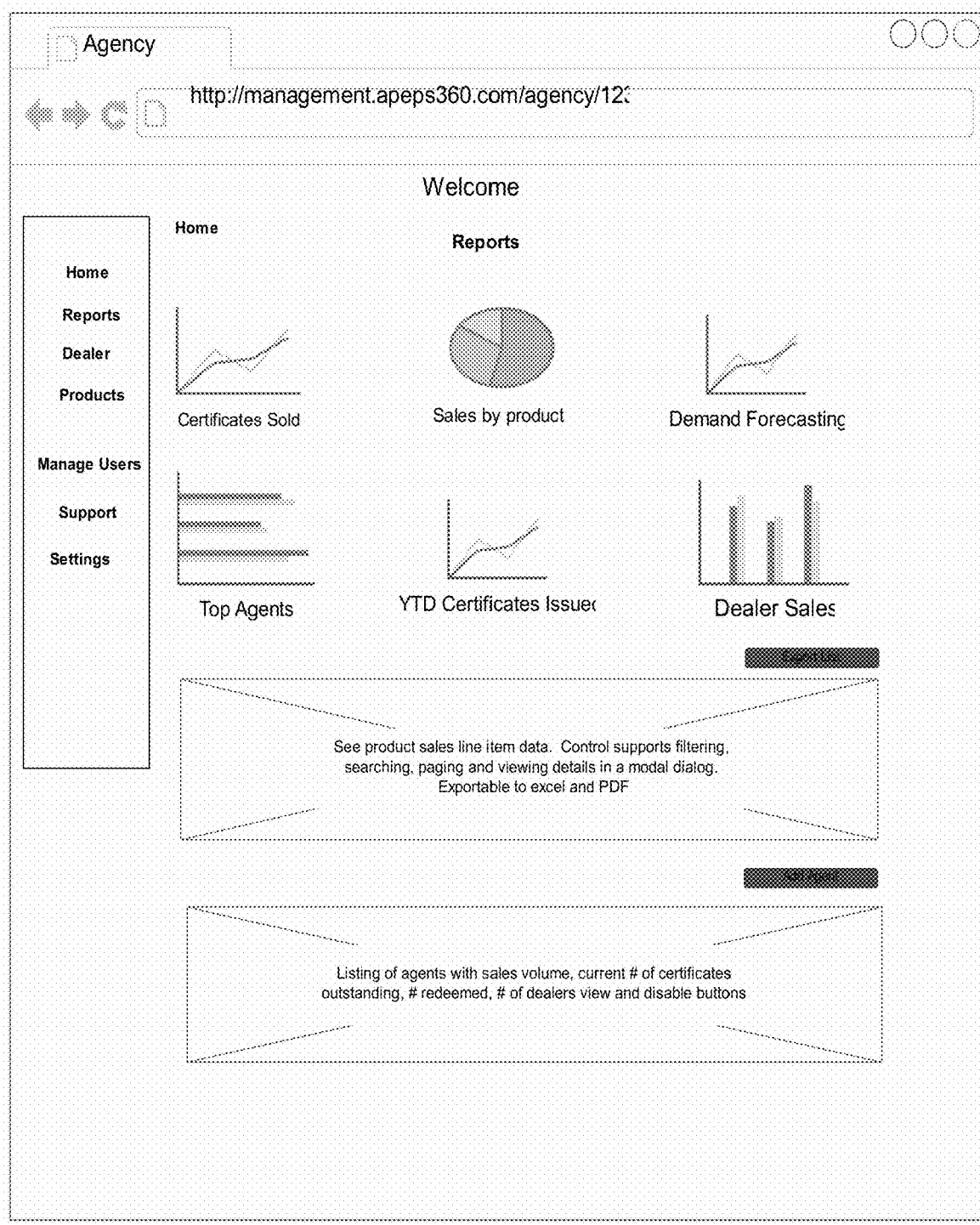
Fig.39: APEPS - Agency Portal Screen

4000 APEPs - Agency - Products

Agency | Products http://management.apeps360.com/agency/1234/produc

Welcome

Agency |

Product Reports

Certificates Sold  Sales by product  Demand Forecasting

Top Agents  YTD Certificates Issued  Dealer Sales

Home
Reports
Dealer
Products
Manage Users
Support
Settings

My Products

Listing of current products with price, title, current # of certificates outstanding, # redeemed, view (pops up information in modal dialog), view sales and enable/disable buttons

Sales

See product sales line item data for product clicked above. Control supports filtering, searching, paging and viewing details of sale in a modal dialog. Exportable to excel and PDF

All Products

Listing of all available products with price, title, etc. view (pops up information in a modal) and Request|Remove buttons.

Fig.40: APEPS - Agency Product Screen

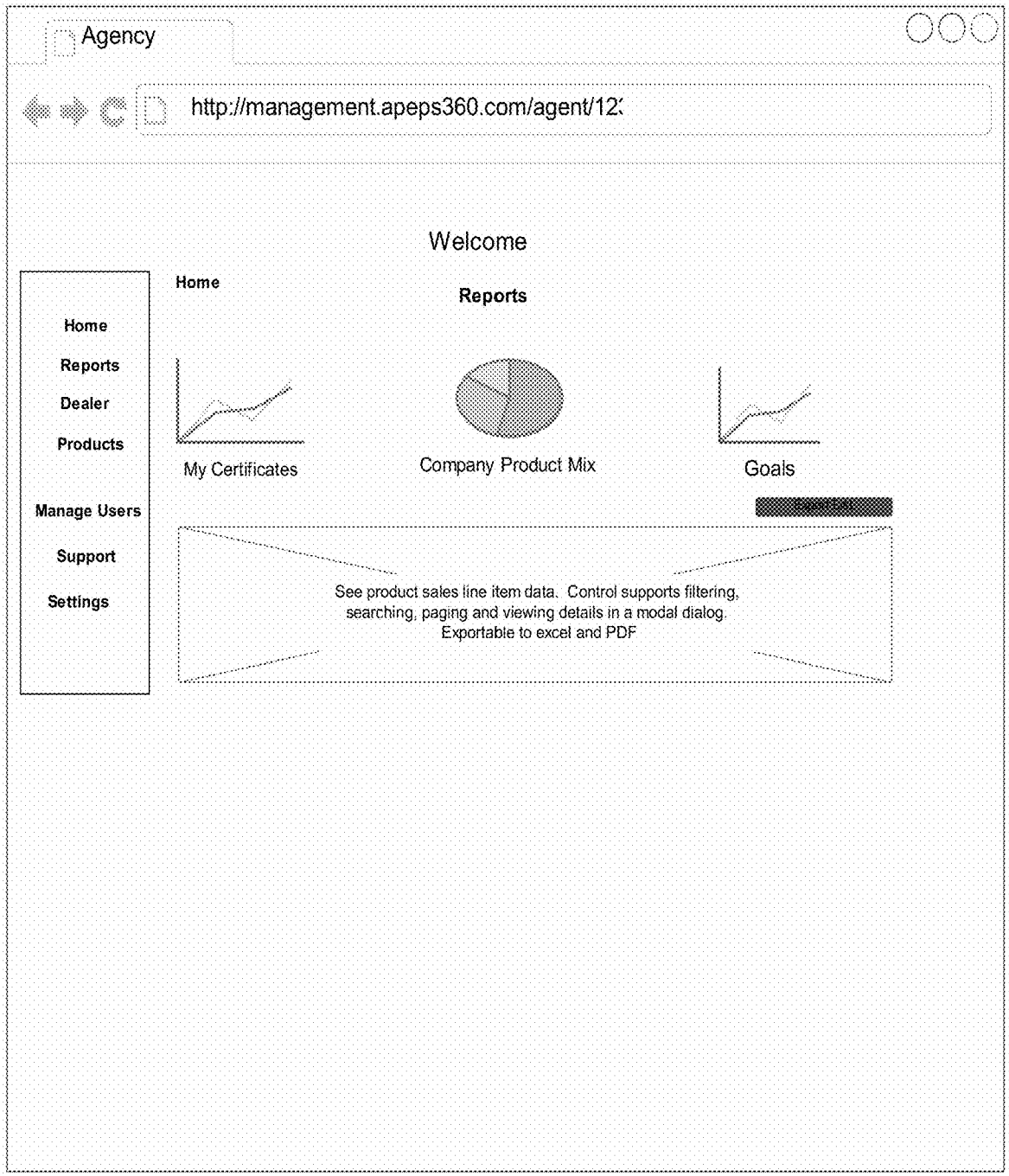

Dealer groups goes to the appropriate APEPs - Management (Role) screen. Manage Users goes to the generic user management screen which only allows entities to add users to their own child entities. Add Agent button goes to the User Management Screen.

Support just goes to a generic support page.

Settings goes to the admin page for agents (below). Products goes to my products page below.

Fig.41: APEPS - Agent Portal Screen

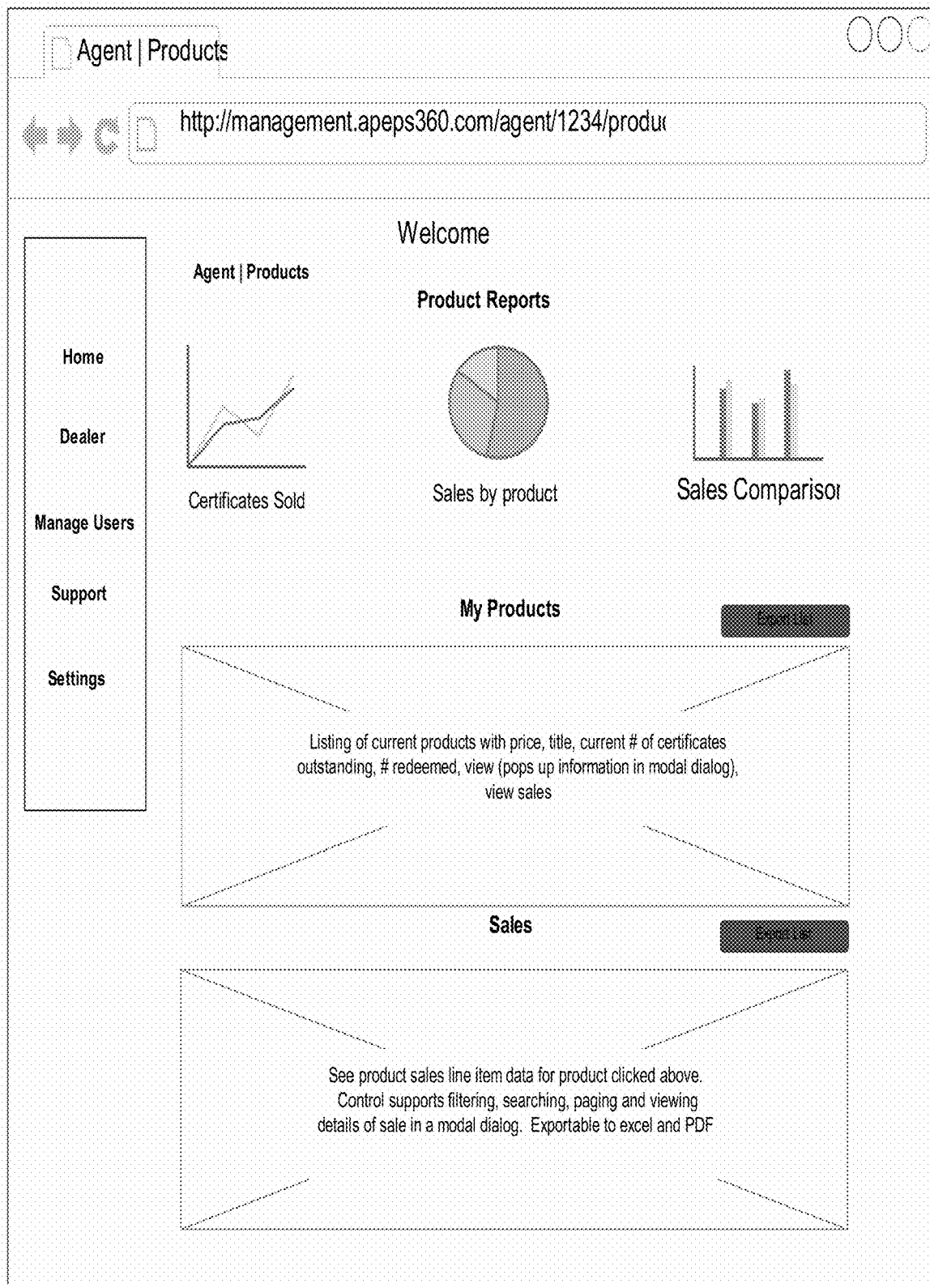
Fig.42: APEPS - Agent Product Screen

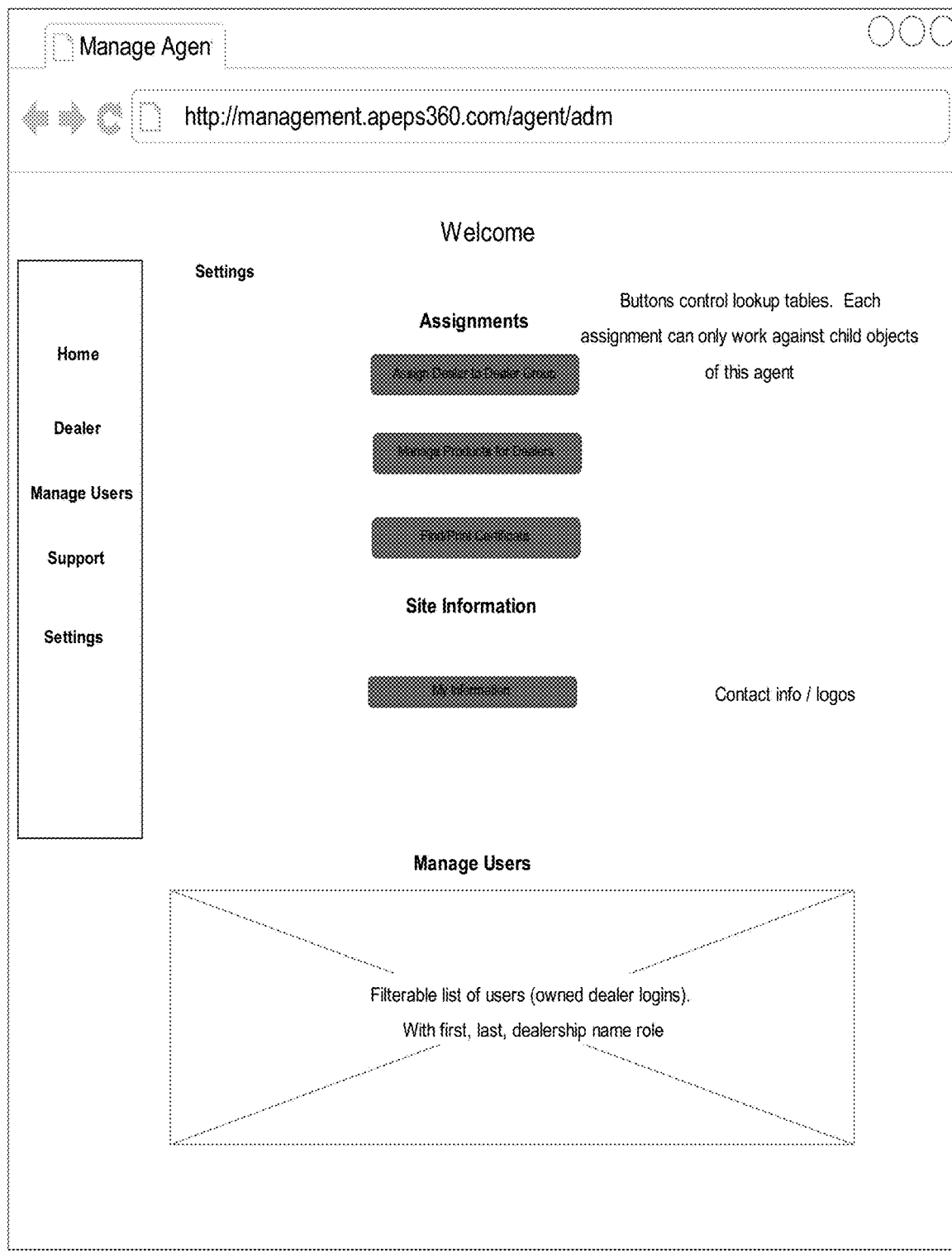
Fig.43: APEPS - Agent Settings Screen

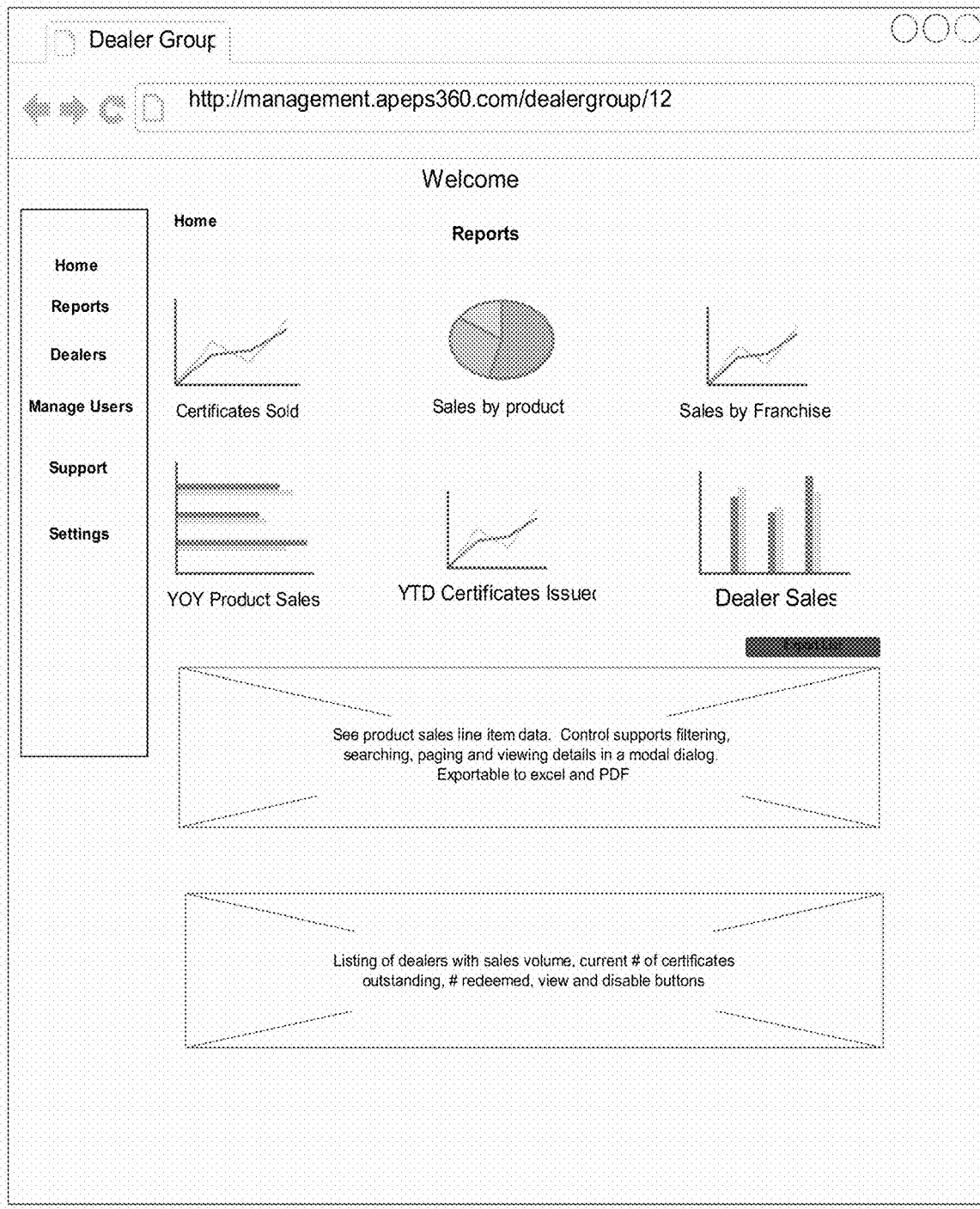
Dealers goes to APEPs - Management | {Role} screen
Manage Users goes to the generic user management screen which only allows entities to add users to their own child entities.
Support just goes to a generic support page.
Settings goes to the admin page for Dealer Groups (below). Products goes to my products page below.
Fig.44: APEPS - Dealer Group Portal Screen

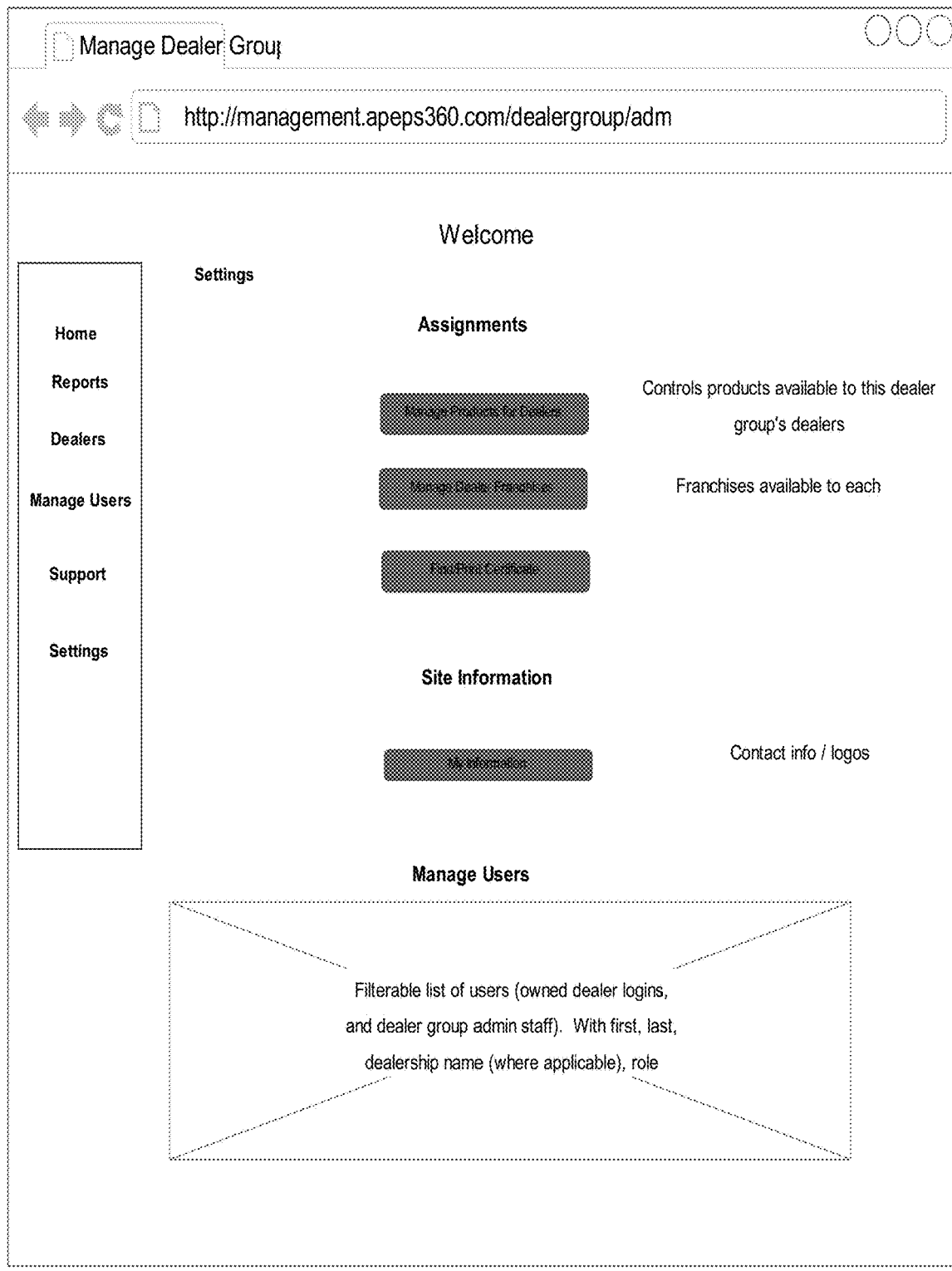
Fig.45: APEPS - Dealer Group Settings Screen

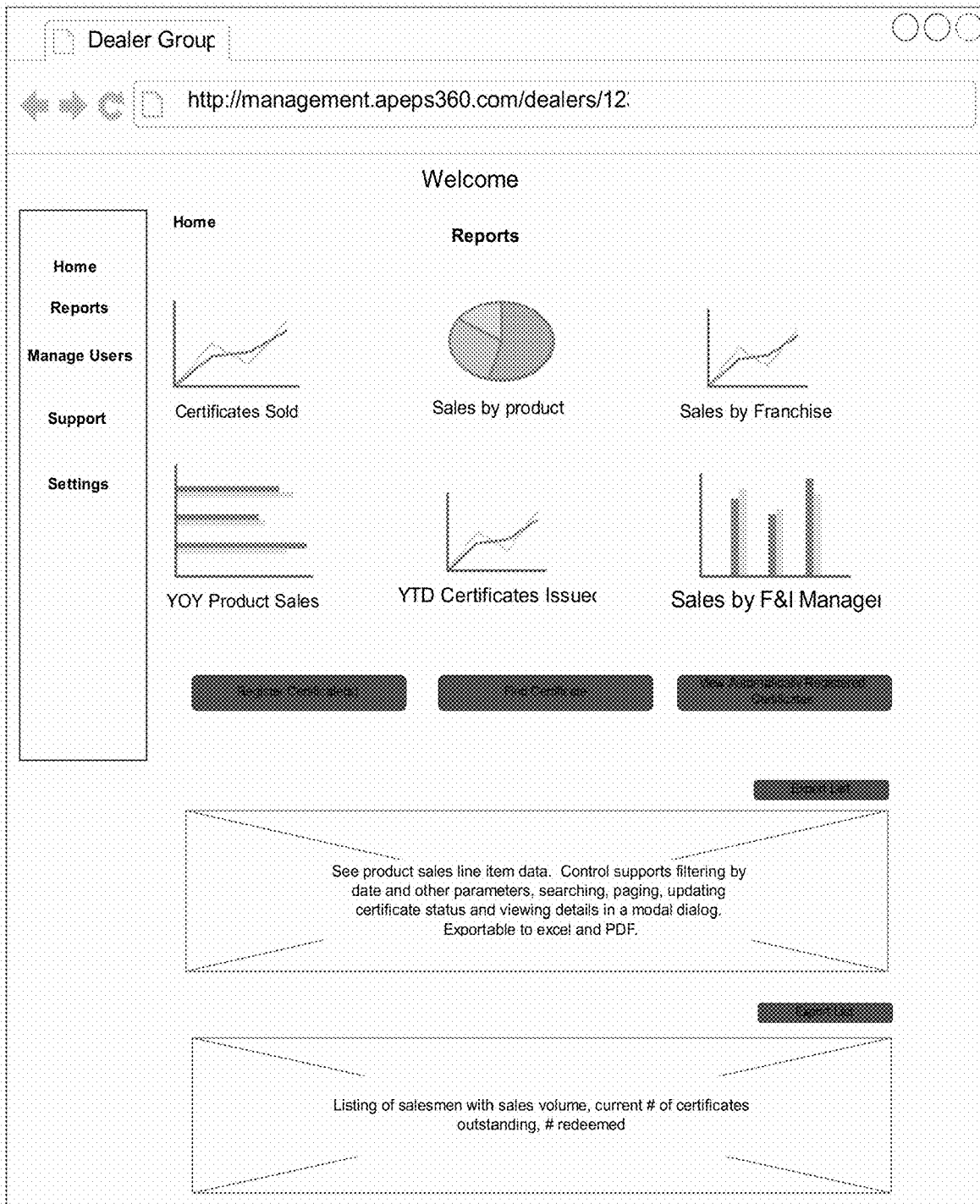
Fig.46: APEPS - Dealer Portal Screen

4700

APEPs - Dealer Portal - Register Certificate(s)

☐ My Products http://management.apeps360.com/certificates/regist

Welcome

Sidebar:
- Home
- Reports
- Manage Users
- Support
- Settings

Register

Stock Number [Lookup]  — If system is getting an inventory feed or is linked to the dealer's DMS, then a lookup button will display that will auto-populate known vehicle data Date Purchased New/Used ▼ | Year ▼ | Make ▼ | Model ▼

New
Used

Style ▼ | Mileage

LT
SLT

Color (optional)

VIN xxxxxxxxxxxxxxxxx     ( *Valid Certificate Found - Invalidate )

F&I Manager [Lookup]     Lookup will search for existing salespeople/F&I managers with the same/similar names and populate the field. If similar or no name is found, it will prompt for use and allow addition of person to the salesperson &/or F&I table just by clicking add.

Salesperson of record [Lookup]

Notes

[Cancel] [Add Customer]

Fig.47: APEPS - Dealer Portal Register Certificate Screen

4800 APEPs - Dealer Portal - Register Certificate(s) - Customer

☐ My Products http://management.apeps360.com/certificates/register/1234/customer/a Welcome Home
Reports Manage Users Support Settings Register Certificate - Add 2015 Chevrolet Traverse LT - Stock#

Customer Name / Number     [Lookup]     Searches the customers table which may or may not be linked to the Dealer's DMS First Name     Middle Name     Last Name Address 1

Address 2

City     State /     Zip

Notes

[Cancel]   [Back]   [Add Product]

Fig.48: APEPS—Dealer Portal Register Certificate Customer Screen

4900

APEPs - Dealer Portal - Register Certificate(s) - Product

My Products http://management.apeps360.com/certificates/register/1234/products/a Welcome Home
Reports
Manage Users
Support
Settings Register Certificate - Add 2015 Chevrolet Traverse LT - Stock#

John Smith - XXX,

Select a ▼

Aftersale Product 1
Aftersale Product 2

Added

Aftersale product 1

Prepopulate cost/sales to values from dealers_products table.
Prepopulate Date Purchased to the purchase date of the vehicle Date Purchased | Dealer Cost | Retail sales price Aftersale product 2

Date Purchased | Dealer Cost | Retail sales price

Profit - $79.99

Trade In Credit -

Fig.49: APEPS—Dealer Portal Register Certificate Product Screen

5000    APEPs - Dealer Portal - Find Certificates

My Products http://management.apeps360.com/certificate

Welcome

Find

Home

Reports

Manage Users

Support

Settings

Enter Search

VIN or Stock#

Customer Name / Number

Customer Phone/Email

Profit >

Profit <

Product ▼
- Aftersale Product 1
- Aftersale Product 2

Purchase Date- From

Purchase Date- To

Search

Results

| Customer | Vehicle Purchased | Date | Retail | Profit | Trade | | |
|---|---|---|---|---|---|---|---|
| Customer 1 | 1231KSDF1231DF - 2015 Chevy Traverse | 10/10/2015 | 2000 | 99 | 1300 | Product Print | Invalidate |
| Customer 1 | 1231KSDF1231DF - 2015 Chevy Traverse | 10/10/2015 | 2000 | 99 | 1300 | Product Print | Invalidate |
| Customer 1 | 1231KSDF1231DF - 2015 Chevy Traverse | 10/10/2015 | 2000 | 99 | 1300 | Product Print | Invalidate |

Fig.50: APEPS - Dealer Portal Find Certificate Screen

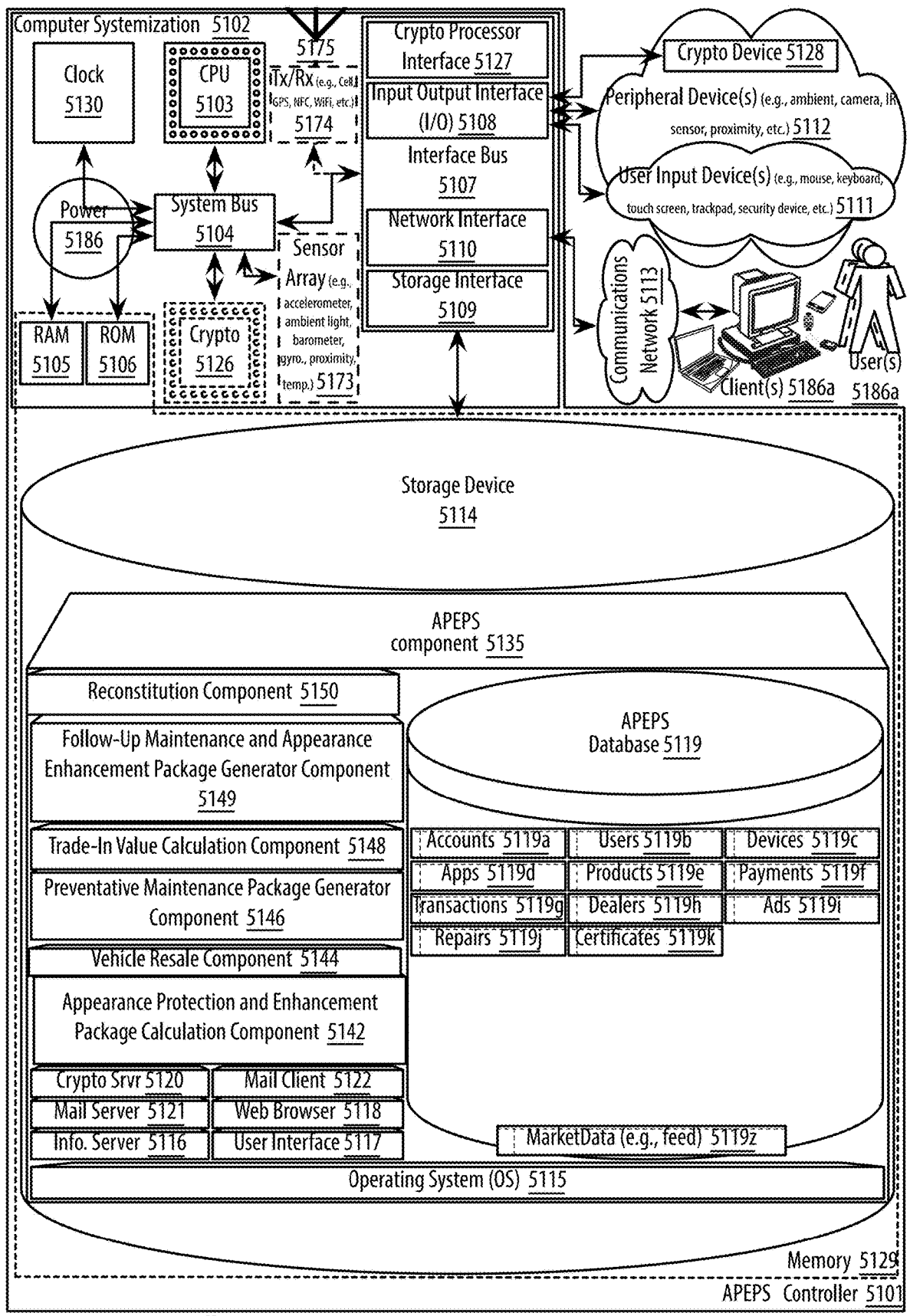
Fig.51: APEPS—Controller

VEHICLE APPEARANCE PROTECTION AND ENHANCEMENT APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 119 as a non-provisional conversion of: U.S. provisional patent application Ser. No. 62/126,699, filed Mar. 1, 2015, entitled "VEHICLE APPEARANCE PROTECTION AND ENHANCEMENT APPARATUSES, METHODS AND SYSTEMS".

Applicant hereby claims benefit to priority under 35 USC § 119 as a non-provisional conversion of: U.S. provisional patent application Ser. No. 62/239,729, filed Oct. 9, 2015, entitled "VEHICLE APPEARANCE PROTECTION & ENHANCEMENT APPARATUSES, METHODS AND SYSTEMS".

The entire contents of the aforementioned applications are herein expressly incorporated by reference.

FIELD

The present innovations generally address Electronic Communications, and more particularly, include Vehicle Appearance Protection and Enhancement Apparatuses, Methods and Systems.

As such, the present innovations include (at least) the following distinct areas, including: Electronic Communications involving Condition Responsive Indicating Systems that are Responsive to a Particular Sequence of Conditions (with a suggested Class/Subclass of 344/523).

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Insurance companies offer policies to drivers. Such policies allow drivers to receive payment after accidents occur to finance repairs to their damaged automobiles.

BRIEF DESCRIPTION OF THE DRAWINGS

Appendices and/or drawings illustrating various, non-limiting, example, innovative aspects of the Vehicle Appearance Protection and Enhancement Apparatuses, Methods and Systems (hereinafter "APEPS") disclosure, include:

FIG. 1 shows a block diagram illustrating embodiments of an APEPS Environment for the APEPS;

FIGS. 2-3 show a datagraph diagram illustrating embodiments of an Entity Relationship Diagram for the APEPS;

FIG. 4 shows a diagram illustrating embodiments of Reconstitution Request Component for the APEPS.

FIGS. 5a and 5b show a screen shots illustrating embodiments of an APEPS vehicle information input screen for the APEPS;

FIG. 6-7 show a datagraph diagram illustrating embodiments of a Vehicle Certificate Request Process for the APEPS;

FIG. 8 shows a logic flow diagram illustrating embodiments of an Option Verification Component Process for the APEPS;

FIGS. 9a and 9b show a screen shots illustrating embodiments of an APEPS vehicle repair information input screen for the APEPS;

FIGS. 10-11 shows a datagraph diagram illustrating embodiments of a Repair Claim Process for the APEPS;

FIG. 12 shows a logic flow diagram illustrating embodiments of a Reconstitution Certificate Datastructure (RCD) Claim Authentication Process for the APEPS;

FIG. 13 shows a logic flow diagram illustrating embodiments of a Customer Login for the APEPS;

FIG. 14 shows a logic flow diagram illustrating embodiments of an Aftersale Process for the APEPS;

FIG. 15 shows a logic flow diagram illustrating embodiments of a Find Dealer Process and a Certificate Transfer Process for the APEPS;

FIG. 16 shows a logic flow diagram illustrating embodiments of a Service Appointment Process for the APEPS;

FIG. 17 shows a logic flow diagram illustrating embodiments of a Management Process for the APEPS;

FIG. 18 shows a logic flow diagram illustrating embodiments of a Stored trade Credit Process for the APEPS;

FIG. 19 shows a logic flow diagram illustrating embodiments of a Trade Credit Amount Process for the APEPS;

FIG. 20 shows a logic flow diagram illustrating embodiments of a Cross Dealer Redemption Process for the APEPS;

FIG. 21 shows a logic flow diagram illustrating embodiments of a Certificate Process for the APEPS;

FIG. 22 shows a logic flow diagram illustrating embodiments of a Cross Product Category Certificate Process for the APEPS;

FIG. 23 shows a logic flow diagram illustrating embodiments of a Basic Certificate Purchase Process for the APEPS;

FIG. 24 shows a logic flow diagram illustrating embodiments of a Basic Certificate Redemption Process for the APEPS;

FIG. 25 shows a logic flow diagram illustrating embodiments of a Certificate Verification Process for the APEPS;

FIG. 26 shows a screen shot illustrating embodiments of a Customer Login Screen for the APEPS;

FIG. 27 shows a screen shot illustrating embodiments of a Customer Certificate View Screen for the APEPS;

FIG. 28 shows a screen shot illustrating embodiments of a Customer Certificate Transfer Screen for the APEPS;

FIG. 29 shows a screen shot illustrating embodiments of a second Customer Certificate View Screen for the APEPS;

FIG. 30 shows a screen shot illustrating embodiments of a Management Login Screen for the APEPS;

FIG. 31 shows a screen shot illustrating embodiments of a management Administration Screen for the APEPS;

FIG. 32 shows a screen shot illustrating embodiments of a Management Role Screen for the APEPS;

FIG. 33 shows a screen shot illustrating embodiments of a Management Add Role Screen for the APEPS;

FIG. 34 shows a screen shot illustrating embodiments of a Management Administration Screen for the APEPS;

FIG. 35 shows a screen shot illustrating embodiments of a Management RCD Search Screen for the APEPS.

FIG. 36 shows a screen shot illustrating embodiments of a Provider Portal Screen for the APEPS;

FIG. 37 shows a screen shot illustrating embodiments of a Provider Portal My Products Screen for the APEPS;

FIG. 38 shows a screen shot illustrating embodiments of a Provider Administration Screen for the APEPS;

FIG. 39 shows a screen shot illustrating embodiments of an Agency Portal Screen for the APEPS;

FIG. 40 shows a screen shot illustrating embodiments of an Agency Product Screen for the APEPS;

FIG. 41 shows a logic flow diagram illustrating embodiments of an Agent Portal Screen for the APEPS;

FIG. 42 shows a screen shot illustrating embodiments of a second Agent Product Screen for the APEPS;

FIG. 43 shows a screen shot illustrating embodiments of an Agent Setting Screen for the APEPS;

FIG. 44 shows a screen shot illustrating embodiments of a Dealer Group Portal Screen for the APEPS;

FIG. 45 shows a screen shot illustrating embodiments of a Dealer Group Setting Screen for the APEPS;

FIG. 46 shows a screen shot illustrating embodiments of a Dealer Portal Screen for the APEPS;

FIG. 47 shows a screen shot illustrating embodiments of a Dealer Portal Register Certificate Screen for the APEPS;

FIG. 48 shows a screen shot illustrating embodiments of a Dealer Portal Register Certificate Customer Screen for the APEPS;

FIG. 49 shows a screen shot illustrating embodiments of a Dealer Portal Register Certificate Product Screen for the APEPS;

FIG. 50 shows a screen shot diagram illustrating embodiments of a Dealer Portal Find Certificate Screen for the APEPS; and FIG. 51 shows a block diagram illustrating embodiments of an APEPS controller.

Generally, the leading number(s) of each citation number within the drawings indicates the figure in which that citation number is introduced and/or detailed. As such, a detailed discussion of citation number 101 would be found and/or introduced in FIG. 1. Citation number 1001 is introduced in FIG. 10, etc. Any citation and/or reference numbers are not necessarily sequences but rather just example orders that may be rearranged and other orders are contemplated.

DETAILED DESCRIPTION

The Vehicle Appearance Protection and Enhancement Apparatuses, Methods and Systems (hereinafter "APEPS") transforms initial product attribute data inputs, via APEPS components (e.g., an Appearance Protection and Enhancement Package Calculation Component 5142, Resale Component 5144, Preventive Maint. Package Generator Component 5146, Trade-in Value Calculation Component 5148, and Follow-Up Maintenance Package Generator Component 5149, etc.), into future product value enhancement verification outputs. The APEPS components, in various embodiments, implement advantageous technological features asset forth below.

Introduction

In various aspects of the various embodiments of the APEPS system, an Automotive Appearance Protection Trade Credit, voucher, coupon, allowance, guarantee, or the like is provided to a consumer. In one embodiment, the APEPS further provides a web portal for both consumers and dealers that will automatically calculate, continuously update and confirm the trade credit over the term of the product's use by the consumer. As such, the APEPS represents an improvement over prior technologies that lack such automated functionality. The trade credit may equal a percentage, flat dollar amount, or dollar for dollar rebate up to a maximum amount of the original automotive appearance protection/ product purchase price. Upon leaving the dealership, the customer is provided with a tangible certificate, which states that by applying these products/protections (because of how the product performs and the product warranties backing the products) the vehicle trade-in value is enhanced. In one embodiment, the certificate may be a physical printout, with a unique identifier. In another embodiment, that unique identifier may be cryptographically signed, e.g., with a digital certificate, to enhance its uniqueness. Further, in another embodiment, such a certificate may be registered on a Bitcoin blockchain to improve verifiability of its uniqueness and identity.

APEPS

When an Appearance Protection and Enhancement Product and System (APEPS) is backed by a product warranty or the like (e.g., a service contract, insurance or any other oral, written or documented agreement or registration), which may be sold by a seller (e.g., an agent, a marketing agency, a product dealer, administrator, distributor, inventory company, lender, financial institution, credit union, manufacturer, insurer, underwriter, product provider, online or retailer) and is purchased or leased by a consumer (e.g., an individual, wholesaler, company, or other entity) for a new or used durable product (such as an automobile), the consumer receives a verifiable certificate or the like, representing an upfront rebate, discount, credit or the like towards a future value of the product, which can be used towards the subsequent purchase of another new or used durable product at the point of sale upon trade-in or future sale of the protected product, regardless of intervening claims activity or the like involving the product.

The certificate (such as for a trade-in credit or voucher) is issued up front at the point of sale when the APEPS-protected product is purchased or leased. When the consumer subsequently trades-in the used durable product, the consumer receives an additional trade-in rebate or discount applied to the purchase of another new or used durable product. Alternatively, a trade credit, certificate or voucher is added to the value of the used durable good being traded-in.

In an alternate embodiment, when the consumer returns to the originating seller (or seller affiliate) to purchase a different new or used durable product, and is trading in the original durable product with the appearance protection product, the seller issues either a rebate or discount to be used to reduce the purchase price of the new or used (different) durable product being purchased or leased. Alternatively, or in addition thereto, a trade in credit, certificate, or voucher may be added to the value of the used durable good being traded-in.

The rebate or discount issued to reduce the cost, as well as the trade-in credit, certificate, or voucher issued to increase the trade-in value can all be issued either as a flat dollar amount or a percentage of the product purchase price. The credit value can also be calculated annually, bi-annually, monthly, daily and any other time periods. In place of a dollar amount, any other form of value, such as another good or service of same value may be offered at redemption.

The following examples illustrate the need and use of the APEPS system introduced herein. An automobile with cosmetic damage (that is, damage unrelated to the mechanical or electrical operation of the product), such as stains, smells, tears, or holes in the interior, faded paint, hard water spotting, bird dropping clear coat damage, tree sap, clear coat damage, industrial fall out, minor dents, dings and rock chips on the body or windows, and/or any combination of the above) is worth less than one that doesn't have the same cosmetic damage. The National Auto Dealer Association (NADA) guides definition of an average trade-in value versus a clean trade-in value is defined in the difference in the cosmetic condition of the vehicle. A vehicle meeting the definition of a clean trade is therefore demonstrably valued higher than a vehicle meeting the definition of an average trade.

When a product is covered by the APEPS system at the time of purchase or lease, the automobile interior and exterior are backed by a product warranty or service contract that warrants against the cosmetic damage. The dealer taking an APEPS-protected vehicle as a trade-in in the future therefore has less reconditioning cost to make the car available for resale.

With the purchase or lease of the durable product, the customer can purchase protection with an APEPS-backed protection certificate to protect its appearance and receive the credit, voucher, rebate etc. at the point of sale. The APEPS system further provides an online accessible user interface where the customer can also enter an APEPS application number/certificate number/agreement number at a website or via a downloaded mobile app to file repair claims to keep their product in top cosmetic condition. Through the user interface, the consumer may also receive their trade credit amount, generate a duplicate trade in voucher that they can print to redeem at any time during ownership or lease when trading in the durable good. The APEPS system will determine and provide the trade credit amount that the consumer can use at their discretion when looking to trade/upgrade their purchased or leased product in the future. Storage of these records will be provided through the APEPS. By providing both the interface that interacts with contract information storage and the customer trade-in portal, the customer has additional assurance that redeeming the trade credit any time online is not contingent on them filing and keeping track of a voucher or certificate. The APEPS interface will track and verify what products were purchased/leased, how much the original purchase price for the products were, and compute the accurate discount/rebate/trade credit or the like. The APEPS interface will disclose the "expiration" date that is disclosed with the trade credit/rebate etc. The customer can enter a URL into a web browser or mobile app to access the interface for the trade credit. The customer can also call or email the operators of the APEPS system in order to initiate a trade credit. Other types of user interfaces may likewise be used.

Once the certificate has been accessed by the consumer, it can also be downloaded and saved for future reference. The consumer can also request to have the certificate sent or transmitted to them by the APEPS system at any time. Since the product (often having a unique identified or serial number) needs to be traded in to redeem the value represented by the certificate, this ensures that an APEPS certificate can only be redeemed one time, even in the event multiple that multiple vouchers were issued or printed.

The trade credit/discount/rebate represented by the APEPS certificate accessible via a user interface. Likewise, a consumer may submit numerous types of information related to the transaction (VIN, serial number, unique identification number, agreement/warranty number) by filling in forms or fields on the interface. Other ways of providing information related to the transaction may also be used. The interface may also present other information to the user, for example a mandatory and/or suggested preventative maintenance schedule for inspection and repairs related to the product.

Although the embodiments herein discuss use of the APEPS system with respect to a vehicle, it is to be understood that the APEPS systems and processes can be applied to other kinds of durable products, and the process might have stages added, deleted, or modified without departing from the spirit and scope of the disclosures herein. It is to be understood that the APEPS can be applied to at least the following general types of durable products, among others: ATV's, personal or commercial watercrafts, boats, jet skis, ships, playground equipment, exercise equipment, sporting equipment, books, watches, bicycles, snowmobiles, guns, pool tables, hot tubs, gaming systems, tools, spaceships, coins, trading cards, watches, construction equipment, industrial equipment, musical instruments, machinery, furniture, mowers, snow blowers, airplanes, helicopters, computers, cellular phones, smart phones, tablets, e-readers, personal electronics, appliances, motorcycles, recreational vehicles, tractors, semis, trailers, farm equipment, campers, mobile homes, cameras and camera equipment, jewelry, eye wear and any other durable products where the lifetime of the product may exceed the typical length of ownership and that have been provided with (implied or written) guarantees via an agreement, service contract or warranty registration.

As such, the consumer is getting the benefits of the appearance protection but also they are able to have a minimum guaranteed financial benefit because of (a) its appearance/condition and (b) because the goods have an increased value versus another good without a similar appearance/condition.

In addition to its technological benefits, the APEPS system also creates a great retention tool for both participating manufactures and dealers by giving participating consumers a reason to transact business with such manufactures or dealers again, directly incentivized by the product enhancement guaranteed by the APEPS certificate. The dealer thus gets the benefits of a repeat customer without spending the thousands of dollars normally spent to bring people back into the door, and they position themselves to access a future incoming inventory of used vehicles in better than average condition, along with less reconditioning cost to make the vehicle ready for resale. Also, the dealer doesn't have to exhaust resources (financial, people) in retaining customers through traditional means when customers typically don't like having to make decisions within a restricted period of time and they don't like high pressure techniques.

The APEPS system attempts to make it easier for both the dealer and the customer to do business in the future. There are presently no competing ways that a dealer can offer as a retention tool today that relates to the overall condition of a vehicle.

In certain embodiments, the financial benefit to the customer is not attached to the vehicles age or miles, which typically is involved when it comes to relating any value to a vehicle. The mileage and age of the vehicle matter less down the line. The additional financial benefit to the customer is simply derived from the superior future cosmetic condition.

General assessments of the condition of a vehicle, such as "poor", "fair" and "excellent" define a vehicles condition, which in turn affects a vehicles resale value. Giving the customer an incentive to purchase appearance protection products makes it easy to give them a discount/rebate/trade credit, trade voucher, etc. because the better condition the car is in the more value it brings. By the customer agreeing to purchase the appearance protection products they are guaranteeing the vehicle will be worth more. Existing services like NADA, KELLY BLUE BOOK, EDMUNDS and the like will provide non-binding estimated values on future values of a vehicle meeting the above quality condition categories, which can be used advantageously by the APEPS system. However, none of these services will back up those values with a firm offer to the customer like the APEPS system of trade credits, vouchers, rebates and the like.

If vehicle conditions are ignored, the non-binding estimated values can be extremely inaccurate. For instance, the value of a vehicle that is in excellent condition may be thousands of dollars higher than the value of a vehicle of the identical make, model and year that is in poor condition. With this process, now the customer is less responsible in negotiating the inaccuracy. The purchase and/or application of the APEPS protection ensures the appearance of the product remains in superior condition, thereby ensuring the value of the good is better retained over time. Upkeep of the cosmetic condition gives the dealers or affiliates the ability to give the consumer a guaranteed return on the product's initial purchase price.

There are significant differences in reconditioning cost. When someone is given the task of putting a value on reconditioning, they can both under/overestimate those cost ultimately affect the consumer. If the reconditioning is continually maintained, the APEPS certificate can be used anytime the used vehicle is traded in with a value certain. This helps eliminate the fluctuation of a used vehicles trade-in value, making it a better process for everyone involved.

Participation in APEPS also incentivizes the consumer to purchase a new durable good by informing the consumer of the ongoing conditional value of their current product.

In various embodiments, additional protection products, including traditional mechanical and electric system warranties or service contracts, may also be provided to further protect the trade credit via a pre-paid maintenance plan, a service contract agreement or mechanical breakdown insurance.

In certain embodiments, when the consumer and the dealer both accept a trade-in of an APEPS-protected product, the dealer may add the certificate amount to the trade-in, or discount the purchase price of the new product being purchased. Upon application of the guaranteed amount, the certificate may be surrendered to the dealer. If the customer sells the vehicle to a third party or a different company outside the participating APEPS dealers and affiliates, then the APEPS protection may automatically contractually terminate. The APEPS system tracks all these developments from product purchase through product return, via either trade-in or resale.

FIG. 1 shows a block diagram illustrating embodiments of an APEPS Environment for the APEPS.

The network environment 100 may include a APEPS Server 5101, the features and components of which described in detail below with respect to FIG. 51. The APEPS Server 5101 may comprise one or many servers, which may collectively be included in the APEPS System. The network environment 100 may further include an APEPS Database 5119, which may be provided to store various information used by the APEPS Server 5101 including consumer data, product data, and any other data as described, contemplated and used herein.

The network environment 100 may further include a Network Interface Server(s) 102, which, for example, enables data network communication between the APEPS Server 5101, Dealer Server(s) 187, Third Party Server(s) 198, and Client Terminal(s) 186, in accordance with the interactions as described herein.

The one or more Client Terminals 106 may be any type of computing device that may be used by Clients 186a to connect with the APEPS Server 5101 over a data communications network, such as the Internet. Clients 186a, in turn, may be consumers who purchase a durable product that is enhanced by the APEPS system, as described further herein.

The Dealer Server(s) 187 may be any type of computing device operated by one or more dealers, dealer affiliates, agents, manufacturers, repair facilities and the like to connect with the APEPS server 5101 over the data communications network. The Dealer Server(s) 187 perform the Dealer Management System (DMS) Integration Processes described herein.

The Third Party Server(s) 198 may be operated by any other party that is involved in the various APEPS processes described herein. Accordingly, the third party server(s) 198 may be any type of computing device described herein as may be operated by a dealer, a dealer affiliate, an insurer, a re-insurer, and any other third party described herein. For example, the third party server 198 may be operated by a Vehicle Information provider 198 that performs the Vehicle Information Integration Process described herein below.

Communications to the APEPS system 5101 may be accomplished over any type of data communications network, such as over the Internet via an Internet Service Provider (ISP). The APEPS System may include well-known, routers, edge switches, firewalls, as well as storage arrays comprising application servers, database servers and the like. Database servers may include APEPS database 5119 as described herein below.

The servers and terminals represented in FIG. 1 cooperate via network communications hardware and software to initiate the collection of data for use in the APEPS system, the processes involving which will now be described in more detail.

FIGS. 2-3 show a diagram illustrating database components for the APEPS in an Entity Relationship Diagram. The entities having servers that electronically interact with the APEPS in the disclosed improved network communications system described herein include individual consumers (persons), and businesses, such as dealers, affiliates, agents, repair centers, manufacturers, insurers, reinsurers and the like. Database components may also include information relating to the products protected by the APEPS, the service schedules required by the APEPS, the issued APEPS certificates that enhance such products. All these database components, and others as may be introduced in more detail below, have one or more fields of data relating to the entity. All such databases, fields and stored information will be described in more detail below with respect to the databases 5119a-k of FIG. 51.

FIG. 4 shows a diagram illustrating database components used by the Reconstitution Request Component 5150 as maintained by the APEPS when an APEPS inspection or repair is electronically reported as performed on an APEPS-protected product. This includes various fields of data relating to repair requests, status of repairs and status of repair request claims sent to the APEPS by a repair agent system or a consumer's client terminal Such data may be stored in the fields of Repairs database 5119*j* described later below.

FIG. 5*a* shows a first screen shot illustrating embodiments of an APEPS product information input screen 500 presented to authorized dealers via a data portal by the APEPS server 5101. The product information input screen 500 may store product information, for example of a product sold to a consumer by a dealer. In the case where the product is an automobile, such product information may include a make, model year, vehicle type, installed vehicle options, ownership status, mileage, appearance, years in operation, dents, paint damage, wheel condition, lights operating and the like. Such information may be stored in the appropriate fields of products database 5119*e* described later below.

FIG. 5*b* shows an alternative screen shot illustrating embodiments of an APEPS product information input screen 500 presented to authorized dealers via a data portal by the APEPS server 5101.

This screen 500 includes a number of fields by which product information, product maintenance and RCD protection options may be identified and selected. Various of these fields may be prepopulated with available selections, or may require manual input of the requested data. Exemplary product information fields may include: a product make field 501, a product model year field 503, a product model field 505, a product model sub-type field 507, a product options field 509, a product status field 511 and a product current mileage field 513. Exemplary product maintenance fields may include: product appearance field 519, product mechanical prepaid maintenance field 521, product tune-ups field 523 and product upgrades field 525.

This screen 500 may further provide a slider bar or similar selectable graphics element representing the number of years that RCD protection is to be provided for the product. The slider bar may be selected and moved to the number of whole or partial years for which RCD protection is desired. The slider bar selections may include, for example, one to seven years of protection, although other ranges may likewise be provided.

This screen may further provide a number of individual RCD appearance protection coverages 527 available for the product. In the case where the product is an automobile, such appearance protection options may include, dent protection, ding protection, chip protection, wheel protection, tire protection, external lights protection and body paint protection. A slider bar may be presented for each of these options. The slider bar may range between 0% coverage and 100% coverage for each appearance protection option. These ranges relate to the amount of appearance repairs will be covered by APEPS protection, with the remainder to be covered by the consumer.

The number of appearance protection options selected, the corresponding percentages of coverages selected in field 527, and the term of protection as selected from field 515 will be used to determine the total cost of the APEPS protection coverage to be paid by the consumer at the time of sale of the product. The costs may be presented in cost field 535 of the screen 500. The cost presented in this field 535 may change whenever a slider bar position representing RCD term 515 or appearance protection options 527, or the product information in fields 501-513 and 519-525, are changed. Generally, the costs will go up as product protection is increased. The cost presented are based on the product information, expected depreciation and costs to fix expected wear and tear, which are determined from the actuarial data described herein.

Once the product information, term of years and appearance protection options represent an acceptable cost to the consumer, the consumer may select the Request RCD Certificate button 537 presented on the screen 500. The selection of button 537 will initiate the Vehicle Certificate Request Process 600 described below with respect to FIG. 6. The selection of the button 537 will also finalize the machine-readable code identifying the new RCD Certificate generated for the consumer's purchased product. The machine-readable code will be presented in RCD code field 517 of the screen 500. The machine-machine readable code or indicium maybe a 2-d barcode, a 3-D barcode a QR code or other functionally-similar indicium that is typically decodable via computerized barcode scanners and the like. The indicium may encode the RCD certificate number assigned to the certificate as well as product information, product maintenance information and APEPS appearance options selected, including the level of protections and the term of years, as described above. The code in field 517 may be printed and presented on a physical RCD certificate along with human-readable information pertaining tot the RCD coverage and the product being protected.

FIG. 6-7 show a datagraph diagram illustrating embodiments of a Vehicle Certificate Request Process 600 for the APEPS. The process 600 may be performed by a dealer upon initial sale of a product to a consumer. Upon entry of the required information, the processes described herein are performed automatically by the APEPS system. Referring first to FIG. 6, the process 600 commences when a dealer inputs the product type and agreement terms 601 for a product being sold to a consumer, which product is to be enhanced by protection maintained by the APEPS system, and this information is sent as a request message to the APEPS server 5101 (e.g., the message inputs may be set via interface as shown in FIG. 5*a* and FIG. 5*b*).

The dealer next accesses and initiates the APEPS Calculation Component 5142 via the APEPS product information input screen 500 (step 602). FIG. 8 shows the general steps performed by the APEPS calculation component 5142 upon each enrollment of a product into the APEPS system.

Responsive to the entry of information of the product and sales terms via the input screen 500, the APEPS server 5101 next requests an actuarial assessment of the cost to maintain the appearance of the product during a period of use defining the term of the APEPS agreement agreed to between to the dealer and the consumer (step 604). In various embodiments, the actuarial assessment is requested from a third party operating third party server 198. In such embodiments, the actuarial assessment maybe requested from an existing service that readily determines actuarial data regarding the future value of such products. For example, in the case of an automobile, the assessment may be performed by a service such as KELLY BLUE BOOK, EDMOUNDS, or the like.

In one embodiment, the client may provide the following example request message 601, substantially in the form of a HTTP(S) POST message including XML-formatted data, as provided below:

POST/authrequest.php HTTP/1.1
    Host: www.server.com
    Content—Type: Application/XML
    Content—Length: 667
    <?XML version="1.0" encoding="UTF-8"?>
    <auth_request>
        <timestamp>2020-12-31 23:59:59</timestamp>

```
<user_accounts_details>
  <user_account_credentials>
    <user_name>JohnDaDoeDoeDoooe@gmail.com</account_name>
    <password>abc123</password>
    //OPTIONAL <cookie>cookieID</cookie>
    //OPTIONAL
    <digital_cert_link>www.mydigitalcertificate.com/
    JohnDoeDaDoeDoe@gmail.com/mycertifcat-
    e.dc</digital_cert_link>
    //OPTIONAL     <digital_certificate>_DATA_
    </digital_certificate>
  </user_account_credentials>
</user_accounts_details>
<client_details>//iOS Client with App and Webkit
  //it should be noted that although several client
  details
  //sections are provided to show example variants
  of client
  //sources, further messages will include only on to
  save
  //space
  <client_IP>10.0.0.123</client_IP>
  <user_agent_string>Mozilla/5.0 (iPhone; CPU
  iPhone OS 7_1_1 like Mac OS X) AppleWebKit/
  537.51.2 (KHTML, like Gecko) Version/7.0
  Mobile/11D201     Safari/9537.53</user_agent_
  string>
  <client_product_type>iPhone6,1</client_product_
  type>
  <client_serial_number>DNXXX1X1XXXX</cli-
  ent_serial_number>
  <client_UDID>3XXXXXXXXXXXXXXXXXX-
  XXXXXXD</client_UDID>
  <client_OS>iOS</client_OS>
  <client_OS_version>7.1.1</client_OS_version>
  <client_app_type>app with webkit</client_app_
  type>
  <app_installed_flag>true</app_installed_flag>
  <app_name>APEPS.app</app_name>
  <app_version>1.0</app_version>
  <app_webkit_name>Mobile Safari</client_webkit_
  name>
  <client_version>537.51.2</client_version>
</client_details>
<client_details>//iOS Client with Webbrowser
  <client_IP>10.0.0.123</client_IP>
  <user_agent_string>Mozilla/5.0 (iPhone; CPU
  iPhone OS 7_1_1 like Mac OS X) AppleWebKit/
  537.51.2 (KHTML, like Gecko) Version/7.0
  Mobile/11D201     Safari/9537.53</user_agent_
  string>
  <client_product_type>iPhone6,1</client_product_
  type>
  <client_serial_number>DNXXX1X1XXXX</cli-
  ent_serial_number>
  <client_UDID>3XXXXXXXXXXXXXXXXXX-
  XXXXXXD</client_UDID>
  <client_OS>iOS</client_OS>
  <client_OS_version>7.1.1</client_OS_version>
  <client_app_type>web browser</client_app_type>
  <client_name>Mobile Safari</client_name>
  <client_version>9537.53</client_version>
</client_details>
<client_details>//Android Client with Webbrowser
  <client_IP>10.0.0.123</client_IP>
  <user_agent_string>Mozilla/5.0 (Linux; U; Android
  4.0.4; en-us; Nexus S Build/IMM76D)
  AppleWebKit/534.30 (KHTML, like Gecko) Ver-
  sion/4.0 Mobile Safari/534.30</user_agent_
  string>
  <client_product_type>Nexus S</client_product_
  type>
  <client_serial_number>YXXXXXXXXZ</client_
  serial_number>
  <client_UDID>FXXXXXXXXX-XXXX-XXXX-
  XXXX-XXXXXXXXXXXX</client_UDID>
  <client_OS>Android</client_OS>
  <client_OS_version>4.0.4</client_OS_version>
  <client_app_type>web browser</client_app_type>
  <client_name>Mobile Safari</client_name>
  <client_version>534.30</client_version>
</client_details>
<client_details>//Mac Desktop with Webbrowser
  <client_IP>10.0.0.123</client_IP>
  <user_agent_string>Mozilla/5.0 (Macintosh; Intel
  Mac OS X 10_9_3) AppleWebKit/537.75.14
  (KHTML, like Gecko) Version/7.0.3 Safari/
  537.75.14</user_agent_string>
  <client_product_type>MacPro5,1</client_product_
  type>
  <client_serial_number>YXXXXXXXXZ</client_
  serial_number>
  <client_UDID>FXXXXXXXXX-XXXX-XXXX-
  XXXX-XXXXXXXXXXXX</client_UDID>
  <client_OS>Mac OS X</client_OS>
  <client_OS_version>10.9.3</client_OS_version>
  <client_app_type>web browser</client_app_type>
  <client_name>Mobile Safari</client_name>
  <client_version>537.75.14</client_version>
</client_details>
<CPRODUCT_DATA>
  <product_make>Honda</product_make>
  <product_model>Accord</product_model>
  <product_year>2015</product_year>
  <product_subtype>Coupe</product_subtype>
  <product_options>EX-Satellite</product_options>
  <product_status>New</product_status>
  <product_mileage>42</product_mileage>
  <RCD_REQUEST>VIN, SERIALNUMB, Digital-
  Cert</RCE_REQUEST>
  <QRCODE>Payload.jpg</QRCODE>
  <QRCODE_Data>Unique Quote Code: 12345ABC;
  Unique Certificate Code: HASHVALUES12345;
  Data Payload: Honda, 2015, Accord, Coupe, EX,
  New, 42, Mechanical: CoverageYears 4, Dents
  100%, Dings 60%, RockChips 25%, Wheels 50%,
  Tires 50%, Lights 50%; Prepaid 3; Tune-ups 3;
  Upgrades 7</QRCODE_Data>
</PRODUCT_DATA>
</auth_request>
```

Automatically and in response to the requests, the third party server 198 initiates its actuarial costs determinations that are requested by the APEPS system (step 606).

The actuarial data is retrieved from a database data comparison and lookup (step 608). In some embodiments, the server may query its data store for retrieving data. An example PHP/SQL listing for querying a database is provided below:

Query Record
```
<?PHP
  header('Content—Type: text/plain');
  mysql_connect("254.93.179.112",$DBserver, $password); // access database server
  mysql_select_db("PRODUCTACTUARIAL.SQL"); // select database table to search
  //create query for token arbitrators
  $query="SELECT product_make, product_model, product_year FROM Actuarial Table
    WHERE actuarial_type LIKE '%' $APEPS";
  $result=mysql_query($query); // perform the search query
  mysql_close("PRODUCTACTUARIAL.SQL"); // close database access
?>
```

Next, at step 610, the requisite actuarial data is retrieved. The Actuarial Quote is generated and responsively automatically sent to the APEPS Server 5101. The APEPS Server 5101 then converts the Actuarial Quote to a Customer Quote to purchase APEPS protection for the product (step 614). The Customer Quote may include a purchase cost that is based on the actuarial cost to maintain the product over the product use period. For example, the cost may be based on a percentage of the difference between the value of the product at the end of the term in top condition versus average condition based on the actuarial data and the anticipated cost of repairs to the appearance of the product to keep it in top condition.

Next, at step 618, the Customer Quote is transmitted to a user terminal 186a of the consumer. The quote may be displayed to the consumer on a display device of the user terminal 186 (step 620).

The customer may then enter an approval of the quote (step 622), which is transmitted back to the APEPS server 5101 over the data communications network (step 624). The customer approval is then received by the APEPS Server 5101 (step 626).

Turning now to FIG. 7, responsive to the customer approval, the APEPS Server 5101 initiates a Reconstitution Certificate Datastructure (RCD) Generation Process as may be performed by the Follow-Up Maintenance and Appearance Enhancement Package Generator Component 5149 thereof (step 728).

The purpose of this process is to generate a certificate that corresponds to the product, which certificate conditionally guarantees a future value of the product, which is conditioned upon the maintenance of the product over time according to a mandatory inspection and repair schedule. The certificate may include unique identification of a particular product. For example, where the product is an automobile, the product identification (ID) may be an industry standard Vehicle Identification Number (VIN) or serial number of the product. The certificate may also identify a dealer or other repair agent that is assigned to inspect and repair the vehicle (which maybe changed by the consumer to another participating dealer or agent over time). The certificate may further identify the future value to be realized relating to the product (such as a future trade-in value or percentage rebate of a vehicle value) for adhering to the APEPS required inspection and repair schedule.

In another embodiment, the any and/or all of the above unique identifiers may be used to construct a unique RCD identifier (RCDID). Any and/or all of the unique values may be concatenated as well as adding a unique serially incremented number. In yet another embodiment, any of the above, or a serial number may be encrypted with a unique RCD digital certificate. The encrypted value, once generated, may also be logged onto a bitcoin blockchain as a registered identifier of the RCD, and used as a lookup identifier and/or link to the certificate.

The certificate datastructure is then stored by the APEPS Server 5101 for example in the certificates database 5119k as described later below (step 730). In various embodiments, the PHP/SQL structure for a command to update the database may take the following form:

```
<?PHP
  header('Content—Type: text/plain');
  // store input data in a database
  mysql_connect("201.408.185.132", $DBserver, $password); // access database server
  mysql_select("Certificate_DB.SQL"); // select database to append
  mysql_query("UPDATE CertificateTable
    SET certificate_id='10001', product_ID='^FAPQ213-Q8UYN890', dealer=ACME Automotive', zip_code='90210' timestamp='2016-02-22 15:22:43'
    WHERE customername='JDoe@gmail.com'");
  mysql_close("CSF_DB.SQL"); // close connection to database
?>
```

The Certificate is then retrievable by any authorized user of the APEPS system, such as the consumer or dealer.

Next, the APEPS Server 5101 may seek to reinsure the anticipated costs associated with the APEPS protection of the product and registered certificate. In such case, a Reinsurance Option Component is initiated (step 732), by which reinsurance is automatically obtained by the APEPS system from a third party server operated by a reinsurer. Accordingly, a reinsurance quote request sent from the APEPS Server 5101 to the third party server 198 operated by the reinsurer (step 734). In response, the reinsurer's server generates and transmits to the APEPS Server 5101 a bid on the reinsurance (step 736). In response, when the bid is within a programmed range of acceptable amounts, a Bid Acceptance is generated by the APEPS Server 5101 and sent to the reinsurance agent's server (step 738). The APEPS then stores the reinsurance details in the database 5119 (Step 740).

FIG. 8 shows a logic flow diagram illustrating embodiments of a process 800 performed by an APEPS Calculation Component 5142 for the APEPS as mentioned above with reference to FIG. 6. According to this general process, the APEPS Calculation Component 5142 generates a cost quote to obtain APEPS protection based on consumer protection selections. The APEPS Calculation Component 5142 is initiated at step 802a. The APEPS Calculation Component 5142 first confirms the product ID (such as a VIN) of the product being enhanced by the APEPS system (Step 802b). The APEPS Calculation Component 5142 determines or receives product actuarial values as described previously (step 802c). The APEPS Calculation Component 5142 next determines the costs of APEPS protection (step 802d). The APEPS Calculation Component 5142 then transmits the APEPS cost quote to the consumer (step 802e). The process 800 then continues to step 614 above.

Figure 9A:
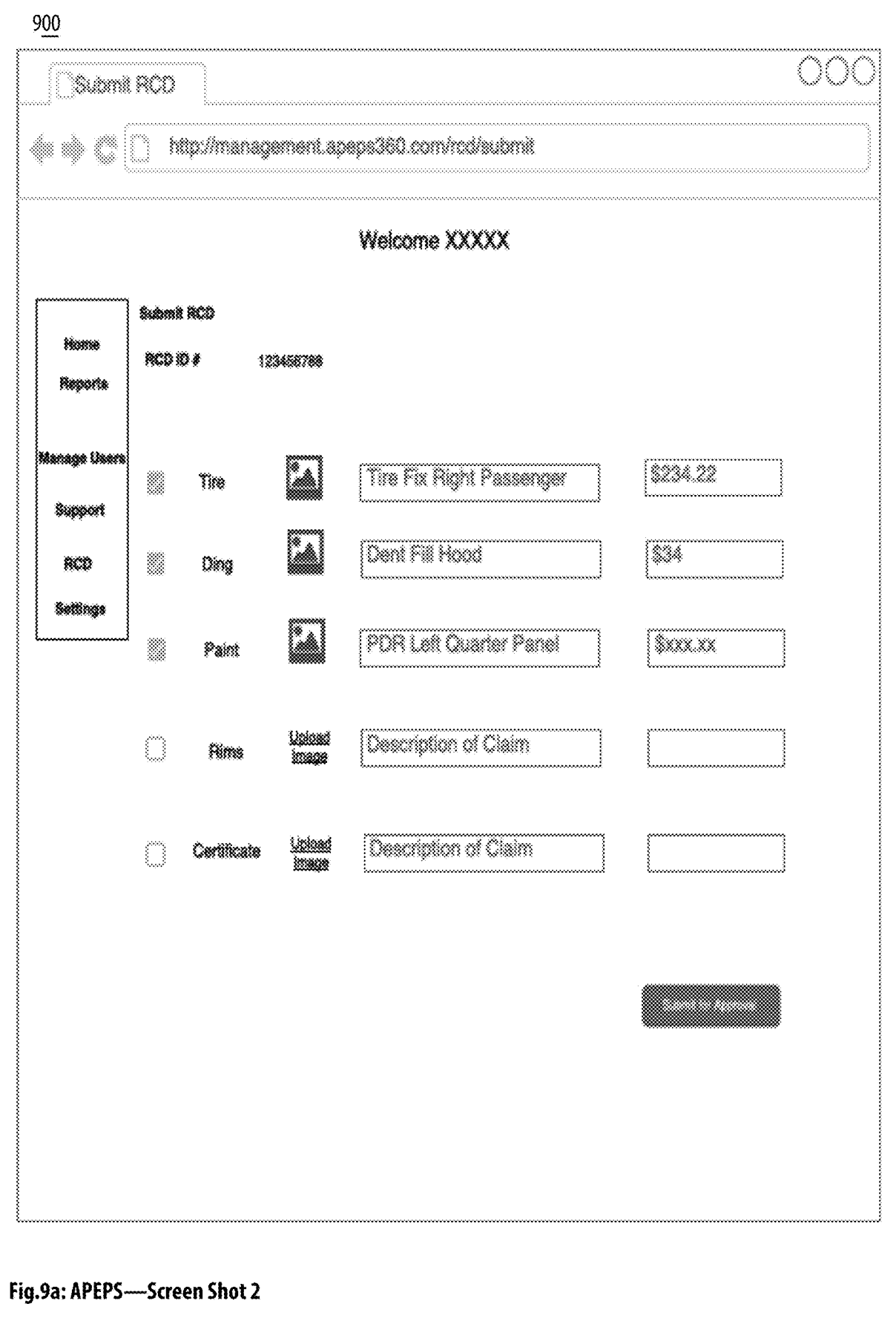

FIG. 9 shows a second screen shot illustrating embodiments of an APEPS vehicle repair information input screen 900 for the APEPS. This screen allows a dealer or repair agent to report scheduled or unscheduled repairs of a product enhanced by the APEPS system. Accordingly, the input screen may include an RCD ID corresponding to an identification number or other indicium (such as a machine-readable indicium, barcode, 3D code or the like) identifying the certificate associated with the product. The input screen 900 may further include fields for Repair Type, such as (in the case where the product is an automobile): tire, dent, paint, rims. The entered information may include a description of the repair and the cost of the repair. This information may be stored by the APEPS system in the Repairs database 5119*j*.

FIG. 9*b* shows an alternative screen shot illustrating embodiments of an APEPS vehicle repair information input screen 900 for the APEPS. The screen 900 may include an RCD ID field showing the RCD Certificate number assigned to the product. A Repair Type Column 940 shows the repair types protected under the RCD certificate to enhance the product, The repair types may include dents, dings, rock chips, wheels, tires, lights and paint. An Option column 942 shows available options for each of the listed repair types in column 942. An Amount column 944 shows the cost for RCD protection of each of the repair types listed in column 940. A Percent Covered column 946 shows the percentage of repair costs that will be covered under the RCD for each of the repair types in column 940.

FIGS. 10-11 shows a datagraph diagram illustrating embodiments of a Repair Claim Process 1000 for the APEPS. Turning to FIG. 10, this process 1000 commences when the consumer, dealer or repair agent inputs a reconstitution (repair) request (step 1002).

In one embodiment, the client may provide the following example request, substantially in the form of a HTTP(S) POST message including XML-formatted data, as provided below:

```
POST/authrequest.php HTTP/1.1
Host: www.server.com
Content—Type: Application/XML
Content—Length: 667
<?XML version="1.0" encoding="UTF-8"?>
<auth_request>
    <timestamp>2020-12-31 23:59:59</timestamp>
    <user_accounts_details>
        <user_account_credentials>
            <user_name>JohnDaDoeDoeoooe@gmail.com</account_name>
            <password>abc123</password>
            //OPTIONAL <cookie>cookieID</cookie>
            //OPTIONAL
            <digital_cert_link>www.mydigitalcertificate.com/JohnDoeDaDoeDoe@gmail.com/mycertifcate.dc</digital_cert_link>
            //OPTIONAL  <digital_certificate>_DATA_</digital_certificate>
        </user_account_credentials>
    </user_accounts_details>
    <client_details>//iOS Client with App and Webkit
        //it should be noted that although several client
        details
        //sections are provided to show example variants
        of client
        //sources, further messages will include only on to
        save
        //space
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXX-XXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>APEPS.app</app_name>
        <app_version>1.0</app_version>
        <app_webkit_name>Mobile Safari</client_webkit_name>
        <client_version>537.51.2</client_version>
    </client_details>
    <client_details>//iOS Client with Webbrowser
        <client_IP>10.0.0.123</client_IP>
        <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXX-XXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details>//Android Client with Webbrowser
        <client_IP>10.0.0.123</client_IP>
        <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
```

```
<client_OS>Mac OS X</client_OS>
<client_OS_version>10.9.3</client_OS_version>
<client_app_type>web browser</client_app_type>
<client_name>Mobile Safari</client_name>
<client_version>537.75.14</client_version>
</client_details>
<REPAIR_REQUEST>
    <product_make>Ford</product_make>
    <product_model>Fusion, /product_model>
    <product_year>2016</product_year>
    <RCD>10001</RCD>
    <RCD_Digital_Cert>abcHASH</RCD_Digital_Cert>
    <Repair_Type>Dent</Repair_Type>
    <Repair_Cost>$350.00</Repair_Cost>
    <RCD_Percent_Coverage>100</RCD_Percent_Coverage>
    <RCD_Dealer_Name>ACME</RCD_Dealer_Name>
</ REPAIR_REQUEST>
</auth_request>
```

The repair request is transmitted to and received by the Dealer Server 187 (step 1004) and then forwarded after dealer approval to the APEPS Server 5101. The APEPS Server 5101 responsively produces a reconstitution claim request, which is sent to Third Party Server 198 for processing (step 1006), or alternatively, the claim request may be sent directly to the 3rd Party server 198. In this instance, the third party server 198 may be operated by an insurance provider or the like. The claim request is then acknowledged by the Third Party Server 198 to the APEPS Server 5101 (step 1008).

Next, at step 1010, an RCD Claim Authentication Process is initiated by the Reconstitution Component 5150. The general steps of the RCD Process are described in more detail below with respect to FIG. 12. Commencing at step 1012, the reconstitution request data is verified against stored certificate and product data for the product being repaired. In particular, the submitted claim data may be compared to stored data in the Products database 5119e and the Certificates database 5119k.

In some embodiments, the server may query its data store for retrieving data. An example PHP/SQL listing for querying a database is provided below:

```
Query Record
<?PHP
header('Content—Type: text/plain');
mysql_connect("254.93.179.112", $DBserver, $password); // access database server
mysql_select_db("CERTIFICATE.SQL"); // select database table to search //create
query for token arbitrators
$query="SELECT product_make, product_model, product_year FROM Actuarial Table
WHERE certificate_number LIKE '%' $10001";
$result=mysql_query($query); // perform the search query
mysql_close("PRODUCTACTUARIAL.SQL"); // close database access
?>
```

When the submitted claim data matches the product and certificate data stored by the APEPS, a claim data verification is responsively sent (step 1014).

When the certificate has been reinsured by the APEPS system, the APEPS next automatically requests a reinsurance payment portion from a Third Party Server 198 operated by the appropriate reinsurer (step 1016). The Third Party Server 198 then transmits a confirmation of reinsurance and payment to the APEPS Server 5101 (step 1018). Responsive thereto, the APEPS Server 5101 automatically transmits approval of repair amount to the Dealer Server 187 (step 1020). The Dealer Server then transmits an acknowledgment in reply (step 1022).

Turning now to FIG. 11, the process 1000 continues to step 1124, where an RCD Repair Payment Component is initiated. The repair payment is sent to dealer (step 1125). This may be done by an electronic debit or credit payment system as are well known in the art. Upon receipt of payment, the Dealer Server 187 acknowledges receipt of payment to the APEPS Server 5101 (step 1126). A repair payment notification is also sent by the Dealer Server 187 to the consumer's user terminal 186, such as by e-mail, SMS text message, instant message or any other form of electronic text communications (step 1127). Upon completion of the repair, the Dealer Server 187 transmits confirmation of the same to the APEPS Server 5101 (step 1128). The Claim Data and Repair Verification is then stored by APEPS Server 5101, for example, in a datastructure of the Repair database 5119j (step 1130), after which the process 1000 ends.

In various embodiments, the PHP/SQL structure for a command to update the database may take the following form:

```
<?PHP
header('Content—Type: text/plain');
// store input data in a database
mysql_connect("201.408.185.132", $DBserver, $password); // access database server
mysql_select("Repair_DB.SQL"); // select database to append
mysql_query("UPDATE repairTable
SET                             certificate_id='10001',
    product_ID='^FAPQ213Q8UYN890', dealer=ACME Automotive', zip_code='90210', repair_type='dent repair', reapir_cost=
"$420.00", timestamp='2016-02-22 15:22:43'
WHERE customername='JDoe@gmail.com'");
mysql_close("Repair_DB.SQL"); // close connection to database
?>
```

FIG. 12 shows a logic flow diagram illustrating embodiments of a general RCD Claim Authentication Process 1200 for the APEPS, referenced above with respect to step 1010. A general RCD Claim Authentication Process commences at step 1210a. The APEPS first verifies that the RCD certificate number is valid by comparing it the valid IDs stored in Certificates database 5119k (step 1210b). The APEPS next verifies that the requestor (consumer and dealer) match the stored records for the APEPS certificate (step 1210c). Next, the APEPS Server 5101 determines whether a repair is subject to reinsurance reimbursement (step 1210d). If so, the process continues to step 1016 above. Otherwise, the APEPS evaluates claim validity (step 1210e) and the process returns to step 1012 of FIG. 10 above.

FIG. 13 shows a logic flow diagram illustrating embodiments of a Customer Login Process 1300 for the APEPS. At step 1302, the consumer logs into the APEPS Server 5101 and is presented with a consumer login screen as depicted in FIG. 26. The APEPS server confirms whether the consumer has entered valid login information, for example by comparing the submitted login credentials to the Users database 5119b (step 1304). If the credentials are invalid, the process 1300 ends and an invalid user message and login rejection is transmitted by the APEPS Server 5101 to the consumer's user terminal 186 for display thereon (step 1306). Otherwise, the process 1300 proceeds to step 1308 where the role of the entity logging in is determined, for example from Users database 5119*b* (step 1308). Such roles may include APEPS administrator, Agent, Dealer consumer or other authorized individuals. The login process 1300 then ends.

FIG. 14 shows a logic flow diagram illustrating embodiments of an Aftersale Process 1400 for the APEPS. This process 1400 commences when a consumer wishes to turn in their product and initiates a certificate redemption relating to the resale or trade-in of the product. The process commences after a consumer has logged into the APEPS Server 5101 as described with respect to FIG. 13, and selects a product redemption function. Responsive to the initiation of the process 1400, the APEPS Server 5101 retrieves the dealer associated with the product (step 1402). Next it is determined whether the dealer allows transfer of the certificate to another APEPS affiliated dealer, if transfer is desired by the consumer (step 1404). When the desired dealer is selected, the APEPS Server 5101 responsively retrieves the consumer's certificate details (step 1410), for example from the Certificate database 5119*k*. The APEPS Server 5101 next determines the after-purchase product service history of the product being redeemed (step 1412), for example by accessing the Repairs database 5119*j*. The next steps are performed iteratively for each aftersale product being redeemed (step 1420).

The APEPS Server 5101 next retrieves established confirmation filters for product (step 1422). The APEPS server 5101 next compares the certificate data against the established filters (step 1424). The APEPS Server 5101 next determines whether the certificate details match the filter (step 1426). If not, the next product certificate is examined and if there are no additional certificates, the process 1400 ends. If so, the APEPS Server 5101 retrieves trade value adjustment rules (step 1428). The APEPS Server 5101 then applies rules to get value adjustments of the associated product (step 1430). The APEPS Server 5101 then attaches the value to the aftersale product (step 1432). The APEPS Server 5101 then transmits a display of aftersale product value for display on the consumer's user terminal 186 (step 1434).

FIG. 15 shows a logic flow diagram illustrating embodiments of a Find Dealer Process and a Certificate Transfer Process 1500 for the APEPS.

With regard to the Find Dealer Component, this is initiated when a consumer wishes to change dealers that are servicing or receiving the product for redemption. In response to an initiation of the Find Dealer Process, the APEPS Server 5101 requests an address or ZIP code in which a desired dealer is located (step 1502). The APEPS Server 5101 next determines whether the entered address or zip is within a minimum established distance of the request (step 1506). If not, a display error is transmitted by the APEPS Server 5101 (step 1506). Otherwise, the following steps are performed iteratively for each dealer within a minimum distance of the entered location (step 1508). The APEPS server identifies a dealer within the minimum distance of the entered location (step 1510). An identification of each matching dealer is displayed to the consumer on a display device of a user terminal 186 (step 1512).

Turning now to a Certificate Transfer Component, this commences when a consumer selects, via user terminal 186, a certificate transfer function provided by the APEPS Server 5101 (step 1520). The consumer's original Dealer's ID is updated (step 1522) for example by updating the Certificate database 5119*k*. the newly-selected, receiving dealer is then notified of the transfer by the APEPS Server 5101, for example by transmitting an electronic message to the Dealer Server 189 (step 1524). The accepting dealer may be charged or invoiced by the APEPS Server 5101 for accepting the consumer as a new customer (step 1526). The APEPS Server 5101 then credits the original dealer by accepting the new dealer's charges less any APEPS-imposed transaction fee (step 1528). Next, the APEPS Server 5101 notifies the original dealer of the credit by electronic messaging (step 1530). A new certificate is then transmitted by the APEPS Server 5101 to the consumer's user terminal 186 (step 1532), after which the process 1500 ends.

FIG. 16 shows a logic flow diagram illustrating embodiments of a Service Appointment Process 1600 for the APEPS, as may be performed by the Follow-Up Maintenance and Appearance Enhancement Package Generator Component 5149 in conjunction with the data stored in Repairs database 5119*j*.

The process commences when a service schedule is retrieved for a certificate (step 1602). Iteratively, for each scheduled service the following steps are performed (step 1604). First, the APEPS Server 5101 determines whether a scheduled service has been performed on the consumer's product within the scheduled period (step 1606). If so, the APEPS Server 5101 stores a confirmation flag for the service in the Repairs database 5519*j* along with the service date for this service (step 1608). If not, the APEPS Server 5101 determines whether the scheduled service is past its application date (step 1610). If so, the Repairs database 5119*j* is updated to reflect the missed service (step 1612). Otherwise, the APEPS Server 5101 next determines whether any service coupons are available from the dealer for the scheduled service (step 1614). This may be accomplished by querying the dealer's DMS system. If so, the APEPS transmits a notice of missed scheduled repair and the service coupon by electronic communication to the consumer's user terminal 186 (step 1616). If not, the communication only includes the missed schedule information (step 1618).

From either 1616 or 1618 above, the APEPS Server 5101 may later communicate a schedule of available appointments from the dealer for the repair (step 1620). The APEPS Server 5101 retrieves available scheduling slots from the dealer's DMS system (step 1622). The communication of the schedule prompt the consumer to confirm their desired appointment time and select the displayed slot via the user terminal 186 (step 1624). The APEPS Server 5101 then electronically submits the appointment using a service scheduler function of the dealer's DMS system (step 1626). Upon successful scheduling, the consumer is electronically notified of the success (step 1628), after which the process 1600 ends.

FIG. 17 shows a logic flow diagram illustrating embodiments of a Management Entity Addition Process 1700 for the APEPS. This process 1700 may be performed by an APEPS manager or administrator using the APEPS Server 5101 to add new APEPS entities (such as dealers or agents) to the APEPS system. Such information may be stored, for example, in the Dealer Database 5119*h*. The process commences when a request from the administrator to add a new entity to the APEPS system is received by the APEPS Server 5101 (step 1702). Responsively, the APEPS Server 5101 determines whether the entity exists in the Dealer database 5119*h* (step 1704). If so, the APEPS Server 5101 transmits an error for display to the administrator (step 1706). If not, the APEPS Server 5101 saves the new entity information (step 1708) and notifies appropriate administrators of the entity or any stored parent of the entity (step 1710). The entity is stored with an indication of its parent entity, if any (step 1712) and the administrator is redirected to the parent entities stored information (step 1714), after which the process 1700 ends.

FIG. 18 shows a logic flow diagram illustrating embodiments of a Stored Trade Credit Process 1800 as may be performed by the Trade-In Value Calculation Component 5148 of the APEPS Server 5101.

This process 1800 is performed for each product being protected with an APEPS certificate in order to determine a present trade-in value of the product, including any rebate, discount or the like guaranteed by the APEPS certificate. The following steps are performed iteratively for each certificate and associated product in the APEPS database 5119 (step 1804). The APEPS first programmably assigns products to product categories based on product features using feature differences (step 1806). The following steps are then performed iteratively for each category (step 1808) and iteratively for each product (step 1810):

The APEPS Server 5101 electronically transmits a valuation query regarding the product to a third party server 189 of a market valuation information provider (step 1812). Existing such providers include, but are not limited to KELLY BLUE BOOK, EDMONDS and NADA. The market valuation data is responsively transmitted by the third party server 189 to the APEPS Server 5101 (step 1814). The APEPS Server then determines percentage difference in values applicable to each covered service relating to the product of the expected product use period (step 1816). From this calculation, the APEPS Server 5101 updates an appropriate trade credit amount presently applicable to the product (step 1818), and such information may be stored in the Certificate database 5519k. The present trade credit amount may be transmitted for display in response to any request fro such from the consumer's user terminal 186 at any time during the term of the APEPS certificate (step 1820). The process 1800 then terminates.

FIG. 19 shows a logic flow diagram illustrating embodiments of a Trade Credit Amount Process 1900 as may be performed by the Trade-In Value Calculation Component 5148 or the Vehicle Resale Component 5144 of the APEPS. This process 1900 may be automatically performed by the APEPS Server 5101 to determine consistency of a current trade-in or resale amount of each product within a given product category, which will then be used for the amount guaranteed by the APEPS certificate for such products.

More particularly, the process 1900 outlines a computerized method in which stored trade credit amounts, which have been pre-calculated via the analysis process outlined in FIG. 18 above, are applied to individual transactions. When a trade calculation credit request is processed, the product in question (i.e., a vehicle, boat, etc.) is compared to the stored values contained within the TradeCreditAmounts table of database 5119k. Each of these stored values is first checked to make sure that is appropriate for the type of protection that is being requested. For example, mechanical protection trade credit amounts would be utilized when mechanical credits are needed, and Appearance amounts would be used when appearance credits are needed.

If the TradeCreditAmount is of the appropriate type, then the current product being valued will be compared to others using a lambda expression, which helps determine the circumstances in which this credit should be applied. For example, where the product is an automobile, the lambda expression may match any other vehicles within an age of 3-5 years and a mileage of 50,000 to 150,000 miles. By using such lambda expressions, ever more granular percentage values can be supported within the same larger category.

For example, it may be more expensive to make cosmetic repairs to a Sports Utility Vehicle (SUV) rather than another class of passenger vehicle, or SUVs may depreciate at a faster rate, and those factors could, in turn, influence the optimal TradeCreditAmount. Using appropriate lambda expressions allows for an infinite level of granularity in this calculation.

Once a TradeCreditAmount is found that is of the correct type and whose lambda expression matches the product being valued, the stored CreditPercentage can be multiplied by the protection cost and that number will be returned as the final Trade Credit Amount for the category of protection for that product.

In accordance with the foregoing, the process 1900 commences when the APEPS Server 5101 selects a first product category for which the trade credit amount is to be calculated (step 1902). Next, the APEPS Server retrieves, from the Certificate database 5119k, the currently calculated APEPS certificate credit amount (step 1904). The following steps are then performed iteratively for each product: The APEPS determines whether the product matches another stored product in the same category (step 1908). If no such matching product exists, the APEPS returns to step 1906 and compares the next product. If there is a matching stored product, the APEPS determines whether the calculated trade-in values match for each product (step 1910). If not, the APEPS considers the next stored product. Otherwise, the APEPS confirms and displays the trade-in amount for the product (i.e., a dollar value or a percentage credit) (step 1912). The process 1900 then ends.

FIG. 20 shows a logic flow diagram illustrating embodiments of a Cross Dealer Redemption Process 2000 automatically performed by the APEPS.

After a customer purchases an APEPS certificate-backed product (step 2002), the certificate and product data is registered by dealer server 198 and transmitted to the APEPS Server 5101 for storage (step 2004), for example, in the Users database 5119b and the Certificates database 5119k. After the term of the use of the product, the consumer is notified periodically by, or may log into the APEPS Server 5101 (step 2006). The APEPS Server then authorizes electronic payment to a third party underwriter for insuring or reinsuring the protection and repair of the purchased product (step 2008).

At some time in the future before or at the end of a contracted product use period, the consumer may trade the product in and request the value backed by the APEPS certificate at the dealer from which the product was purchased, or another authorized APEPS-affiliated dealer (for example, within the contractually-backed certificate provider's network)(step 2020). The dealer validates certificate using electronic communications with the APEPS Server 5101 as described herein (step 2022). The dealer may be required to submit certain proofs of trade in to the APEPS Server 5101 (step 2024). The provider and underwriter are then notified of redemption via a transmitted report or by logging into the APEPS Server 5101 (step 2026). Responsively, the underwriter remits payment to the dealer in any of a variety of known or contemplated payment process methods (step 2028). The dealer may then apply the trade credit redeemed from the certificate to the consumer's next product purchase resulting from the trade-in (step 2030. The certificate value may likewise be provided in any of a variety of known or contemplated manners. The process 2000 then ends.

FIG. 21 shows a logic flow diagram illustrating embodiments of an Automatic Certificate Data Maintenance Process 2100 performed by the APEPS.

The following steps are performed iteratively on a scheduled periodic basis, such as hourly or daily. The APEPS first queries the Certificate database 5119k for any certificates having approaching expiration dates, or are otherwise approaching a re-application deadline (step 2102). The APEPS next sorts the results based on imminence of expiration or end of term (step 2104). The APEPS then queries the User database 5119b to determine communication preferences of the consumer for stored notification method preferences (i.e., mail, phone electronic message)(step 2108). The APEPS then concatenates the resulting lists and applied notification preferences (step 2110). The notifications are then distributed automatically to the appropriate consumers in accordance with their notification preferences in advance of the end of product use term or expiration (step 2112). The process 2100 then terminates.

FIG. 22 shows a logic flow diagram illustrating embodiments of a Cross Product Category Certificate Process 2200 for the APEPS. This process 2200 is initiated when the original product is being traded in by the consumer for a different category of product.

The consumer purchases an APEPS certificate-backed product (step 2202). The APEPS certificate and corresponding purchased product is registered by the dealer with the dealer's DMS or directly with the APEPS (step 2204). If the product belongs to a cross-product network, the product's APEPS certificate is output with a note indicating such (step 2208). At some time after purchase, the customer purchases a product in another product class or category (step 2210). A dealer receives the product (step 2212) and then validates the accompanying APEPS certificate and initiates an APEPS discount determination process (step 2214). The dealer submits proof of trade-in to the APEPS Server 5101 (step 2216). The certificate is marked and stored as registered (step 2218). Any insurance or reinsurance provider is notified of the APEPS certificate redemption and product trade-in via a transmitted report or when the provider logs into the APEPS (step 2220). The provider may remit periodic payment to the dealer for the discount (step 2222). The dealer then credits the consumer's protection purchase with the discount (step 2224). The process 200 then terminates.

FIG. 23 shows a logic flow diagram illustrating embodiments of a Basic Certificate Purchase Process 2300 performed by the APEPS. The process 2300 commences when a consumer purchases an APEPS certificate-backed product (step 2302). The APEPS then performs the following integration methods (step 2304) by electronic communications with either the dealer's servers 189 (step 2306) or the dealer's DMS systems (2322). From step 2306, the product data regarding a sale is entered into the APEPS Server 5101 from the dealer's server 189 (step 2308). The APEPS then determines whether the product data is available from the dealer's DMS by transmitting an electronic SQL query (step 2310). If not, the product data corresponding to the sale is manually entered into the APEPS (step 2312). Otherwise, the product data corresponding to the sale is ten integrated with a Provider's server (step 2314). This process 2300 then continues to step 2340, described later below.

From step 2320 above, this process 2300 continues to step 2320 when a dealer's DMS system is initiated in response to a sale of a product to be backed by an APEPS certificate. The product data corresponding to the sale is entered into the dealer's DMS (step 2322). The DMS records are periodically updated (e.g., hourly) by the DMS system (step 2324). Any updates resulting from the foregoing are electronically transmitted to the APEPS Server 5101 (step 2326) and stored in database such as database 5119 (step 2328). The product data corresponding to the sale is integrated with a corresponding provider's server (step 2330). The product data corresponding to the sale of the APEPS certificate-backed product is then sent from the DMS to the APEPS (step 2334) for integration with other systems (step 2340).

From steps 2314 or 2334, the process 2300 continues to step 2340 where early integration service receives the product data. The product data is integrated with the provider server (step 2342) and or Dealer DMS (step 2344), if such integration was not previously performed.

FIG. 24 shows a logic flow diagram illustrating embodiments of a second Basic Certificate Redemption Process 2400 for the APEPS. When a customer wishes to trade-in an APEPS-backed product, the consumer presents their APEPS certificate having a value to be used towards the purchase of another product or service from the issuing dealer or within the dealer/product network (step 2402). The APEPS then performs the following integration methods (step 2404) by electronic communications with either the dealer's servers 189 (step 2406) or the dealer's DMS systems (2420). From step 2406, the product data regarding a sale is entered into the APEPS Server 5101 from the dealer's server 189 (step 2408). The APEPS then determines whether the product is underwritten by a repair insurance or reinsurance provider (step 2410). If so, the APEPS requests proof of insurance for redemption (step 2412). Next, the APEPS Server determines whether the product data is available from the dealer's DMS by transmitting an electronic SQL query (step 2414). If not, the product data corresponding to the sale is transmitted for integration into the DMS at step 2440, below. Otherwise, the product data corresponding to the sale is then integrated with a provider's server (step 2416). This process 2400 then continues to step 2440, described later below.

From step 2420 above, this process 2400 continues to step 2420 when a dealer's DMS system is initiated in response to a sale of a product to be backed by an APEPS certificate. The product data corresponding to the sale is entered into the dealer's DMS (step 2422). The DMS records are periodically updated (e.g., hourly) by the DMS system (step 2424). Any updates resulting from the foregoing are electronically transmitted to the APEPS Server 5101 (step 2426) and stored in database such as database 5119 (step 2428). The product data corresponding to the sale is integrated with a corresponding provider's server (step 2430). The product data corresponding to the sale of the APEPS certificate-backed product is then sent from the DMS to the APEPS (step 2434) for integration with other systems at step 2440.

From steps 2414, 2416 or 2334, the process 2400 continues to step 2440 where early integration service receives the product data. The product data is integrated with the provider server (step 2442) and or Dealer DMS (step 2444), if such integration was not previously performed.

FIG. 25 shows a logic flow diagram illustrating embodiments of a Certificate Verification Process 2500 for the APEPS. The following steps are performed iteratively for each certificate being verified for example, by a dealer in the APEPS network (step 2502). The APEPS first determines whether the certificate being verified is active with another dealer (step 2504) for example, by data lookup in Certificate database 5119k. If the certificate is active with another dealer, rather than the dealer submitting the query, the APEPS Server 5101 issues an invalid certificate redemption error (step 2506). Otherwise, the certificate is maintained on record in the dealer's DMS (step 2508). This verification process 2500 then ends.

FIG. 26 shows a screen shot illustrating embodiments of a Customer Login Screen 2600 for the APEPS. A consumer or other user is asked to input the product identifier and other certificate information in order to gain access to the APEPS system for the processes described above. Such additional information may include any one or more of the consumer's first/last name, phone number, and e-mail contact information.

FIG. 27 shows a screen shot illustrating embodiments of a Customer Certificate View Screen 2700 for the APEPS. The consumer may perform various APEPS functions from this page include transfer of a certificate from one dealer to another, for example, when a consumer moves to a new residential location. The consumer may also add newly purchased products and corresponding APEPS certificates or view existing product and APEPS certificate information. The consumer may also schedule mandatory inspections or repairs from this screen 2700.

FIG. 28 shows a screen shot illustrating embodiments of a Customer Certificate Transfer Screen 2800 for the APEPS. For a selected, identified certificate, the consumer may enter a zip code or other location identifier for a desired new location for a dealer. The APEPS Server 5101 will responsively provide APEPS-affiliated dealers in the new location.

FIG. 29 shows a screen shot illustrating embodiments of a second Customer Certificate View Screen 2900 for the APEPS, in which service details of the consumer's product maybe reviewed.

FIG. 30 shows a screen shot illustrating embodiments of a Management Login Screen 3000 for the APEPS, which may include management login user ID and password entry fields.

Figure 31:
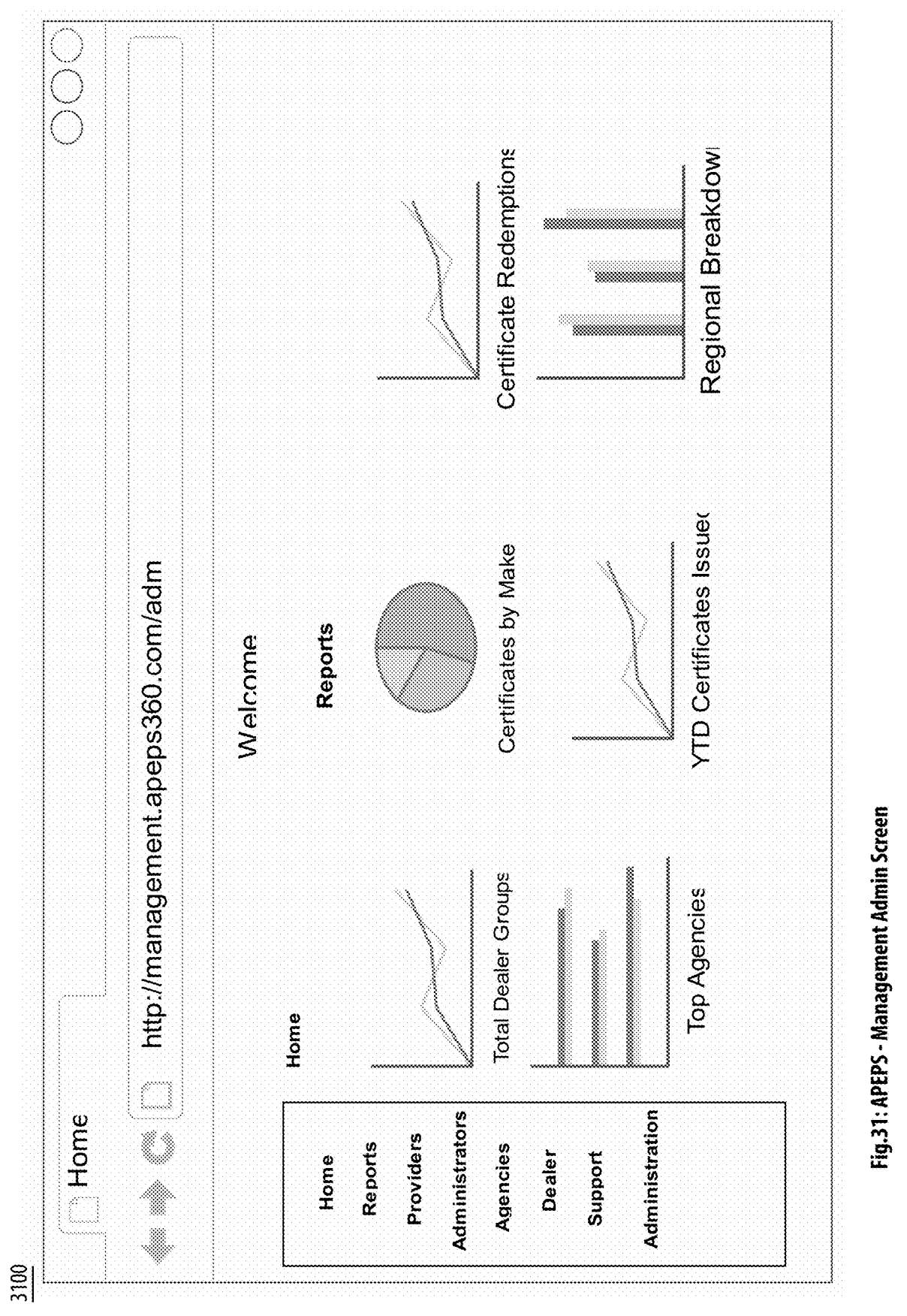

FIG. 31 shows a screen shot illustrating embodiments of a management Administration Screen 3100 for the APEPS, which may display management options and reports such as: total dealer groups, certificates by make, certificate redemption, top agencies, year-to-date (YTD) Number of APEPS Certificates issued, and regional sales statistics.

FIG. 32 shows a screen shot illustrating embodiments of a Management Role Screen 3200 for the APEPS Similar screens are presented for each APEPS user roles, such as provider, administrator, agent, dealer, and the like. This screen 3200 displays lists of entities related to the APEPS user. In the case of administrators, a disable button and view button are provided to disable or enable access by other users of the APEPS system.

FIG. 33 shows a screen shot illustrating embodiments of a Management Add Role Screen 3300 for the APEPS, from which entity details may be added to the APEPS database 5119, such as entity name, address, city, state, ZIP code, contact information, active status and the like.

FIG. 34 shows a screen shot illustrating embodiments of a Management Administration Screen 3400 for the APEPS. From this screen, administrators may access APEPS sales reports, lists of providers, administrators, agencies and dealers, and technical support. This screen enables management roles having the correct credentials to make global changes to various data stored in the APEPS.

FIG. 35 shows a screen shot illustrating embodiments of a Management RCD Search Screen 3500 for the APEPS, from which an APEPS manager may search for certificates by product identification number, customer name, customer contact information or other product information. The results of such queries may also presented on this screen 3500.

FIG. 36 shows a screen shot illustrating embodiments of a Provider Portal Screen 3600 for the APEPS. This screen 3600 may be presented to insurance or reinsurance providers, agents, dealers and dealer group roles. These users may view certificate sales reports, sales by product, demand forecasting based on existing sales, top agencies and dealers, YTD Certificate sales and regional sales data reports.

FIG. 37 shows a screen shot illustrating embodiments of a Provider Portal Products Screen 3700 for the APEPS. From this screen 3700, providers may view various APEPS details such as products covered, dealer costs, certificate expiration dates redeemed certificates, and the like.

FIG. 38 shows a screen shot illustrating embodiments of a Provider Administration Screen 3800 for the APEPS. From this screen 3800, a provider may view administration reports, as well as lists of providers, administrators, agencies, dealers, and technical support. The provider likewise has the ability to make changes regarding users and entities under the provider's control in the APEPS system.

FIG. 39 shows a screen shot illustrating embodiments of an Agency Portal Screen 3900 for the APEPS. This screen 3900 shows similar information as that described with respect to FIG. 36 above, except that the information is relevant to the agent role accessing the APEPS system. These users may view certificate sales reports, sales by product, demand forecasting based on existing sales, top agencies and dealers, YTD Certificate sales and regional sales data reports corresponding to the agent.

FIG. 40 shows a screen shot illustrating embodiments of an Agency Product Screen 4000 for the APEPS, which shows the products, sales data and product comparisons for all products offered by the agent.

FIG. 41 shows a logic flow diagram illustrating embodiments of an Agent Portal Screen 4100 for the APEPS, from which an individual agent may view product sales line item data corresponding to that individual agent.

FIG. 42 shows a screen shot illustrating embodiments of a second Agent Product Screen 4200 for the APEPS, by which an individual agent may view list of current products with price and title, as well as the current number of certificates outstanding, and redeemed.

FIG. 43 shows a screen shot illustrating embodiments of an Agent Setting Screen 4300 for the APEPS, by which an individual agent may view users and dealers participating in the APEPS system.

FIG. 44 shows a screen shot illustrating embodiments of a Dealer Group Portal Screen 4400 for the APEPS, by which a dealer group user may view lists of dealers, sales volumes, current certificates outstanding/redeemed, as well as view and disable buttons for controlling access by dealer group users.

FIG. 45 shows a screen shot illustrating embodiments of a Dealer Group Setting Screen 4500 for the APEPS, by which dealer group setting may be controlled as described above with respect to FIG. 43.

FIG. 46 shows a screen shot illustrating embodiments of a Dealer Portal Screen 4600 for the APEPS, by which an individual dealer may view lists of dealers, sales volumes, current certificates outstanding/redeemed, as well as view and disable buttons for controlling access by dealer users.

FIG. 47 shows a screen shot illustrating embodiments of a Dealer Portal Register Certificate Screen 4700 for the APEPS, which may display product identifiers, date purchased, year, make, model, style, mileage, color, VIN, notes, salesperson ID, manager ID and other information corresponding to the dealer.

FIG. 48 shows a screen shot illustrating embodiments of a Dealer Portal Register Certificate Customer Screen 4800 for the APEPS, by which an individual dealer may register APEPS certificates that were sold. The dealer may enter information including the consumer's first/middle/last name, address, city state, zip, and notes on interactions with the consumers.

FIG. 49 shows a screen shot illustrating embodiments of a Dealer Portal Register Certificate Product Screen 4900 for the APEPS, by which a dealer may register an APEPS certificate and view certificate information, including certificate identification number, product purchase date, any alternate products, and current trade in credit available with the certificate.

FIG. 50 shows a screen shot diagram illustrating embodiments of a Dealer Portal Find Certificate Screen 5000 for the APEPS, by which a dealer may search the APEPS by product identification number, consumer name, consumer contact information, product purchase date and the like.

APEPS Controller

FIG. 51 shows a block diagram illustrating embodiments of a APEPS controller. In this embodiment, the APEPS controller 5101 may serve to aggregate, process, store, search, serve, identify, instruct, generate, match, and/or facilitate interactions with a computer through Electronic Communications technologies, and/or other related data.

Typically, users, which may be people and/or other systems, may engage information technology systems (e.g., computers) to facilitate information processing. In turn, computers employ processors to process information; such processors 5103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 5129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the APEPS controller 5101 may be connected to and/or communicate with entities such as, but not limited to: one or more users from peripheral devices 5112 (e.g., user input devices 5111); an optional cryptographic processor device 5128; and/or a communications network 5113.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The APEPS controller 5101 may be based on computer systems that may comprise, but are not limited to, components such as: a computer systemization 5102 connected to memory 5129.

Computer Systemization

A computer systemization 5102 may comprise a clock 5130, central processing unit ("CPU(s)" and/or "processor(s)" (these terms are used interchangeable throughout the disclosure unless noted to the contrary)) 5103, a memory 5129 (e.g., a read only memory (ROM) 5106, a random access memory (RAM) 5105, etc.), and/or an interface bus 5107, and most frequently, although not necessarily, are all interconnected and/or communicating through a system bus 5104 on one or more (mother)board(s) 5102 having conductive and/or otherwise transportive circuit pathways through which instructions (e.g., binary encoded signals) may travel to effectuate communications, operations, storage, etc. The computer systemization may be connected to a power source 5186; e.g., optionally the power source may be internal. Optionally, a cryptographic processor 5126 may be connected to the system bus. In another embodiment, the cryptographic processor, transceivers (e.g., ICs) 5174, and/or sensor array (e.g., accelerometer, altimeter, ambient light, barometer, global positioning system (GPS) (thereby allowing APEPS controller to determine its location), gyroscope, magnetometer, pedometer, proximity, ultra-violet sensor, etc.) 5173 may be connected as either internal and/or external peripheral devices 5112 via the interface bus I/O 5108 (not pictured) and/or directly via the interface bus 5107. In turn, the transceivers may be connected to antenna(s) 5175, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 5129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the APEPS controller and beyond through various interfaces. Should processing requirements dictate a greater amount speed and/or capacity, distributed processors (e.g., see Distributed APEPS below), mainframe, multi-core, parallel, and/or super-computer architectures may similarly be employed. Alternatively, should deployment requirements dictate greater portability, smaller mobile devices (e.g., Personal Digital Assistants (PDAs)) may be 14 employed.

Depending on the particular implementation, features of the APEPS may be achieved by implementing a microcontroller such as CAST's R8051XC2 microcontroller; Intel's MCS 51 (i.e., 8051 microcontroller); and/or the like. Also, to implement certain features of the APEPS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the APEPS component collection (distributed or otherwise) and/or features may be implemented via the microprocessor and/or via embedded components; e.g., via ASIC, coprocessor, DSP, FPGA, and/or the like. Alternately, some implementations of the APEPS may be implemented with embedded components that are configured and used to achieve a variety of features or signal processing.

Depending on the particular implementation, the embedded components may include software solutions, hardware solutions, and/or some combination of both hardware/software solutions. For example, APEPS features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the APEPS features. A hierarchy of programmable interconnects allow logic blocks to be interconnected as needed by the APEPS system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the APEPS may be developed on regular FPGAs and then migrated into a fixed version that more resembles ASIC implementations. Alternate or coordinating implementations may migrate APEPS controller features to a final ASIC instead of or in addition to FPGAs. Depending on the implementation all of the aforementioned embedded components and microprocessors may be considered the "CPU" and/or "processor" for the APEPS.

Power Source

The power source 5186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 5186 is connected to at least one of the interconnected subsequent components of the APEPS thereby providing an electric current to all subsequent components. In one example, the power source 5186 is connected to the system bus component 5104. In an alternative embodiment, an outside power source 5186 is provided through a connection across the I/O 5108 interface. For example, a USB and/or IEEE 1394 connection carries both data and power across the connection and is therefore a suitable source of power.

Interface Adapters

Interface bus(ses) 5107 may accept, connect, and/or communicate to a number of interface adapters, conventionally although not necessarily in the form of adapter cards, such as but not limited to: input output interfaces (I/O) 5108, storage interfaces 5109, network interfaces 5110, and/or the like. Optionally, cryptographic processor interfaces 5127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X), PCI Express, Personal Computer Memory Card International Association (PCMCIA), and/or the like.

Storage interfaces 5109 may accept, communicate, and/or connect to a number of storage devices such as, but not limited to: storage devices 5114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 5110 may accept, communicate, and/or connect to a communications network 5113. Through a communications network 5113, the APEPS controller is accessible through remote clients 5133*b* (e.g., computers with web browsers) by users 5133*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed APEPS below), architectures may similarly be employed to pool, load balance, and/or otherwise decrease/increase the communicative bandwidth required by the APEPS controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 5110 may be used to engage with various communications network types 5113. For example, multiple network interfaces may be employed to allow for the communication over broadcast, multicast, and/or unicast networks.

Input Output interfaces (I/O) 5108 may accept, communicate, and/or connect to user, peripheral devices 5112 (e.g., input devices 5111), cryptographic processor devices 5128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 5112 may be connected and/or communicate to I/O and/or other facilities of the like such as network interfaces, storage interfaces, directly to the interface bus, system bus, the CPU, and/or the like. Peripheral devices may be external, internal and/or part of the APEPS controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 5111 often are a type of peripheral device 5112 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the APEPS controller may be embodied as an embedded, dedicated, and/or monitor-less (i.e., headless) device, wherein access would be provided over a network interface connection.

Cryptographic units such as, but not limited to, microcontrollers, processors 5126, interfaces 5127, and/or devices 5128 may be attached, and/or communicate with the APEPS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 5129. However, memory is a fungible technology and resource, thus, any number of memory embodiments may be employed in lieu of or in concert with one another. It is to be understood that the APEPS controller and/or a computer systemization may employ various forms of memory 5129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 5129 will include ROM 5106, RAM 5105, and a storage device 5114. A storage device 5114 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 5129 may contain a collection of program and/or database components and/or data such as, but not limited to: operating system component(s) 5115 (operating system); information server component(s) 5116 (information server); user interface component(s) 5117 (user interface); Web browser component(s) 5118 (Web browser); database(s) 5119; mail server component(s) 5121; mail client component(s) 5122; cryptographic server component(s) 5120 (cryptographic server); the APEPS component(s) 5135; and/or the like (i.e., collectively a component collection). These components may be stored and accessed from the storage devices and/or from storage devices accessible through an interface bus. Although non-conventional program components such as those in the component collection, typically, are stored in a local storage device 5114, they may also be loaded and/or stored in memory such as: peripheral devices, RAM, remote storage facilities through a communications network, ROM, various forms of memory, and/or the like.

Operating System

The operating system component 5115 is an executable program component facilitating the operation of the APEPS controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the APEPS controller to communicate with other entities through a communications network 5113. Various communication protocols may be used by the APEPS controller as a subcarrier transport mechanism for interaction, such as, but not limited to: multicast, TCP/IP, UDP, unicast, and/or the like.

Information Server

An information server component 5116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the APEPS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the APEPS database 5119, operating systems, other program components, user interfaces, Web browsers, and/or the like.

Access to the APEPS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the APEPS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the APEPS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 5117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 5118 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the APEPS enabled nodes. The combined application may be nugatory on systems employing standard Web browsers.

Mail Server

A mail server component 5121 is a stored program component that is executed by a CPU 5103. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the APEPS. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the APEPS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 5122 is a stored program component that is executed by a CPU 5103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 5120 is a stored program component that is executed by a CPU 5103, cryptographic processor 5126, cryptographic processor interface 5127, cryptographic processor device 5128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the APEPS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the APEPS component to engage in secure transactions if so desired. The cryptographic component facilitates the secure accessing of resources on the APEPS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The APEPS Database

The APEPS database component 5119 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the APEPS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the APEPS database is implemented as a data-structure, the use of the APEPS database 5119 may be integrated into another component such as the APEPS component 5135. Also, the database may be implemented as a mix of data structures, objects, and relational structures. Databases may be consolidated and/or distributed in countless variations (e.g., see Distributed APEPS below). Portions of databases, e.g., tables, may be exported and/or imported and thus decentralized and/or integrated.

In one embodiment, the database component 5119 includes several tables 5119*a-h*:

An accounts table 5119*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCoun try, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 5119*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a APEPS);

An devices table 5119*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 5119*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, app Restrictions, portNum, access_API_call, linked_wallets_list, and/or the like;

An assets table 5119*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetlPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 5119*f* includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 5119*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 5119h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 5119i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherindustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

Repair Tracking and Verification Database 5119j includes the relevant fields as described in FIGS. 2-4, including: productID, productName, productDescription, ServiceSceduleID, SuggestedCost, ManufacturerSuggestedRetialPrice, DealerNetwork, RecordCerationDate, ActiveStatus, InsuranceUnderwriter, ReinsuranceUnderwriter, ServiceScheduleName, ServiceScheduleDescription, ReconstitutionRequestID, ReconstitutionDateApproved, ReconstitutionStatus and the like.

Certificate Database 5119k includes the relevant fields described in FIG. 2 and above, including: CertificateID, RedemptionAmount, DateIssued, ProductID, DealerID, PurchasedProductAmount, CustomerID, DateRedeemed, ExpirationDate, MechanicalAmount, AppearanceAmount, TradeCreditAmount, StoredCreditPercentage and the like.

In one embodiment, the tables, entities and relationships shown in FIGS. 2-4 are incorporated and part of the APEPS database.

A market_data table 5119z includes fields such as, but not limited to: market_data_feed_ID, asset_ID, asset_symbol, asset_name, spot_price, bid_price, ask_price, and/or the like; in one embodiment, the market data table is populated through a market data feed (e.g., Kelly Blue Book (KBB), and/or the like information sources, e.g., via ITC 2.1 and/or respective feed protocols), for example, through Microsoft's Active Template Library and Dealing Object Technology's real-time toolkit Rtt.Multi.

In one embodiment, the APEPS database may interact with other database systems. For example, employing a distributed database system, queries and data access by search APEPS component may treat the combination of the APEPS database, an integrated data security layer database as a single database entity (e.g., see Distributed APEPS below).

In one embodiment, user programs may contain various user interface primitives, which may serve to update the APEPS. Also, various accounts may require custom database tables depending upon the environments and the types of clients the APEPS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 5119a-z. The APEPS may be configured to keep track of various settings, inputs, and parameters via database controllers.

The APEPS database may communicate to and/or with other components in a component collection, including itself, and/or facilities of the like. Most frequently, the APEPS database communicates with the APEPS component, other program components, and/or the like. The database may contain, retain, and provide information regarding other nodes and data.

The APEPSs

The APEPS component 5135 is a stored program component that is executed by a CPU. In one embodiment, the APEPS component incorporates any and/or all combinations of the aspects of the APEPS that was discussed in the previous figures. As such, the APEPS affects accessing, obtaining and the provision of information, services, transactions, and/or the like across various communications networks. The features and embodiments of the APEPS discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the APEPS's features and facilities, and in many cases reduce the costs, energy consumption/requirements, and extend the life of APEPS's underlying infrastructure; this has the added benefit of making the APEPS more reliable. Similarly, many of the features and mechanisms are designed to be easier for users to use and access, thereby broadening the audience that may enjoy/employ and exploit the feature sets of the APEPS; such ease of use also helps to increase the reliability of the APEPS. In addition, the feature sets include heightened security as noted via the Cryptographic components 5120, 5126, 5128 and throughout, making access to the features and data more reliable and secure The APEPS transforms initial product attribute data inputs, via APEPS components (e.g., an Appearance Protection and Enhancement Package Calculation Component 5142, Resale Component 5144, Preventive Maint. Package Generator Component 5146, Trade-in Value Calculation Component 5148, and Follow-Up Maintenance Package Generator Component 5149), into future product value enhancement verification outputs.

The APEPS component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the APEPS server employs a cryptographic server to encrypt and decrypt communications. The APEPS component may communicate to and/or with other components in a component collection, including itself, and/or facilities of the like. Most frequently, the APEPS component communicates with the APEPS database, operating systems, other program components, and/or the like. The APEPS may contain, communicate, generate, obtain, and/or provide program component, system, user, and/or data communications, requests, and/or responses.

The APEPS Server 5101 may have the following exemplary programmed components, the functions of which have been described herein above: Appearance Protection and Enhancement Package Calculation Component 5142, Vehicle Resale Component 5144, Preventative Maintenance Package Generator Component 5146, Trade-in Value Calculation Component 5148, Follow-up Maintenance and Appearance Enhancement Package Generator Component 5149 and Reconstitution Component 5150.

Distributed APEPSs

The structure and/or operation of any of the APEPS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the APEPS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for APEPS controller and/or APEPS component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the APEPS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content—Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
    $input=" ";
    $input=socket_read($client, 1024);
    $data.=$input;
} while($input !=" ");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:
http://www.xay.com/perl/site/lib/SOAP/Parser.html
http://publib.boulder.ibm.com/infocenter/tivihelp/v2r1/index.jsp?topic=/com.ibm.IBMDI.doc/referenceguide295.htm
and other parser implementations:
http://publib.boulder.ibm.com/infocenter/tivihelp/v2r1/index.jsp?topic=/com.ibm.IBMDI.doc/referenceguide259.htm
all of which are hereby expressly incorporated by reference.

In order to address various issues and advance the art, the entirety of this application for Vehicle Appearance Protection and Enhancement Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a APEPS individual and/or enterprise user, database configuration and/or relational model, data type, data transmission and/or network framework, syntax structure, and/or the like, various embodiments of the APEPS, may be implemented that enable a great deal of flexibility and customization. While various embodiments and discussions of the APEPS have included Electronic Communications, however, it is to be understood that the embodiments described herein may be readily configured and/or customized for a wide variety of other applications and/or implementations.

What is claimed is:

1. A product enhancement apparatus, comprising:
   a memory;
   a component collection stored in the memory, including:
     a product protection enhancement calculation component,
     a follow-up maintenance package generator component,
     an encryption component, and
     a reconstitution confirmation component;
   a processor disposed in communication with the memory, and configured to issue and execute a plurality of processing instructions from the component collection stored in the memory,
     wherein the processor issues instructions from the product protection enhancement calculation component, stored in the memory, to:
       receive initial attribute data regarding a product, the initial attribute data received in a machine-readable format,
       retrieve, from a repair database, a service option datastructure based on the product and the initial attribute data, and
       calculate a future conditional redemption value associated with the product based on the service option datastructure,
     wherein the processor issues instructions from the follow-up maintenance package generator component, stored in the memory, to:
       receive the service option datastructure for the product from the product protection enhancement calculation component in a machine-readable format,
       generate a mandatory inspection and repair schedule for future maintenance of the product based on the service option datastructure, and
       generate a certificate guaranteeing the future conditional redemption value associated with the product, the certificate including a product identification, an expiration date corresponding to an expected product use period, and a guaranteed future conditional redemption value based on the value of the product at the time of certificate generation;
     wherein the processor issues instructions from the reconstitution confirmation component, stored in the memory, to:
       receive the mandatory inspection and repair schedule from the follow-up maintenance package generator component in a machine-readable format,
       receive, via a data communications network from any of a plurality of repair agent database systems, repair confirmation data corresponding to the mandatory inspection and repair schedule, and
       update a repair confirmation datastructure (RCD) associated with the certificate in the repair database based on the repair confirmation data, wherein the future conditional redemption value associated with the product is conditioned on compliance with the mandatory inspection and repair schedule as monitored via the repair confirmation datastructure; and
     wherein the processor issues further instructions from the encryption component to:
       generate an encrypted RCD by applying a hash function to the RCD; and
       store the encrypted RCD in a Bitcoin blockchain.

2. The product enhancement apparatus of claim 1, wherein the processor issues further instructions from the product protection enhancement calculation component to:
   calculate an expected maintenance cost for the product over the expected product use period based on the service option datastructure, and
   calculate a future conditional redemption value associated with the product based on the expected maintenance cost.

3. The product enhancement apparatus of claim 1, the component collection in memory further including an appearance protection and enhancement package calculation component, wherein the processor issues further instructions from the appearance protection and enhancement package calculation component to:
   receive the initial attribute data regarding the product from the product protection enhancement calculation component,
   receive the service option data structure for the product, and
   calculate a consumer cost for appearance protection and enhancement package.

4. The product enhancement apparatus of claim 1, the component collection in memory further including a preventative maintenance component, wherein the processor issues further instructions from the preventative maintenance component to:
   receive the initial attribute data regarding the product from the product protection enhancement calculation component,
   receive the service option data structure selected for the product,
   receive, via a data communications network from any of the plurality of repair agent database systems, unscheduled preventative repair confirmation data corresponding to the product, and
   update the repair confirmation datastructure associated with the certificate in the repair database based on the unscheduled preventative repair confirmation data.

5. The product enhancement apparatus of claim 1, the component collection in memory further including a trade-in value calculation component, wherein the processor issues further instructions from the trade-in value calculation component to:
   receive an indication of a trade-in of the product;
   receive the certificate from the follow-up maintenance package generator component, receive the repair confirmation datastructure associated with the product from the reconstitution confirmation component, confirm the future conditional redemption value associated with the product based on the certificate and the repair confirmation datastructure, and calculate a trade-in value for the product based on the future conditional redemption value.

6. The product enhancement apparatus of claim 1, the component collection in memory further including a product resale value calculation component, wherein the processor issues further instructions from the product resale value calculation component to:

receive an indication of a resale of the product;

receive the certificate from the follow-up maintenance package generator component, receive the repair confirmation datastructure associated with the product from the reconstitution confirmation component, confirm the future conditional redemption value associated with the product based on the certificate and the repair confirmation datastructure, and calculate a resale value for the product based on the future conditional redemption value.

7. The product enhancement apparatus of claim 1, wherein the product is an automobile.

8. The product enhancement apparatus of claim 7, wherein the initial attribute data includes a vehicle identification number (VIN) associated with the automobile.

9. The product enhancement apparatus of claim 1, wherein the mandatory inspection and repair schedule includes mandatory inspections and repairs of cosmetic damage to the product.

10. The product enhancement apparatus of claim 1, wherein the certificate further comprises a machine-readable indicium for confirmation of authenticity of the certificate.

11. The product enhancement apparatus of claim 1, wherein the processor issues further instructions from the follow-up maintenance package generator component to:

transmit the certificate to the owner of the product.

12. The product enhancement apparatus of claim 1, wherein the certificate guaranteeing a future conditional redemption is generated with a purchase.

13. The product enhancement apparatus of claim 1, wherein the certificate guaranteeing a future conditional redemption is generated with a lease.

14. A processor-implemented product enhancement method to transform initial product data inputs into future conditional redemption value outputs, the method comprising:

receiving, by at least one processor executing a product protection enhancement calculation component, initial attribute data regarding a product, the initial attribute data received in a machine-readable format, retrieving, by the at least one processor executing the product protection enhancement calculation component and from a repair database, a service option datastructure based on the product and the initial attribute data, and calculating, by the at least one processor executing the product protection enhancement calculation component a future conditional redemption value associated with the product based on the service option datastructure, receiving, by the at least one processor executing a follow-up maintenance package generator component, the service option datastructure for the product from the product protection enhancement calculation component in a machine-readable format, generating, by the at least one processor executing the follow-up maintenance package generator component, a mandatory inspection and repair schedule for future maintenance of the product based on the service option datastructure, and generating, by the at least one processor executing the follow-up maintenance package generator component, a certificate guaranteeing the future conditional redemption value associated with the product, the certificate including a product identification, an expiration date corresponding to an expected product use period, and a guaranteed future conditional redemption value is based on the value of the product at the time of certificate generation; and receiving, by the at least one processor executing a reconstitution confirmation component, the mandatory inspection and repair schedule from the follow-up maintenance package generator component in a machine-readable format, receiving, by the at least one processor executing the reconstitution confirmation component, via a data communications network from any of a plurality of repair agent database systems, repair confirmation data corresponding to the mandatory inspection and repair schedule, and updating, by the at least one processor executing the reconstitution confirmation component, a repair confirmation datastructure (RCD) associated with the certificate in the repair database based on the repair confirmation data, wherein the future conditional redemption value associated with the product is conditioned on compliance with the mandatory inspection and repair schedule as monitored via the repair confirmation datastructure; and generating, by the at least one processor executing a encryption component, an encrypted RCD by applying a hash function to the RCD; and storing, by the at least one processor executing the encryption component, the encrypted RCD in a Bitcoin blockchain.

15. The processor-implemented product enhancement method of claim 14, further comprising:

calculating, by the at least one processor executing the product protection enhancement calculation component, calculate an expected maintenance cost for the product over the expected product use period based on the service option datastructure, and calculating, by the at least one processor executing the product protection enhancement calculation component, a future conditional redemption value associated with the product based on the expected maintenance cost.

16. The processor-implemented product enhancement method of claim 14, further comprising receiving, by the at least one processor executing an appearance protection and enhancement package calculation component, the initial attribute data regarding the product, receiving, by the at least one processor executing an appearance protection and enhancement package calculation component, the service option data structure selected for the product, and calculating, by the at least one processor executing the appearance protection and enhancement package calculation component, a consumer cost for appearance protection and enhancement package.

17. The processor-implemented product enhancement method of claim 14, further comprising receiving, by the at least one processor executing an preventative maintenance component, the initial attribute data regarding the product,
  receiving, by the at least one processor executing the preventative maintenance component, the service option data structure selected for the product,
  receiving, by the at least one processor executing the preventative maintenance component via a data communications network from any of the plurality of repair agent database systems, unscheduled preventative repair confirmation data corresponding to the product, and
  updating, by the at least one processor executing the preventative maintenance component, the repair confirmation datastructure associated with the certificate in the repair database based on the unscheduled preventative repair confirmation data.

18. The processor-implemented product enhancement method of claim 14, further comprising receiving, by the at least one processor executing a trade-in value calculation component, an indication of a trade-in of the product;
  receiving, by the at least one processor executing the trade-in value calculation component, the certificate,
  receiving, by the at least one processor executing the trade-in value calculation component, the repair confirmation datastructure associated with the product,
  confirming, by the at least one processor executing the trade-in value calculation component, the future conditional redemption value associated with the product based on the certificate and the repair confirmation datastructure, and
  calculating, by the at least one processor executing the trade-in value calculation component, a trade-in value for the product based on the future conditional redemption value.

19. The processor-implemented product enhancement method of claim 14, further comprising receiving, by the at least one processor executing a product resale value calculation component,
  an indication of a resale of the product;
  receiving, by the at least one processor executing the product resale value calculation component, the certificate,
  receiving, by the at least one processor executing the product resale value calculation component, the repair confirmation datastructure associated with the product,
  confirming, by the at least one processor executing the product resale value calculation component, the future conditional redemption value associated with the product based on the certificate and the repair confirmation datastructure, and
  calculating, by the at least one processor executing the product resale value calculation component, a resale value for the product based on the future conditional redemption value.

20. The processor-implemented product enhancement method of claim 14, wherein the product is an automobile.

21. The processor-implemented product enhancement method of claim 20, wherein the initial attribute data includes a vehicle identification number (VIN) associated with the automobile.

22. The processor-implemented product enhancement method of claim 14, wherein the mandatory inspection and repair schedule includes mandatory inspections and repairs of cosmetic damage to the product.

23. The processor-implemented product enhancement method of claim 14, wherein the certificate further comprises a machine-readable indicium for confirmation of authenticity of the certificate.

24. The processor-implemented product enhancement method of claim 14, further comprising executing, by the at least one processor executing a product resale value calculation component, a follow-up maintenance package generator component, and
  transmitting, by the at least one processor executing the product resale value calculation component, the certificate to the owner of the product.

25. The processor-implemented product enhancement method of claim 14, wherein the certificate guaranteeing a future conditional redemption is generated with a purchase.

26. The processor-implemented product enhancement method of claim 14, wherein the certificate guaranteeing a future conditional redemption is generated with a lease.

27. A non-transitory processor-readable medium storing processor-issuable instructions, for access by processor-executable program components, comprising:
  a product protection enhancement calculation component to:
    receive initial attribute data regarding a product, the initial attribute data received in a machine-readable format,
    retrieve, from a repair database, a service option datastructure based on the product and the initial attribute data, and
    calculate a future conditional redemption value associated with the product based on the service option datastructure,
  a follow-up maintenance package generator component to:
    receive the service option datastructure for the product from the product protection enhancement calculation component in a machine-readable format,
    generate a mandatory inspection and repair schedule for future maintenance of the product based on the service option datastructure, and
    generate a certificate guaranteeing the future conditional redemption value associated with the product, the certificate including a product identification, an expiration date corresponding to an expected product use period and a guaranteed future conditional redemption value is based on the value of the product at the time of certificate generation;
  a reconstitution confirmation component to:
    receive the mandatory inspection and repair schedule from the follow-up maintenance package generator component in a machine-readable format,
    receive, via a data communications network from any of a plurality of repair agent database systems, repair confirmation data corresponding to the mandatory inspection and repair schedule, and
    update a repair confirmation datastructure (RCD) associated with the certificate in the repair database based on the repair confirmation data, wherein the future conditional redemption value associated with the product is conditioned on compliance with the mandatory inspection and repair schedule as monitored via the repair confirmation datastructure; and
  an encryption component to:
    generate an encrypted RCD by applying a hash function to the RCD; and
    store the encrypted RCD in a Bitcoin blockchain.

28. The non-transitory processor-readable medium of claim 27, the product protection enhancement calculation component further configured to:
  calculate an expected maintenance cost for the product over the expected product use period based on the service option datastructure, and
  calculate a future conditional redemption value associated with the product based on the expected maintenance cost.

29. The non-transitory processor-readable medium of claim 27 further including an appearance protection and enhancement package calculation component to:
  receive the initial attribute data regarding the product from the product protection enhancement calculation component,
  receive the service option data structure selected for the product, and
  calculate a consumer cost for appearance protection and enhancement package.

30. The non-transitory processor-readable medium of claim 27 further including a preventative maintenance component to:
  receive the initial attribute data regarding the product from the product protection enhancement calculation component,
  receive the service option data structure selected for the product,
  receive, via a data communications network from any of the plurality of repair agent database systems, unscheduled preventative repair confirmation data corresponding to the product, and
  update the repair confirmation datastructure associated with the certificate in the repair database based on the unscheduled preventative repair confirmation data.

31. The non-transitory processor-readable medium of claim 27 further including a trade-in value calculation component to:
  receive an indication of a trade-in of the product;
  receive the certificate from the follow-up maintenance package generator component,
  receive the repair confirmation datastructure associated with the product from the reconstitution confirmation component,
  confirm the future conditional redemption value associated with the product based on the certificate and the repair confirmation datastructure, and
  calculate a trade-in value for the product based on the future conditional redemption value.

32. The non-transitory processor-readable medium of claim 27 further including a product resale value calculation component to:
  receive an indication of a resale of the product;
  receive the certificate from the follow-up maintenance package generator component,
  receive the repair confirmation datastructure associated with the product from the reconstitution confirmation component,
  confirm the future conditional redemption value associated with the product based on the certificate and the repair confirmation datastructure, and
  calculate a resale value for the product based on the future conditional redemption value.

33. The non-transitory processor-readable medium of claim 27, wherein the product is an automobile.

34. The non-transitory processor-readable medium of claim 33, wherein the initial attribute data includes a vehicle identification number (VIN) associated with the automobile.

35. The non-transitory processor-readable medium of claim 27, wherein the mandatory inspection and repair schedule includes mandatory inspections and repairs of cosmetic damage to the product.

36. The non-transitory processor-readable medium of claim 27, wherein the certificate further comprises a machine-readable indicium for confirmation of authenticity of the certificate.

37. The non-transitory processor-readable medium of claim 27, further comprising the follow-up maintenance package generator component further to transmit the certificate to the owner of the product.

38. The non-transitory processor-readable medium of claim 27, wherein the certificate guaranteeing a future conditional redemption is generated with a purchase or lease.

* * * * *